(12) United States Patent
Ishii et al.

(10) Patent No.: US 7,109,284 B2
(45) Date of Patent: Sep. 19, 2006

(54) OLEFIN POLYMERIZATION CATALYST, PROCESS FOR POLYMERIZING OLEFINS, ETHYLENE POLYMER OBTAINED BY SAID PROCESS AND USE THEREOF

(75) Inventors: Seiichi Ishii, Sodegaura (JP); Makoto Mitani, Sodegaura (JP); Junji Saito, Sodegaura (JP); Sadahiko Matsuura, Sodegaura (JP); Naoto Matsukawa, Sodegaura (JP); Kazutaka Tsuru, Yamaguchi (JP); Terunori Fujita, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/174,959

(22) Filed: Jun. 20, 2002

(65) Prior Publication Data
US 2003/0027955 A1 Feb. 6, 2003

(30) Foreign Application Priority Data
Jun. 20, 2001 (JP) ............................. 2001-186459

(51) Int. Cl.
C08F 10/02 (2006.01)
C08F 210/02 (2006.01)

(52) U.S. Cl. ................... 526/352; 526/348.3; 526/161; 526/165; 526/172; 502/167; 525/245; 525/326.1; 585/510

(58) Field of Classification Search ................ 526/160, 526/165, 172, 348.3, 352, 161; 502/167; 525/245, 326.1; 585/510
See application file for complete search history.

(56) References Cited

U.S. PATENT DOCUMENTS

| | | | |
|---|---|---|---|
| 6,444,773 B1 * | 9/2002 | Markel | 526/348 |
| 6,459,005 B1 | 10/2002 | Hirano et al. | |
| 6,531,555 B1 * | 3/2003 | Whiteker | 526/161 |
| 2003/0120003 A1 * | 6/2003 | Kashiwa et al. | 526/114 |

FOREIGN PATENT DOCUMENTS

| | | |
|---|---|---|
| CN | 1270180 | 10/2000 |
| EP | 1 013 674 A1 | 6/2000 |
| EP | 1013674 A1 | 6/2000 |
| EP | 1 043 341 A2 | 10/2000 |
| EP | 1 043 359 A1 | 10/2000 |
| EP | 1043359 A | 10/2000 |
| EP | 1043341 A2 | 10/2001 |
| EP | 1 162 211 A1 | 12/2001 |
| EP | 1162211 A1 | 12/2001 |
| EP | 1 241 194 A1 | 9/2002 |
| EP | 1241194 A1 | 9/2002 |
| JP | A 11-315109 | 11/1999 |
| JP | 2000-119322 A | 4/2000 |
| JP | 2000 119322 A | 9/2000 |
| JP | 2001-2731 A | 1/2001 |
| JP | A 2001-2731 | 1/2001 |
| JP | 2001002731 A | 5/2001 |
| WO | WO 00/47586 A1 | 8/2000 |
| WO | WO 00/50470 A2 | 8/2000 |
| WO | WO 0047586 A1 | 8/2000 |
| WO | WO 00/78828 A1 | 12/2000 |

OTHER PUBLICATIONS

Ishii et al., Chemistry Letters, p. 740-741, 2002. (XP009007498).
Mulhaupt, Rolf et al., Makromol. Chem. Macromol. Symp. 48/49, pp. 317-332 (1991) "Functional polypropylene blend compatibilizers".

* cited by examiner

Primary Examiner—Caixia Lu
(74) Attorney, Agent, or Firm—Birch, Stewart, Kolasch & Birch, LLP

(57) ABSTRACT

The present invention provides a novel olefin polymerization catalyst having excellent olefin polymerization activity and, in polymerization with the catalyst comprising a transition metal compound, a polymerization process for preparing a polymer having a low molecular weight with high polymerization activity. The process comprises polymerizing olefin in the presence of an olefin polymerization catalyst comprising (A) a transition metal compound represented by the following formula (I)

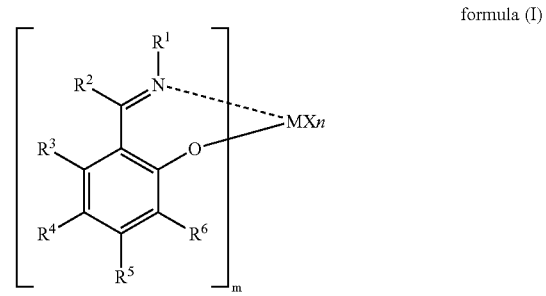

[M: a Group 4 or 5 transition metal atom in the Periodic Table, m: 1–4, $R^1$: H, a $C_1$–$C_5$ linear hydrocarbon group, 3- to 5-membered alicyclic hydrocarbon group, bicycloaliphatic hydrocarbon group wherein two alicyclic rings share one or more carbon atoms, $R^2$ to $R^6$: H, a halogen atom, hydrocarbon group etc, X: H, a halogen atom etc, and n is a valence of M], and (B) at least one compound selected from (B-1) an organometallic compound, (B-2) an organoaluminum oxy compound and (B-3) an ionizing ionic compound.

6 Claims, No Drawings

OLEFIN POLYMERIZATION CATALYST, PROCESS FOR POLYMERIZING OLEFINS, ETHYLENE POLYMER OBTAINED BY SAID PROCESS AND USE THEREOF

FIELD OF THE INVENTION

The present invention relates to olefin polymerization catalysts, a process for polymerizing olefins using these catalysts, a low-molecular-weight ethylene polymer obtained by the polymerization process, and uses of the low-molecular-weight ethylene polymer. Particularly, the present invention relates to novel olefin polymerization catalysts having high polymerization activity, a process for polymerizing olefins using these catalysts, a low-molecular-weight ethylene polymer obtained by the polymerization process that has a narrow molecular weight distribution and a high content of the terminal vinyl or vinylidene group in the main chain, a modified product thereof, and uses of these polymer and modified product.

BACKGROUND ART

Titanium catalysts comprising a titanium compound and an organoaluminum compound, and vanadium catalysts comprising a vanadium compound and an organoaluminum compound, are known as catalysts used in production of olefin polymers, such as ethylene polymers and ethylene/α-olefin copolymers.

Ziegler catalysts comprising a metallocene compound, such as zirconocene, and an organoaluminum-oxy compound (aluminoxane) are known as catalysts enabling production of olefin polymers with high polymerization activity.

Recently, novel olefin polymerization catalysts comprising a transition metal compound having a salicylaldimine ligand are described in JP-A-11 (1999)/315109 to exhibit high olefin polymerization activity. Further, JP-A-2001/2731 describes a novel low-molecular-weight ethylene polymer having a double bond in one terminal position, a modified product thereof obtained by modifying the double bond in one terminal position, and uses of these polymer and modified product, such as a toner release agent, a pigment dispersant and a lubricant for vinyl chloride resins.

To exert higher performances in such uses and to find other applications, these polymers are required to have an increased content of the double bond in one terminal position of the polymer chain (such a double bond will be sometimes referred to as "one-terminal double bond" hereinafter).

OBJECT OF THE INVENTION

It is an object of the present invention to provide novel olefin polymerization catalysts having excellent olefin polymerization activity, and a process for producing low-molecular-weight polymers with high polymerization activity in the presence of the above transition metal compound.

It is another object of the present invention to provide a low-molecular-weight ethylene polymer having a high content of the one-terminal double bond, a modified product thereof obtained by treating the one-terminal double bonds with a specific modifier, and uses of these low-molecular-weight ethylene polymer and modified product thereof.

SUMMARY OF THE INVENTION

The olefin polymerization catalyst according to a first embodiment of the present invention comprises a transition metal compound (A) represented by the following formula (I):

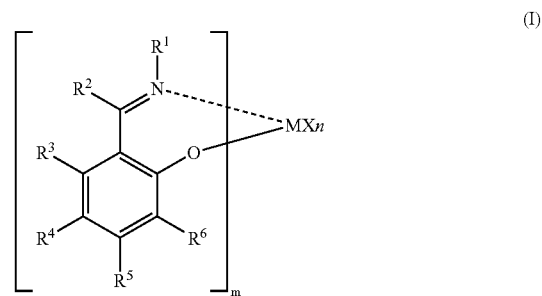

wherein M is a transition metal atom of Group 4 or Group 5 of the Periodic Table, m is an integer of 1 to 4, $R^1$ is a linear hydrocarbon group of 1 to 5 carbon atoms ($C_{n'}H_{2n'+1}$ wherein n' ranges from 1 to 5) or a hydrogen atom, $R^2$ to $R^6$, which may be the same or different, are each a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, and two or more of them may be bonded to each other to form a ring, when m is 2 or greater, two of the groups $R^2$ to $R^6$ may be bonded to each other, n is a number satisfying a valence of M, and X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or greater, plural groups X may be the same or different and may be bonded to each other to form a ring.

It is preferable in the invention that the olefin polymerization catalyst comprise a transition metal compound (A) represented by the formula (I) wherein M is a transition metal atom of Group 4 of the Periodic Table, m is 2, n is 2 and $R^1$ is a linear hydrocarbon group of 1 to 5 carbon atoms ($C_{n'}H_{2n'+1}$ wherein n' ranges from 1 to 5) or a hydrogen atom.

It is also preferred that the olefin polymerization catalyst comprise a transition metal compound (A) represented by the formula (I) wherein M is a zirconium atom, and $R^1$ is a methyl group, an ethyl group or a hydrogen atom.

The olefin polymerization catalyst according to a second embodiment of the present invention comprises a transition metal compound (A) represented by the following formula (II):

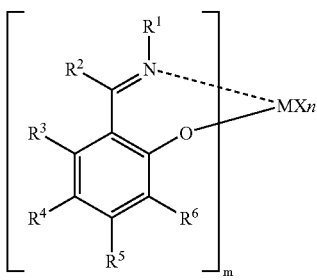

(II)

wherein M is a transition metal atom of Group 4 or Group 5 of the Periodic Table, m is an integer of 1 to 4, $R^1$ is a 3- to 5-membered alicyclic hydrocarbon group which may have at least one substituent group, $R^2$ to $R^6$, which may be the same or different, are each a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, and two or more of them may be bonded to each other to form a ring, when m is 2 or greater, two of the groups $R^2$ to $R^6$ may be bonded to each other, n is a number satisfying a valence of M, and X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or greater, plural groups X may be the same or different and may be bonded to each other to form a ring.

It is preferable in the invention that the olefin polymerization catalyst comprise a transition metal compound (A) represented by the formula (II) wherein M is a transition metal atom of Group 4 of the Periodic Table, m is 2, n is 2 and $R^1$ is a 3- to 5-membered alicyclic hydrocarbon group which may have at least one substituent group.

It is also preferred that the olefin polymerization catalyst comprise a transition metal compound (A) represented by the formula (II) wherein M is a zirconium atom and $R^1$ is a 3- to 5-membered alicyclic hydrocarbon group which may have at least one substituent group.

The olefin polymerization catalyst according to a third embodiment of the present invention comprises a transition metal compound (A) represented by the following formula (III):

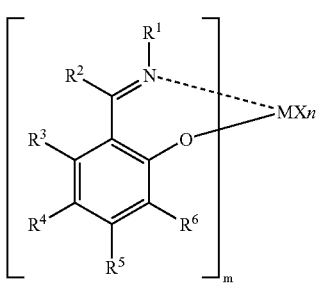

(III)

wherein M is a transition metal atom of Group 4 or Group 5 of the Periodic Table, m is an integer of 1 to 4, $R^1$ is a bicycloaliphatic hydrocarbon group of 4 to 20 carbon atoms which may have at least one substituent group and in which the two alicyclic rings are bonded to each other by the sharing of one or more carbon atoms, $R^2$ to $R^6$, which may be the same or different, are each a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, and two or more of them may be bonded to each other to form a ring, when m is 2 or greater, two of the groups $R^2$ to $R^6$ may be bonded to each other, n is a number satisfying a valence of M, and X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or greater, plural groups X may be the same or different and may be bonded to each other to form a ring.

It is preferable in the invention that the olefin polymerization catalyst comprise a transition metal compound (A) represented by the formula (III) wherein M is a transition metal atom of Group 4 of the Periodic Table, m is 2, n is 2 and $R^1$ is a bicycloaliphatic hydrocarbon group of 4 to 20 carbon atoms which may have at least one substituent group and in which the two alicyclic rings are bonded to each other by the sharing of one or two carbon atoms.

It is also preferred that the olefin polymerization catalyst comprise a transition metal compound (A) represented by the formula (III) wherein $R^1$ is a bicycloaliphatic hydrocarbon group of 4 to 20 carbon atoms which may have at least one substituent group and in which the two alicyclic rings are bonded to each other by the sharing of two carbon atoms.

It is more preferable in the invention that the olefin polymerization catalyst comprise a transition metal compound (A) represented by the formula (III) wherein M is a zirconium atom, and $R^1$ is a bridged bicycloaliphatic hydrocarbon group of 5 to 20 carbon atoms which may have at least one substituent group and in which the two alicyclic rings are bonded to each other by the sharing of two carbon atoms.

Also preferably, the olefin polymerization catalyst of the invention comprises the transition metal compound (A) represented by the above formula (I), (II) or (III) and at least one compound (B) selected from an organometallic compound (B-1), an organoaluminum oxy-compound (B-2) and a compound (B-3) that reacts with the transition metal compound (A) to form an ion pair.

The process for polymerizing olefins according to the invention comprises polymerizing at least one olefin in the presence of the aforesaid olefin polymerization catalyst.

The low-molecular-weight ethylene polymer produced in the present invention is a low-molecular-weight ethylene (co)polymer comprising ethylene alone or ethylene and an α-olefin of 3 to 10 carbon atoms, which (co)polymer contains a vinyl or vinylidene double bond at one terminal.

Examples of the α-olefin having 3 to 10 carbon atoms include propylene, 1-butene, 3-methyl-1-butene, 1-pentene, 1-hexene, 4-methyl-1-pentene, 4-methyl-1-pentene, 3-methyl-1-pentene, 1-octene and 1-decene, which can be used singly or in combination. Of these, propylene and 1-butene are preferable.

The low-molecular-weight ethylene polymer contains structural units derived from ethylene in an amount of 81 to 100% by mole, preferably 90 to 100% by mole, particularly preferably 94 to 100% by mole, and structural units derived from the α-olefin of 3 to 10 carbon atoms in an amount of 0 to 19% by mole, preferably 0 to 10% by mole, more preferably 0 to 6% by mole.

The low-molecular-weight ethylene (co)polymer has an intrinsic viscosity [η], as measured at 135° C. in decalin, of 0.39 dl/g or less, preferably 0.25 dl/g or less. The low-molecular-weight ethylene (co)polymer has a weight-average molecular weight (Mw), as measured by a gel permeation chromatography (GPC), of 7000 or less, preferably 5000 or less.

The low-molecular-weight ethylene polymer has a molecular weight distribution (Mw/Mn), a ratio of a weight-average molecular weight (Mw) to a number-average molecular weight (Mn) determined by a gel permeation chromatography (GPC), of 1.1 to 2.5, preferably 1.2 to 2.2.

The weight-average molecular weight (Mw) and the number-average molecular weight (Mn) are determined by use of GPC-150 (produced by MILLIPORE, Co.) through the following procedure.

The measurement is carried out using a separatory column TSK-GNH-HT having a diameter of 7.5 mm and a length of 300 mm at a column temperature of 140° C. A sample, 500 microliters, having a concentration of 0.1% by weight is moved at a rate of 1.0 ml/min using orthodichlorobenzene (Wako Pure Chemical Industries, Ltd.) as a mobile phase and 0.025% by weight of BHT (Takeda Chemical Industries, Ltd.) as an antioxidant. A differential refractometer is used as a detector. A standard polystyrene used for the measurement is available from Toso Corporation.

The low-molecular-weight ethylene polymer has a content of the vinyl or vinylidene double bond, determined by $^1$H-NMR or IR, of at least 90%, preferably at least 94% to the total one-side terminals (such a content will be referred to as "double-bond content" or "degree of vinylation at one terminal" hereinafter).

The $^1$H-NMR spectrum is obtained as follows.

In a sample tube, a polymer is completely dissolved in orthodichlorobenzene containing a small amount of deuterated benzene as a lock solvent, and the measurement is conducted at 120° C. With respect to the chemical shift, peaks are determined based on the peak of tetramethylsilane as 0 ppm.

The double-bond content of the low-molecular-weight polymer comprising ethylene alone can be determined based on its $^1$H-NMR. The peaks of hydrogen of the polymer are 0.65 to 0.85 ppm for the peak (A) derived from the terminal saturated methyl group, and 4.85 to 5.0 ppm and 5.5 to 5.8 ppm for the peaks (B) and (C), respectively, derived from the terminal vinyl groups. When the areas of the peaks (A), (B) and (C) are put $S_A$, $S_B$ and $S_C$, respectively, the double-bond content (U %) can be calculated by the following formula.

$$U(\%) = \frac{(S_B + S_C)/3}{S_A/3} \times 200$$

In the above formula, the numerator indicates the area of the peaks derived from the terminal vinyl groups, and the denominator indicates the area of the peak derived from the terminal methyl group. The content of terminal vinyl group and terminal vinylidene group of an ethylene/α-olefin copolymer can be determined by the method disclosed in JP-A-2001/2731.

The one-terminal vinyl or vinylidene group in the polymer chain of the low-molecular-weight ethylene copolymer can be modified into an oxygen-containing group, a nitrogen-containing group, a boron-containing group, a sulfur-containing group, a phosphorus-containing group, a silicon-containing group, a germanium-containing group, a halogen-containing group or a tin-containing group by treatment with at least one compound selected from an epoxidizing agent, a sulfonating agent, maleic anhydride, a derivative thereof, a hydroboration agent, organoaluminum hydride, a silylating agent and a halogenating agent. Examples of the epoxidizing agent used as a modifier in this invention include formic acid-hydrogen peroxide ($H_2O_2$) and m-chloroperbenzoic acid. Examples of the sulfonating agent include sulfuric acid-acetic anhydride. Examples of the hydroboration agent include diborane, trimethylborane and 9-borane-bicyclo[3.3.1]nonane. Examples of the organoaluminum hydride include diisobutylaluminum hydride. Examples of the silylating agent include triethoxysilyl hydride/$H_2PtCl_2$ and trimethoxysilyl hydride/$H_2PtCl_2$. Examples of the halogenating agent include hydrogen bromide, hydrogen chloride and hydrogen iodide.

Specific modifying conditions (such as temperature, time, catalyst type, catalyst amount, etc.) in use of these modifying agents can be based on the conditions specified in Die Makromolecular Chemie Makromolecular Symposia (Page 48–49, 317–332)(1991).

For example, oligomers which have an oxygen-containing group and which is modified with maleic anhydride at the terminal, and oligomers containing an amido group and an amine group, are suitable as a paint additive and a pigment dispersant to impart thixotropy. Oligomers having a silicon-containing group or a tin-containing group are suitable as a slip agent for vinyl chloride resins, an engineering plastic lubricant and a paper treating agent.

The paint modifier of the invention comprises the low-molecular-weight ethylene polymer which may have been modified at the terminal. This paint modifier is excellent in matte effects and can improve abrasion resistance of coatings. Specifically, the paint modifier enables woodworking paints to have a luxurious appearance and have improved service durability.

The lustering agent of the invention comprises the low-molecular-weight ethylene polymer which may have been modified at the terminal. This lustering agent can impart high gloss and improve coating properties. Specifically, the lustering agent can improve performances of car waxes and floor polishes.

The release agent for molded article of the invention comprises the low-molecular-weight ethylene polymer which may have been modified at the terminal. This release agent imparts releasability to thermoplastic resins and thermosetting resins, and thereby enables improving the resin molding cycle.

The rubber processing aid comprises the low-molecular-weight ethylene polymer which may have been modified at the terminal. This aid can impart excellent releasability and fluidity to rubbers and improve dispersion of fillers and pigments. Specifically, the aid can improve the molding cycle and extrusion properties of rubbers.

The improver for paper quality of the invention comprises the low-molecular-weight ethylene polymer which may have been modified at the terminal. This improver for paper quality enhances moisture-barrier properties, gloss, surface hardness, anti-block properties and abrasion resistance. Specifically, the improver for paper quality can impart luxuriousness and service durability.

The improver for abrasion resistance of printing inks comprises the low-molecular-weight ethylene polymer which may have been modified at the terminal. This improver for abrasion resistance imparts abrasion resistance and heat resistance to inked surfaces. Specifically, the improver for abrasion resistance enables maintaining freshness on inked surfaces.

The textile processing aid comprises the low-molecular-weight ethylene polymer which may have been modified at the terminal. This aid imparts flexibility and lubricity to fibers coated with resins containing the aid. Specifically, this aid enables high-speed sewing operation and high tensile strength of fibers coated with resins containing the aid.

The hot melt additive of the invention comprises the low-molecular-weight ethylene polymer which may have been modified at the terminal. This additive imparts heat resistance and fluidity to hot melt adhesives. Specifically, the additive can enhance performances of the hot melt adhesives in fields where the heat resistance is required, such as automobiles and building materials.

The electric insulation agent comprises the low-molecular-weight ethylene polymer which may have been modified at the terminal. This electric insulation agent is excellent in electrical properties and has a high melting point. Specifically, the electric insulation agent can improve electrical insulating properties of film condensers.

The compound agent for natural waxes comprises the low-molecular-weight ethylene polymer which may have been modified at the terminal. This compound agent enhances surface hardness and raises a melting point of natural waxes. Specifically, the compound agent improves properties of crayons and candles.

The anti-fogging agent for polyolefin films comprises the low-molecular-weight ethylene polymer which may have been modified at the terminal. This anti-fogging agent is excellent in compatibility with resins and can suppress bleeding out of resins on a film surface. Specifically, the anti-fogging agent improves service durability of films.

The toner release agent of the invention comprises the low-molecular-weight ethylene polymer which may have been modified at the terminal. This toner release agent imparts offset properties to toners in offset printing with a fixed roller. Specifically, the toner release agent can improve clearness of printed images.

The pigment dispersant comprises the low-molecular-weight ethylene polymer which may have been modified at the terminal. This pigment dispersant is excellent in wetting with various pigments and can improve service durability of pigments. Specifically, the pigment dispersant enables masterbatching of pigments at high concentrations.

The slip agent for vinyl chloride resins comprises the low-molecular-weight ethylene polymer which may have been modified at the terminal. This slip agent is excellent in balance of properties and has durability. Specifically, the slip agent improves productivity and contributes to reduction of electric power consumption.

The low-molecular-weight ethylene polymer of the invention and the modified product thereof can be, as a macromonomer, homopolymerized or copolymerized with ethylene and at least one olefin selected from α-olefins of 3 to 10 carbon atoms, or can be otherwise subjected to a coupling reaction. Examples of the α-olefins of 3 to 10 carbon atoms include the α-olefins used in production of the low-molecular-weight ethylene polymer. The polymer obtained from the macromonomer such as low-molecular-weight ethylene polymer or modified product thereof is a novel polymer with a new skeleton. This novel polymer itself and resin compositions containing the polymer can find various uses. For example, the polymer can be copolymerized with ethylene to give a long-chain branched polyethylene in which the branched-chain number and the molecular weight of the branched portions are freely controlled. In copolymerization of ethylene and an α-olefin to produce a non-crystalline polymer, crystalline portions and non-crystalline portions can coexist in one polymer molecule by copolymerizing an α-olefin with polyethylene as a macromonomer. The copolymer thus-produced is of high-performance, and can be incorporated, as a polypropylene resin modifier, in a polypropylene resin in an amount of 1 to 30 parts by weight to the resin to give a resin composition.

BEST MODE FOR CARRYING OUT THE INVENTION

The process for polymerizing olefins of the invention is described in detail hereinafter.

The terminology "polymerization" is used to refer not only to homopolymerization but sometimes to copolymerization. The terminology "polymer" is used to refer not only to homopolymer but sometimes to copolymer.

The olefin polymerization catalyst comprises the transition metal compound (A) represented by any of the above formulae (I) to (III), or the transition metal compound (A) represented by any of the above formulae (I) to (III) and at least one compound (B) selected from an organometallic compound (B-1), an organoaluminum oxy-compound (B-2) and a compound (B-3) that reacts with the transition metal compound (A) to form an ion pair.

Transition Metal Compound (A)

The transition metal compound (A) forming the olefin polymerization catalyst according to the first embodiment of the invention is a compound represented by the following formula (I):

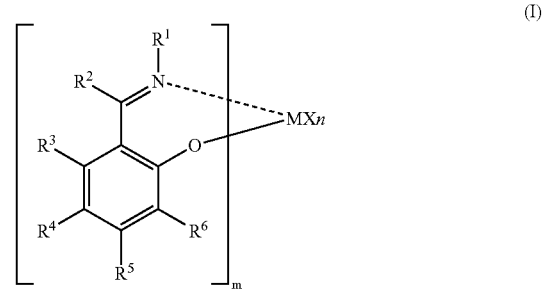

Generally, N - - - M as in the above formula means coordination, but it is not necessarily the case in this invention.

In the formula (I), M is a transition metal of Group 4 or Group 5 of the Periodic Table, specifically titanium, zirconium, hafnium, vanadium, niobium, or tantalum. Preferably, M is a Group-4 metal, such as titanium, zirconium or hafnium, particularly preferably zirconium.

m in the formula is an integer of 1 to 4, preferably 1 or 2, particularly preferably 2.

$R^1$ is a linear hydrocarbon group of 1 to 5 carbon atoms ($C_{n'}H_{2n'+1}$ wherein n' ranges from 1 to 5) or a hydrogen atom. Examples of the linear hydrocarbon group of 1 to 5 carbon atoms indicated by $R^1$ include methyl, ethyl, n-propyl, n-butyl and n-pentyl. Of these, preferred are methyl, ethyl and n-propyl. More preferred as $R^1$ are methyl, ethyl and a hydrogen atom.

$R^2$ to $R^6$, which may be the same or different, are each a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, and two or more of them may be bonded to each other to form a ring.

When m is 2 or greater, two of the groups $R^2$ to $R^6$ may be bonded to each other.

Examples of the halogen atom include fluorine, chlorine, bromine and iodine.

Examples of the hydrocarbon group include linear or branched alkyl groups of 1 to 30, preferably 1 to 20 carbon atoms, such as methyl, ethyl, n-propyl, isopropyl, n-butyl, isobutyl, sec-butyl, t-butyl, neopentyl and n-hexyl;

linear or branched alkenyl groups of 2 to 30, preferably 2 to 20 carbon atoms, such as vinyl, allyl and isopropenyl;

linear or branched alkynyl groups of 2 to 30, preferably 2 to 20 carbon atoms, such as ethynyl and propargyl;

cyclic saturated hydrocarbon groups of 3 to 30, preferably 3 to 20 carbon atoms, such as cyclopropyl, cyclobutyl, cyclopentyl, cyclohexyl and adamantyl;

cyclic unsaturated hydrocarbon groups of 5 to 30 carbon atoms, such as cyclopentadienyl, indenyl and fluorenyl;

aryl groups of 6 to 30, preferably 6 to 20 carbon atoms, such as phenyl, naphthyl, biphenyl, terphenyl, phenanthryl and anthracenyl; and alkyl-substituted aryl groups, such as tolyl, isopropylphenyl, t-butylphenyl, dimethylphenyl and di-t-butylphenyl.

The above hydrocarbon groups may be substituted with a halogen at the hydrogen atom. Examples of such halogenated-hydrocarbon groups include those of 1 to 30, preferably 1 to 20 carbon atoms, such as trifluoromethyl, pentafluorophenyl and chlorophenyl.

Also, the above hydrocarbon groups may be substituted with other hydrocarbon group. Examples of such substituted hydrocarbon groups include aryl-substituted alkyl groups, such as benzyl and cumyl.

Further, the hydrocarbon groups may have a heterocyclic compound residue;

an oxygen-containing group, such as alkoxy, aryloxy, ester, ether, acyl, carboxyl, carbonato, hydroxy, peroxy and carboxylic acid anhydride groups;

a nitrogen-containing group, such as amino, imino, amido, imido, hydrazino, hydrazono, nitro, nitroso, cyano, isocyano, cyanato, amidino and diazo groups, and an ammonium salt of amino group;

a boron-containing group, such as boranediyl, boranetriyl and diboranyl groups;

a sulfur-containing group, such as mercapto, thioester, dithioester, alkylthio, arylthio, thioacyl, thioether, thiocyanato, isocyanato, sulfonato, sulfonamido, thiocarboxyl, dithiocarboxyl, sulfo, sulfonyl, sulfinyl and sulfenyl groups;

a phosphorus-containing group, such as phosphido, phosphoryl, thiophosphoryl and phosphate groups;

a silicon-containing group; a germanium-containing groups; and a tin-containing group.

Of these, particularly preferable are linear or branched alkyl groups of 1 to 30, preferably 1 to 20 carbon atoms, such as methyl, ethyl, n-propyl, isopropyl, n-butyl, isobutyl, sec-butyl, t-butyl, neopentyl and n-hexyl; aryl groups of 6 to 30, preferably 6 to 20 carbon atoms, such as phenyl, naphthyl, biphenyl, terphenyl, phenanthryl and anthracenyl; and corresponding substituted aryl groups to the above aryl groups, which are substituted with 1 to 5 substituent groups such as a halogen atom, an alkyl or alkoxy group of 1 to 30, preferably 1 to 20 carbon atoms, and an aryl or aryloxy group of 6 to 30, preferably 6 to 20 carbon atoms.

Examples of the oxygen-containing group, nitrogen-containing group, boron-containing group, sulfur-containing group and phosphorus-containing group are as defined above.

Examples of the heterocyclic compound residue include residues of nitrogen-containing compounds, e.g., pyrrole, pyridine, pyrimidine, quinoline and triazine; oxygen-containing compounds, e.g., furan and pyran; and sulfur-containing compounds, e.g., thiophene; and corresponding groups to the above heterocyclic compound residues, which are substituted with a substituent group such as an alkyl or alkoxy group of 1 to 30, preferably 1 to 20 carbon atoms.

Examples of the silicon-containing group include silyl, siloxy, hydrocarbon-substituted silyl and hydrocarbon-substituted siloxy groups, such as methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl and dimethyl(pentafluorophenyl)silyl. Of these, preferable are methylsilyl, dimethylsilyl, trimethylsilyl, ethylsilyl, diethylsilyl, triethylsilyl, dimethylphenylsilyl and triphenylsilyl, and particularly preferable are trimethylsilyl, triethylsilyl, triphenylsilyl and dimethylphenylsilyl. Specific examples of the hydrocarbon-substituted siloxy group include trimethylsiloxy.

Examples of the germanium-containing group and the tin-containing group include corresponding groups to the aforesaid silicon-containing groups in which the silicon is replaced by germanium or tin.

More specific illustration on the groups $R^2$ to $R^6$ is given below.

Examples of the alkoxy group include methoxy, ethoxy, n-propoxy, isopropoxy, n-butoxy, isobutoxy and t-butoxy.

Examples of the alkylthio group include methylthio and ethylthio.

Examples of the aryloxy group include phenoxy, 2,6-dimethylphenoxy and 2,4,6-trimethylphenoxy.

Examples of the arylthio group include phenylthio, methylphenylthio and naphthylthio.

Examples of the acyl group include formyl, acetyl, benzoyl, p-chlorobenzoyl and p-methoxybenzoyl.

Examples of the ester group include acetyloxy, benzoyloxy, methoxycarbonyl, phenoxycarbonyl and p-chlorophenoxycarbonyl.

Examples of the thioester group include acetylthio, benzoylthio, methylthiocarbonyl and phenylthiocarbonyl.

Examples of the amido group include acetamido, N-methylacetamido and N-methylbenzamido.

Examples of the imido group include acetimido and benzimido.

Examples of the amino group include dimethylamino, ethylmethylamino and diphenylamino.

Examples of the imino group include methylimino, ethylimino, propylimino, butylimino and phenylimino.

Examples of the sulfonato group include methylsulfonato, ethylsulfonato and phenylsulfonato.

Examples of the sulfonamido group include phenylsulfonamido, N-methylsulfonamido and N-methyl-p-toluenesulfonamido.

Particularly, $R^6$ is preferably a group selected from branched alkyl groups of 3 to 30, preferably 3 to 20 carbon atoms, such as isopropyl, isobutyl, sec-butyl, tert-butyl and neopentyl; more preferably a group selected from corresponding groups to the above groups wherein the hydrogen is substituted with an aryl group of 6 to 20 carbon atoms, such as phenylethyl, diphenylmethyl, cumyl, diphenylethyl and triphenylmethyl; preferably a group selected from cyclic saturated hydrocarbon groups of 3 to 30, preferably 3 to 20 carbon atoms, such as adamantyl, cyclopropyl, cyclobutyl, cyclopentyl and cyclohexyl. It is also preferable that $R^6$ be an aryl group of 6 to 30, preferably 6 to 20 carbon atoms, such as phenyl, naphthyl, fluorenyl, anthranyl and phenanthryl, or a hydrocarbon-substituted silyl group.

Of the groups $R^2$ to $R^6$, two or more groups, preferably neighboring ones, may be bonded to each other to form an aliphatic ring, an aromatic ring or a hydrocarbon ring containing such a heteroatom as nitrogen. These rings may have a substituent group.

When m is 2 or greater, two of the groups $R^2$ to $R^6$ may be bonded to each other. When m is 2 or greater, each of the groups $R^1$, groups $R^2$, groups $R^3$, groups $R^4$, groups $R^5$ and groups $R^6$ may be the same or different.

The letter n denotes a number satisfying a valence of M, and ranges from 0 to 5, preferably 1 to 4, more preferably 1 to 3.

The letter X denotes a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group. When n is 2 or greater, plural groups X may be the same or different.

Examples of the halogen atom include fluorine, chlorine, bromine and iodine.

Examples of the hydrocarbon group include the same ones as exemplified with respect to $R^2$ to $R^6$. Specifically, there can be mentioned, but not limited to, alkyl groups, such as methyl, ethyl, propyl, butyl, hexyl, octyl, nonyl, dodecyl and eicosyl; cycloalkyl groups of 3 to 30 carbon atoms, such as cyclopentyl, cyclohexyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthryl and phenanthryl. Examples further include halogenated hydrocarbon groups, specifically hydrocarbon groups of 1 to 20 carbon atoms in which at least one hydrogen is substituted with a halogen atom.

Of these, preferable are those of 1 to 20 carbon atoms.

Examples of the heterocyclic compound residue include those exemplified for $R^2$ to $R^6$.

Examples of the oxygen-containing group include the same ones as exemplified for $R^2$ to $R^6$. Specifically, there can be mentioned, but not limited to, hydroxyl groups; alkoxy groups, such as methoxy, ethoxy, propoxy and butoxy; aryloxy groups, such as phenoxy, methylphenoxy, dimethylphenoxy and naphthoxy; arylalkoxy groups, such as phenylmethoxy and phenylethoxy; acetoxy groups; and carbonyl groups.

Examples of the sulfur-containing group include those exemplified with respect to $R^2$ to $R^6$. Specifically, there can be mentioned, but not limited to, sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; sulfinato groups, such as methylsulfinato, phenylsulfinato, benzylsulfinato, p-toluenesulfinato, trimethylbenzenesulfinato and pentafluorobenzenesulfinato; alkylthio groups; and arylthio groups.

Examples of the nitrogen-containing group include those exemplified for $R^2$ to $R^6$. Specifically, there can be mentioned, but not limited to, amino groups; alkylamino groups, such as methylamino, dimethylamino; diethylamino; dipropylamino, dibutylamino and dicyclohexylamino; arylamino groups and alkylarylamino groups, such as phenylamino, diphenylamino, ditolylamino, dinaphthylamino and methylphenylamino.

Examples of the boron-containing group include $BR_4$ (wherein R is a hydrogen atom, an alkyl group, an aryl group which may have a substituent group, a halogen atom, etc.).

Examples of the phosphorus-containing group include without limiting thereto trialkylphosphine groups, such as trimethylphosphine, tributylphosphine and tricyclohexylphosphine; triarylphosphine groups, such as triphenylphosphine and tritolylphosphine; phosphito (phosphido) groups, such as methylphosphito, ethylphosphito and phenylphosphito; sulfonic acid groups; and phosphinic acid groups.

Examples of the silicon-containing group include the same ones as exemplified for $R^2$ to $R^6$. Specifically, there can be mentioned, but not limited to, hydrocarbon-substituted silyl groups, such as phenylsilyl, diphenylsilyl, trimethylsilyl, triethylsilyl, tripropylsilyl, tricyclohexylsilyl, triphenylsilyl, methyldiphenylsilyl, tritolylsilyl and trinaphthylsilyl; hydrocarbon-substituted silylether groups, such as trimethylsilylether; silicon-substituted alkyl groups, such as trimethylsilylmethyl; and silicon-substituted aryl groups, such as trimethylsilylphenyl.

Examples of the germanium-containing group include those exemplified for $R^2$ to $R^6$. Specifically, there can be mentioned corresponding groups to the aforesaid silicon-containing groups in which the silicon is replaced by germanium.

Examples of the tin-containing group include the same ones as mentioned with respect to $R^2$ to $R^6$. Specifically, there can be mentioned corresponding groups to the aforesaid silicon-containing groups in which the silicon is replaced by tin.

Examples of the halogen-containing group include without limiting thereto fluorine-containing groups, such as $PF_6$ and $BF_4$; chlorine-containing groups, such as $ClO_4$ and $SbCl_6$; and iodine-containing groups, such as $IO_4$.

Examples of the aluminum-containing group include $AlR_4$ (wherein R is a hydrogen atom, an alkyl group, an aryl group which may have a substituent group, a halogen atom, etc.), but not limited thereto.

When n is 2 or greater, plural groups X may be the same or different and may be bonded to each other to form a ring.

The transition metal compound (A) forming the olefin polymerization catalyst according to the second embodiment of the invention is a compound represented by the following formula (II):

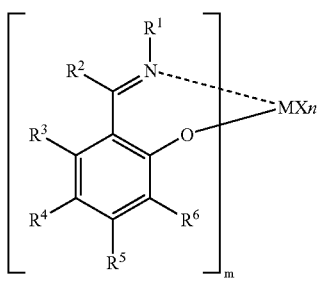

(II)

Generally, N - - - M as in the above formula means coordination, but it is not necessarily the case in this invention.

In the formula (II), M is a transition metal of Group 4 or Group 5 of the Periodic Table, specifically titanium, zirconium, hafnium, vanadium, niobium, or tantalum. Preferably, M is a Group-4 metal, such as titanium, zirconium or hafnium, particularly zirconium.

The letter m in the formula is an integer of 1 to 4, preferably 1 or 2, particularly preferably 2.

$R^1$ is a 3- to 5-membered alicyclic hydrocarbon group which may have at least one substituent group. Examples of the alicyclic hydrocarbon group include cyclopropyl, cyclobutyl and cyclopentyl.

Examples of the substituent group for $R^1$, which are not particularly limited thereto, include a hydrogen atom, a halogen atom, a hydrocarbon group, a hydrocarbon-substituted silyl group, a hydrocarbon-substituted siloxy group, an oxygen-containing group, a sulfur-containing group, a nitrogen-containing group, a phosphorus-containing group, a halogen-containing group, a heterocyclic compound residue, and a hydrocarbon group or a hydrocarbon-substituted silyl group containing any of the above groups.

Specific examples of the substituent group that $R^1$ may have include hydrogen, methyl, ethyl, propyl, methoxymethyl, ethoxymethyl, butoxymethyl, phenoxymethyl, ethoxyethyl, dimethylaminomethyl, dimethylaminoethyl, nitromethyl, nitroethyl, cyanomethyl, cyanoethyl, trimethylsilyl and triethylsilyl.

The 3- to 5-membered alicyclic hydrocarbon group represented by $R^1$, when having two or more substituent groups, is not particularly limited in the position at which the two or more substituent groups are bonded.

$R^2$ to $R^6$, which may be the same or different, are each a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, and two or more of them may be bonded to each other to form a ring.

When m is 2 or greater, two of the groups $R^2$ to $R^6$ may be bonded to each other.

Examples of the halogen atom include fluorine, chlorine, bromine and iodine.

Examples of the hydrocarbon group include linear or branched alkyl groups of 1 to 30, preferably 1 to 20 carbon atoms, such as methyl, ethyl, n-propyl, isopropyl, n-butyl, isobutyl, sec-butyl, t-butyl, neopentyl and n-hexyl;

linear or branched alkenyl groups of 2 to 30, preferably 2 to 20 carbon atoms, such as vinyl, allyl and isopropenyl;

linear or branched alkynyl groups of 2 to 30, preferably 2 to 20 carbon atoms, such as ethynyl and propargyl;

cyclic saturated hydrocarbon groups of 3 to 30, preferably 3 to 20 carbon atoms, such as cyclopropyl, cyclobutyl, cyclopentyl, cyclohexyl and adamantyl;

cyclic unsaturated hydrocarbon groups of 5 to 30 carbon atoms, such as cyclopentadienyl, indenyl and fluorenyl;

aryl groups of 6 to 30, preferably 6 to 20 carbon atoms, such as phenyl, benzyl, naphthyl, biphenyl, terphenyl, phenanthryl and anthracenyl; and alkyl-substituted aryl groups, such as tolyl, isopropylphenyl, t-butylphenyl, dimethylphenyl and di-t-butylphenyl.

The above hydrocarbon groups may be substituted with a halogen at the hydrogen atom. Examples of such halogenated-hydrocarbon groups include those of 1 to 30, preferably 1 to 20 carbon atoms, such as trifluoromethyl, pentafluorophenyl and chlorophenyl.

Also, the above hydrocarbon groups may be substituted with other hydrocarbon group. Examples of such substituted hydrocarbon groups include aryl-substituted alkyl groups, such as benzyl and cumyl.

Further, the hydrocarbon groups may have a heterocyclic compound residue;

an oxygen-containing group, such as alkoxy, aryloxy, ester, ether, acyl, carboxyl, carbonato, hydroxy, peroxy and carboxylic acid anhydride groups;

a nitrogen-containing group, such as amino, imino, amido, imido, hydrazino, hydrazono, nitro, nitroso, cyano, isocyano, cyanato, amidino and diazo groups, and an ammonium salt of amino group;

a boron-containing group, such as boranediyl, boranetriyl and diboranyl groups;

a sulfur-containing group, such as mercapto, thioester, dithioester, alkylthio, arylthio, thioacyl, thioether, thiocyanato, isocyanato, sulfonato, sulfonamido, thiocarboxyl, dithiocarboxyl, sulfo, sulfonyl, sulfinyl and sulfenyl groups;

a phosphorus-containing group, such as phosphido, phosphoryl, thiophosphoryl and phosphato groups;

a silicon-containing group; a germanium-containing groups; and a tin-containing group.

Of these, particularly preferable are linear or branched alkyl groups of 1 to 30, preferably 1 to 20 carbon atoms, such as methyl, ethyl, n-propyl, isopropyl, n-butyl, isobutyl, sec-butyl, t-butyl, neopentyl and n-hexyl; aryl groups of 6 to 30, preferably 6 to 20 carbon atoms, such as phenyl, naphthyl, biphenyl, terphenyl, phenanthryl and anthracenyl; and corresponding substituted aryl groups to the above aryl groups, which are substituted with 1 to 5 substituent groups such as a halogen atom, an alkyl or alkoxy group of 1 to 30, preferably 1 to 20 carbon atoms, and an aryl or aryloxy group of 6 to 30, preferably 6 to 20 carbon atoms.

Examples of the oxygen-containing group, nitrogen-containing group, boron-containing group, sulfur-containing group and phosphorus-containing group are as defined above.

Examples of the heterocyclic compound residue include residues of nitrogen-containing compounds, e.g., pyrrole, pyridine, pyrimidine, quinoline and triazine; oxygen-containing compounds, e.g., furan and pyran; and sulfur-containing compounds, e.g., thiophene; and corresponding groups to the above heterocyclic compound residues, which are substituted with a substituent group such as an alkyl or alkoxy group of 1 to 30, preferably 1 to 20 carbon atoms.

Examples of the silicon-containing group include silyl, siloxy, hydrocarbon-substituted silyl and hydrocarbon-substituted siloxy groups, such as methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl and dimethyl(pentafluorophenyl)silyl. Of these, preferable are methylsilyl, dimethylsilyl, trimethylsilyl, ethylsilyl, diethylsilyl, triethylsilyl, dimethylphenylsilyl and triphenylsilyl, and particularly preferable are trimethylsilyl, triethylsilyl, triphenylsilyl and dimethylphenylsilyl. Specific examples of the hydrocarbon-substituted siloxy group include trimethylsiloxy.

Examples of the germanium-containing group and the tin-containing group include corresponding groups to the aforesaid silicon-containing groups in which the silicon is replaced by germanium or tin.

More specific illustration on the groups $R^2$ to $R^6$ is given below.

Examples of the alkoxy group include methoxy, ethoxy, n-propoxy, isopropoxy, n-butoxy, isobutoxy and t-butoxy.

Examples of the alkylthio group include methylthio and ethylthio.

Examples of the aryloxy group include phenoxy, 2,6-dimethylphenoxy and 2,4,6-trimethylphenoxy.

Examples of the arylthio group include phenylthio, methylphenylthio and naphthylthio.

Examples of the acyl group include formyl, acetyl, benzoyl, p-chlorobenzoyl and p-methoxybenzoyl.

Examples of the ester group include acetyloxy, benzoyloxy, methoxycarbonyl, phenoxycarbonyl and p-chlorophenoxycarbonyl.

Examples of the thioester group include acetylthio, benzoylthio, methylthiocarbonyl and phenylthiocarbonyl.

Examples of the amido group include acetamido, N-methylacetamido and N-methylbenzamido.

Examples of the imido group include acetimido and benzimido.

Examples of the amino group include dimethylamino, ethylmethylamino and diphenylamino.

Examples of the imino group include methylimino, ethylimino, propylimino, butylimino and phenylimino.

Examples of the sulfonato group include methylsulfonato, ethylsulfonato and phenylsulfonato.

Examples of the sulfonamido group include phenylsulfonamido, N-methylsulfonamido and N-methyl-p-toluenesulfonamido.

Particularly, $R^6$ is preferably a group selected from branched alkyl groups of 3 to 30, preferably 3 to 20 carbon atoms, such as isopropyl, isobutyl, sec-butyl, tert-butyl and neopentyl; more preferably a group selected from corresponding groups to the above groups wherein the hydrogen is substituted with an aryl group of 6 to 20 carbon atoms, such as phenylethyl, diphenylmethyl, cumyl, diphenylethyl and triphenylmethyl; preferably a group selected from cyclic saturated hydrocarbon groups of 3 to 30, preferably 3 to 20 carbon atoms, such as adamantyl, cyclopropyl, cyclobutyl, cyclopentyl and cyclohexyl. It is also preferable that $R^6$ be an aryl group of 6 to 30, preferably 6 to 20 carbon atoms, such as phenyl, naphthyl, fluorenyl, anthranyl and phenanthryl, or a hydrocarbon-substituted silyl group.

Of the groups $R^2$ to $R^6$, two or more groups, preferably neighboring ones, may be bonded to each other to form an aliphatic ring, an aromatic ring or a hydrocarbon ring containing such a heteroatom as nitrogen. These rings may have a substituent group.

When m is 2 or greater, two of the groups $R^2$ to $R^6$ may be bonded to each other. When m is 2 or greater, each of the groups $R^1$, groups $R^2$, groups $R^3$, groups $R^4$, groups $R^5$ and groups $R^6$ may be the same or different.

The letter n denotes a number satisfying a valence of M, and ranges from 0 to 5, preferably 1 to 4, more preferably 1 to 3.

The letter X denotes a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group. When n is 2 or greater, plural groups X may be the same or different.

Examples of the halogen atom include fluorine, chlorine, bromine and iodine.

Examples of the hydrocarbon group include the same ones as exemplified with respect to $R^2$ to $R^6$. Specifically, there can be mentioned, but not limited to, alkyl groups, such as methyl, ethyl, propyl, butyl, hexyl, octyl, nonyl, dodecyl and eicosyl; cycloalkyl groups of 3 to 30 carbon atoms, such as cyclopentyl, cyclohexyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthryl and phenanthryl. Examples further include halogenated hydrocarbon groups, specifically hydrocarbon groups of 1 to 20 carbon atoms in which at least one hydrogen is substituted with a halogen atom.

Of these, preferable are those of 1 to 20 carbon atoms.

Examples of the heterocyclic compound residue include those exemplified for $R^2$ to $R^6$.

Examples of the oxygen-containing group include the same ones as exemplified for $R^2$ to $R^6$. Specifically, there can be mentioned, but not limited to, hydroxyl groups; alkoxy groups, such as methoxy, ethoxy, propoxy and butoxy; aryloxy groups, such as phenoxy, methylphenoxy, dimethylphenoxy and naphthoxy; arylalkoxy groups, such as phenylmethoxy and phenylethoxy; acetoxy groups; and carbonyl groups.

Examples of the sulfur-containing group include those exemplified with respect to $R^2$ to $R^6$. Specifically, there can be mentioned, but not limited to, sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; sulfinato groups, such as methylsulfinato, phenylsulfinato, benzylsulfinato, p-toluenesulfinato, trimethylbenzenesulfinato and pentafluorobenzenesulfinato; alkylthio groups; and arylthio groups.

Examples of the nitrogen-containing group include those exemplified for $R^2$ to $R^6$. Specifically, there can be mentioned, but not limited to, amino groups; alkylamino groups, such as methylamino, dimethylamino; diethylamino; dipropylamino, dibutylamino and dicyclohexylamino; arylamino groups and alkylarylamino groups, such as phenylamino, diphenylamino, ditolylamino, dinaphthylamino and methylphenylamino.

Examples of the boron-containing group include $BR_4$ (wherein R is a hydrogen atom, an alkyl group, an aryl group which may have a substituent group, a halogen atom, etc.).

Examples of the phosphorus-containing group include without limiting thereto trialkylphosphine groups, such as trimethylphosphine, tributylphosphine and tricyclohexylphosphine; triarylphosphine groups, such as triphenylphosphine and tritolylphosphine; phosphito (phosphido) groups, such as methylphosphito, ethylphosphito and phenylphosphito; sulfonic acid groups; and phosphinic acid groups.

Examples of the silicon-containing group include the same ones as exemplified for $R^2$ to $R^6$. Specifically, there can be mentioned, but not limited to, hydrocarbon-substituted silyl groups, such as phenylsilyl, diphenylsilyl, trimethylsilyl, triethylsilyl, tripropylsilyl, tricyclohexylsilyl, triphenylsilyl, methyldiphenylsilyl, tritolylsilyl and trinaphthylsilyl; hydrocarbon-substituted silylether groups, such as trimethylsilylether; silicon-substituted alkyl groups, such as trimethylsilylmethyl; and silicon-substituted aryl groups, such as trimethylsilylphenyl.

Examples of the germanium-containing group include those exemplified for $R^2$ to $R^6$. Specifically, there can be mentioned corresponding groups to the aforesaid silicon-containing groups in which the silicon is replaced by germanium.

Examples of the tin-containing group include the same ones as mentioned with respect to $R^2$ to $R^6$. Specifically, there can be mentioned corresponding groups to the aforesaid silicon-containing groups in which the silicon is replaced by tin.

Examples of the halogen-containing group include without limiting thereto fluorine-containing groups, such as $PF_6$ and $BF_4$; chlorine-containing groups, such as $ClO_4$ and $SbCl_6$; and iodine-containing groups, such as $IO_4$.

Examples of the aluminum-containing group include $AlR_4$ (wherein R is a hydrogen atom, an alkyl group, an aryl group which may have a substituent group, a halogen atom, etc.), but not limited thereto.

When n is 2 or greater, plural groups X may be the same or different and may be bonded to each other to form a ring.

The transition metal compound (A) forming the olefin polymerization catalyst according to the third embodiment of the invention is a compound represented by the following formula (III):

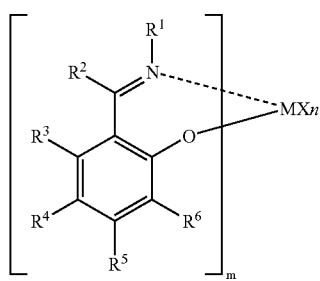

Generally, N - - - M as in the above formula means coordination, but it is not necessarily the case in this invention.

In the formula (III), M is a transition metal of Group 4 or Group 5 of the Periodic Table, specifically titanium, zirconium, hafnium, vanadium, niobium, or tantalum. Preferably, M is a Group-4 metal, such as titanium, zirconium or hafnium, particularly zirconium.

The letter m in the formula is an integer of 1 to 4, preferably 1 or 2, particularly preferably 2.

$R^1$ is a bicycloaliphatic hydrocarbon group of 4 to 20 carbon atoms which may have at least one substituent group and in which the two alicyclic rings are bonded to each other by the sharing of one or more carbon atoms. Examples of the bicycloaliphatic hydrocarbon group include spiro[2.2]pentane, spiro[2.3]hexane, spiro[2.4]heptane, spiro[2.5]octane, spiro[3.3]heptane, spiro[3.4]octane, spiro[3.5]nonane, spiro[4.4]nonane, spiro[4.5]decane, spiro[5.5]undecane, bicyclo[1.1.0]butane, bicyclo[2.1.0]pentane, bicyclo[2.2.0]hexane, bicyclo[3.1.0]hexane, bicyclo[3.2.0]heptane, bicyclo[3.3.0]octane, bicyclo[4.1.0]heptane, bicyclo[4.2.0]octane, bicyclo[4.3.0]nonane, bicyclo[4.4.0]decane, bicyclo[1.1.1]pentane, bicyclo[2.1.1]hexane, bicyclo[2.2.1]heptane, bicyclo[2.2.2]octane, bicyclo[3.1.1]heptane, bicyclo[3.2.1]octane, bicyclo[3.2.2]nonane, bicyclo[3.3.1]nonane, bicyclo[3.3.2]decane and bicyclo[3.3.3]undecane.

Preferably, $R^1$ is a bicycloaliphatic hydrocarbon group of 4 to 20 carbon atoms which may have at least one substituent group and in which the two alicyclic rings are bonded to each other by the sharing of two carbon atoms. Examples of such a bicycloaliphatic hydrocarbon group include bicyclo[1.1.0]butane, bicyclo[2.1.0]pentane, bicyclo[2.2.0]hexane, bicyclo[3.1.0]hexane, bicyclo[3.2.0]heptane, bicyclo[3.3.0]octane, bicyclo[4.1.0]heptane, bicyclo[4.2.0]octane, bicyclo[4.3.0]nonane, bicyclo[4.4.0]decane, bicyclo[1.1.1]pentane, bicyclo[2.1.1]hexane, bicyclo[2.2.1]heptane, bicyclo[2.2.2]octane, bicyclo[3.1.1]heptane, bicyclo[3.2.1]octane, bicyclo[3.2.2]nonane, bicyclo[3.3.1]nonane, bicyclo[3.3.2]decane and bicyclo[3.3.3]undecane.

More preferably, $R^1$ is a bridged bicycloaliphatic hydrocarbon group of 5 to 20 carbon atoms which may have at least one substituent group and in which the two alicyclic rings are bonded to each other by the sharing of two carbon atoms. Examples of such a bicycloaliphatic hydrocarbon group include bicyclo[1.1.1]pentane, bicyclo[2.1.1]hexane, bicyclo[2.2.1]heptane, bicyclo[2.2.2]octane, bicyclo[3.1.1]heptane, bicyclo[3.2.1]octane, bicyclo[3.2.2]nonane, bicyclo[3.3.1]nonane, bicyclo[3.3.2]decane and bicyclo[3.3.3]undecane.

Particularly preferably, $R^1$ is bicyclo[2.2.1]heptane which may have at least one substituent group.

Examples of the substituent group for $R^1$, which are not particularly limited thereto, include a hydrogen atom, a halogen atom, a hydrocarbon group, a hydrocarbon-substituted silyl group, a hydrocarbon-substituted siloxy group, an oxygen-containing group, a sulfur-containing group, a nitrogen-containing group, a phosphorus-containing group, a halogen-containing group, a heterocyclic compound residue, and a hydrocarbon group or a hydrocarbon-substituted silyl group containing any of the above groups.

Specific examples of the substituent group that $R^1$ may have include hydrogen, methyl, ethyl, propyl, methoxymethyl, ethoxymethyl, butoxymethyl, phenoxymethyl, ethoxyethyl, dimethylaminomethyl, dimethylaminoethyl, nitromethyl, nitroethyl, cyanomethyl, cyanoethyl, trimethylsilyl and triethylsilyl.

The bicycloaliphatic hydrocarbon group represented by $R^1$, when having two or more substituent groups, is not particularly limited in the position at which the two or more substituent groups are bonded.

$R^2$ to $R^6$, which may be the same or different, are each a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, and two or more of them may be bonded to each other to form a ring.

When m is 2 or greater, two of the groups $R^2$ to $R^6$ may be bonded to each other.

Examples of the halogen atom include fluorine, chlorine, bromine and iodine.

Examples of the hydrocarbon group include linear or branched alkyl groups of 1 to 30, preferably 1 to 20 carbon atoms, such as methyl, ethyl, n-propyl, isopropyl, n-butyl, isobutyl, sec-butyl, t-butyl, neopentyl and n-hexyl;

linear or branched alkenyl groups of 2 to 30, preferably 2 to 20 carbon atoms, such as vinyl, allyl and isopropenyl;

linear or branched alkynyl groups of 2 to 30, preferably 2 to 20 carbon atoms, such as ethynyl and propargyl;

cyclic saturated hydrocarbon groups of 3 to 30, preferably 3 to 20 carbon atoms, such as cyclopropyl, cyclobutyl, cyclopentyl, cyclohexyl and adamantyl;

cyclic unsaturated hydrocarbon groups of 5 to 30 carbon atoms, such as cyclopentadienyl, indenyl and fluorenyl;

aryl groups of 6 to 30, preferably 6 to 20 carbon atoms, such as phenyl, naphthyl, biphenyl, terphenyl, phenanthryl and anthracenyl; and alkyl-substituted aryl groups, such as tolyl, isopropylphenyl, t-butylphenyl, dimethylphenyl and di-t-butylphenyl.

The above hydrocarbon groups may be substituted with a halogen at the hydrogen atom. Examples of such halogenated-hydrocarbon groups include those of 1 to 30, preferably 1 to 20 carbon atoms, such as trifluoromethyl, pentafluorophenyl and chlorophenyl.

Also, the above hydrocarbon groups may be substituted with other hydrocarbon group. Examples of such substituted hydrocarbon groups include aryl-substituted alkyl groups, such as benzyl and cumyl.

Further, the hydrocarbon groups may have a heterocyclic compound residue;

an oxygen-containing group, such as alkoxy, aryloxy, ester, ether, acyl, carboxyl, carbonato, hydroxy, peroxy and carboxylic acid anhydride groups;

a nitrogen-containing group, such as amino, imino, amido, imido, hydrazino, hydrazono, nitro, nitroso, cyano, isocyano, cyanato, amidino and diazo groups, and an ammonium salt of amino group;

a boron-containing group, such as boranediyl, boranetriyl and diboranyl groups;

a sulfur-containing group, such as mercapto, thioester, dithioester, alkylthio, arylthio, thioacyl, thioether, thiocyanato, isocyanato, sulfonato, sulfonamido, thiocarboxyl, dithiocarboxyl, sulfo, sulfonyl, sulfinyl and sulfenyl groups;

a phosphorus-containing group, such as phosphido, phosphoryl, thiophosphoryl and phosphato groups;

a silicon-containing group; a germanium-containing groups; and a tin-containing group.

Of these, particularly preferable are linear or branched alkyl groups of 1 to 30, preferably 1 to 20 carbon atoms, such as methyl, ethyl, n-propyl, isopropyl, n-butyl, isobutyl, sec-butyl, t-butyl, neopentyl and n-hexyl; aryl groups of 6 to 30, preferably 6 to 20 carbon atoms, such as phenyl, naphthyl, biphenyl, terphenyl, phenanthryl and anthracenyl; and corresponding substituted aryl groups to the above aryl groups, which are substituted with 1 to 5 substituent groups such as a halogen atom, an alkyl or alkoxy group of 1 to 30, preferably 1 to 20 carbon atoms, and an aryl or aryloxy group of 6 to 30, preferably 6 to 20 carbon atoms.

Examples of the oxygen-containing group, nitrogen-containing group, boron-containing group, sulfur-containing group and phosphorus-containing group are as defined above.

Examples of the heterocyclic compound residue include residues of nitrogen-containing compounds, e.g., pyrrole, pyridine, pyrimidine, quinoline and triazine; oxygen-containing compounds, e.g., furan and pyran; and sulfur-containing compounds, e.g., thiophene; and corresponding groups to the above heterocyclic compound residues, which are substituted with a substituent group such as an alkyl or alkoxy group of 1 to 30, preferably 1 to 20 carbon atoms.

Examples of the silicon-containing group include silyl, siloxy, hydrocarbon-substituted silyl and hydrocarbon-substituted siloxy groups, such as methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl and dimethyl(pentafluorophenyl)silyl. Of these, preferable are methylsilyl, dimethylsilyl, trimethylsilyl, ethylsilyl, diethylsilyl, triethylsilyl, dimethylphenylsilyl and triphenylsilyl, and particularly preferable are trimethylsilyl, triethylsilyl, triphenylsilyl and dimethylphenylsilyl. Specific examples of the hydrocarbon-substituted siloxy group include trimethylsiloxy.

Examples of the germanium-containing group and the tin-containing group include corresponding groups to the aforesaid silicon-containing groups in which the silicon is replaced by germanium or tin.

More specific illustration on the groups $R^2$ to $R^6$ is given below.

Examples of the alkoxy group include methoxy, ethoxy, n-propoxy, isopropoxy, n-butoxy, isobutoxy and t-butoxy.

Examples of the alkylthio group include methylthio and ethylthio.

Examples of the aryloxy group include phenoxy, 2,6-dimethylphenoxy and 2,4,6-trimethylphenoxy.

Examples of the arylthio group include phenylthio, methylphenylthio and naphthylthio.

Examples of the acyl group include formyl, acetyl, benzoyl, p-chlorobenzoyl and p-methoxybenzoyl.

Examples of the ester group include acetyloxy, benzoyloxy, methoxycarbonyl, phenoxycarbonyl and p-chlorophenoxycarbonyl.

Examples of the thioester group include acetylthio, benzoylthio, methylthiocarbonyl and phenylthiocarbonyl.

Examples of the amido group include acetamido, N-methylacetamido and N-methylbenzamido.

Examples of the imido group include acetimido and benzimido.

Examples of the amino group include dimethylamino, ethylmethylamino and diphenylamino.

Examples of the imino group include methylimino, ethylimino, propylimino, butylimino and phenylimino.

Examples of the sulfonato group include methylsulfonato, ethylsulfonato and phenylsulfonato.

Examples of the sulfonamido group include phenylsulfonamido, N-methylsulfonamido and N-methyl-p-toluenesulfonamido.

Of the groups $R^2$ to $R^6$, two or more groups, preferably neighboring ones, may be bonded to each other to form an aliphatic ring, an aromatic ring or a hydrocarbon ring containing such a heteroatom as nitrogen. These rings may have a substituent group.

When m is 2 or greater, two of the groups $R^2$ to $R^6$ may be bonded to each other. When m is 2 or greater, each of the groups $R^1$, groups $R^2$, groups $R^3$, groups $R^4$, groups $R^5$ and groups $R^6$ may be the same or different.

The letter n denotes a number satisfying a valence of M, and ranges from 0 to 5, preferably 1 to 4, more preferably 1 to 3.

The letter X denotes a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group. When n is 2 or greater, plural groups X may be the same or different.

Examples of the halogen atom include fluorine, chlorine, bromine and iodine.

Examples of the hydrocarbon group include the same ones as exemplified with respect to $R^2$ to $R^6$. Specifically, there can be mentioned, but not limited to, alkyl groups, such as methyl, ethyl, propyl, butyl, hexyl, octyl, nonyl, dodecyl and eicosyl; cycloalkyl groups of 3 to 30 carbon atoms, such as cyclopentyl, cyclohexyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthryl and phenanthryl. Examples further include halogenated hydrocarbon groups, specifically hydrocarbon groups of 1 to 20 carbon atoms in which at least one hydrogen is substituted with a halogen atom.

Of these, preferable are those of 1 to 20 carbon atoms.

Examples of the heterocyclic compound residue include those exemplified for $R^2$ to $R^6$.

Examples of the oxygen-containing group include the same ones as exemplified for $R^2$ to $R^6$. Specifically, there can be mentioned, but not limited to, hydroxyl groups; alkoxy groups, such as methoxy, ethoxy, propoxy and butoxy; aryloxy groups, such as phenoxy, methylphenoxy, dimethylphenoxy and naphthoxy; arylalkoxy groups, such as phenylmethoxy and phenylethoxy; acetoxy groups; and carbonyl groups.

Examples of the sulfur-containing group include those exemplified with respect to $R^2$ to $R^6$. Specifically, there can be mentioned, but not limited to, sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; sulfinato groups, such as methylsulfinato, phenylsulfinato, benzylsulfinato, p-toluenesulfinato, trimethylbenzenesulfinato and pentafluorobenzenesulfinato; alkylthio groups; and arylthio groups.

Examples of the nitrogen-containing group include those exemplified for $R^2$ to $R^6$. Specifically, there can be mentioned, but not limited to, amino groups; alkylamino groups, such as methylamino, dimethylamino; diethylamino; dipropylamino, dibutylamino and dicyclohexylamino; arylamino groups and alkylarylamino groups, such as phenylamino, diphenylamino, ditolylamino, dinaphthylamino and methylphenylamino.

Examples of the boron-containing group include $BR_4$ (wherein R is a hydrogen atom, an alkyl group, an aryl group which may have a substituent group, a halogen atom, etc.).

Examples of the phosphorus-containing group include without limiting thereto trialkylphosphine groups, such as trimethylphosphine, tributylphosphine and tricyclohexylphosphine; triarylphosphine groups, such as triphenylphosphine and tritolylphosphine; phosphito (phosphido) groups, such as methylphosphito, ethylphosphito and phenylphosphito; sulfonic acid groups; and phosphinic acid groups.

Examples of the silicon-containing group include the same ones as exemplified for $R^2$ to $R^6$. Specifically, there can be mentioned, but not limited to, hydrocarbon-substituted silyl groups, such as phenylsilyl, diphenylsilyl, trimethylsilyl, triethylsilyl, tripropylsilyl, tricyclohexylsilyl, triphenylsilyl, methyldiphenylsilyl, tritolylsilyl and trinaphthylsilyl; hydrocarbon-substituted silylether groups, such as trimethylsilylether; silicon-substituted alkyl groups, such as trimethylsilylmethyl; and silicon-substituted aryl groups, such as trimethylsilylphenyl.

Examples of the germanium-containing group include those exemplified for $R^2$ to $R^6$. Specifically, there can be mentioned corresponding groups to the aforesaid silicon-containing groups in which the silicon is replaced by germanium.

Examples of the tin-containing group include the same ones as mentioned with respect to $R^2$ to $R^6$. Specifically, there can be mentioned corresponding groups to the aforesaid silicon-containing groups in which the silicon is replaced by tin.

Examples of the halogen-containing group include without limiting thereto fluorine-containing groups, such as $PF_6$ and $BF_4$; chlorine-containing groups, such as $ClO_4$ and $SbCl_6$; and iodine-containing groups, such as $IO_4$.

Examples of the aluminum-containing group include $AlR_4$ (wherein R is a hydrogen atom, an alkyl group, an aryl group which may have a substituent group, a halogen atom, etc.), but not limited thereto.

When n is 2 or greater, plural groups X may be the same or different and may be bonded to each other to form a ring.

The following are specific and non-limiting examples of the transition metal compound (A) represented by any of the formulae (I) to (III).

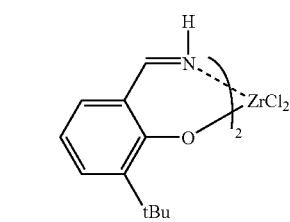

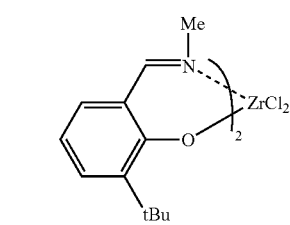

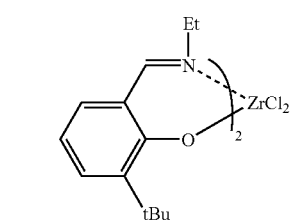

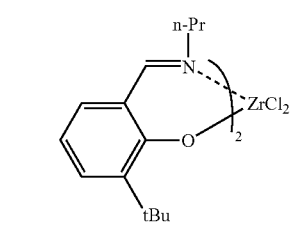

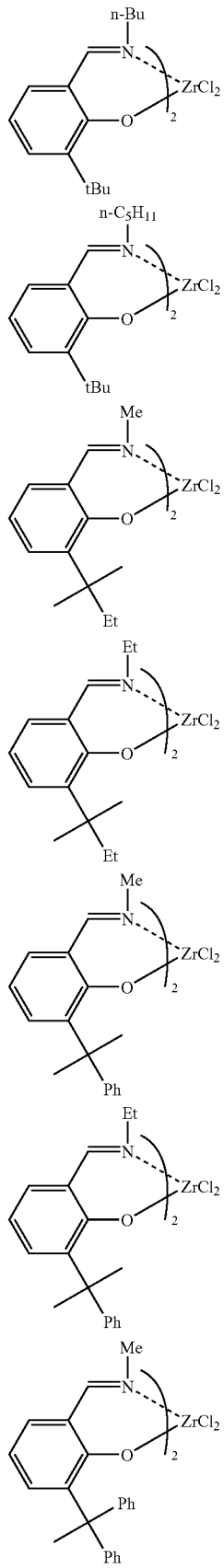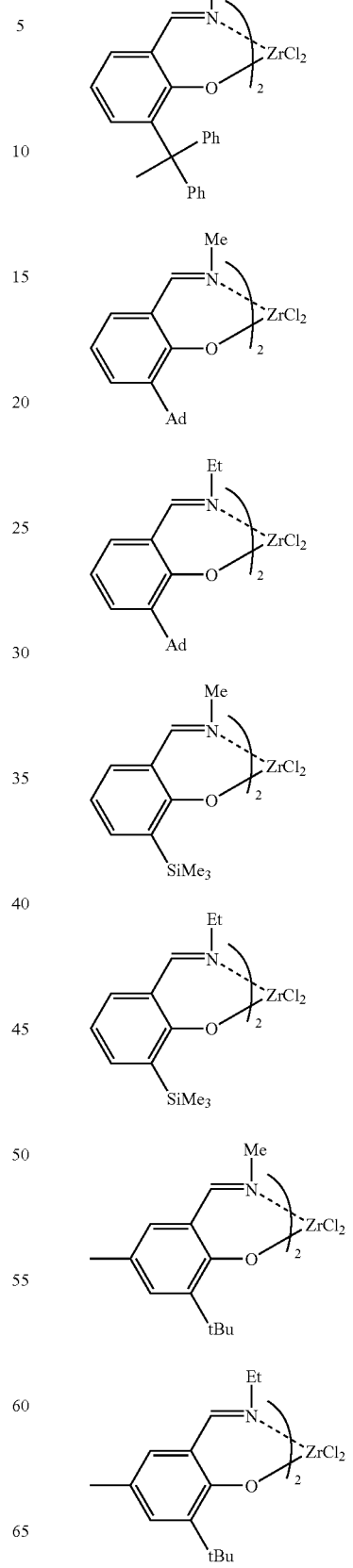

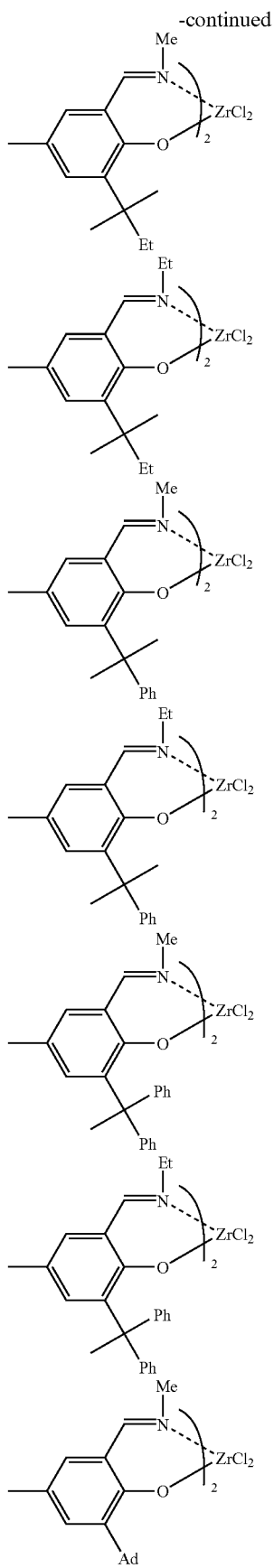
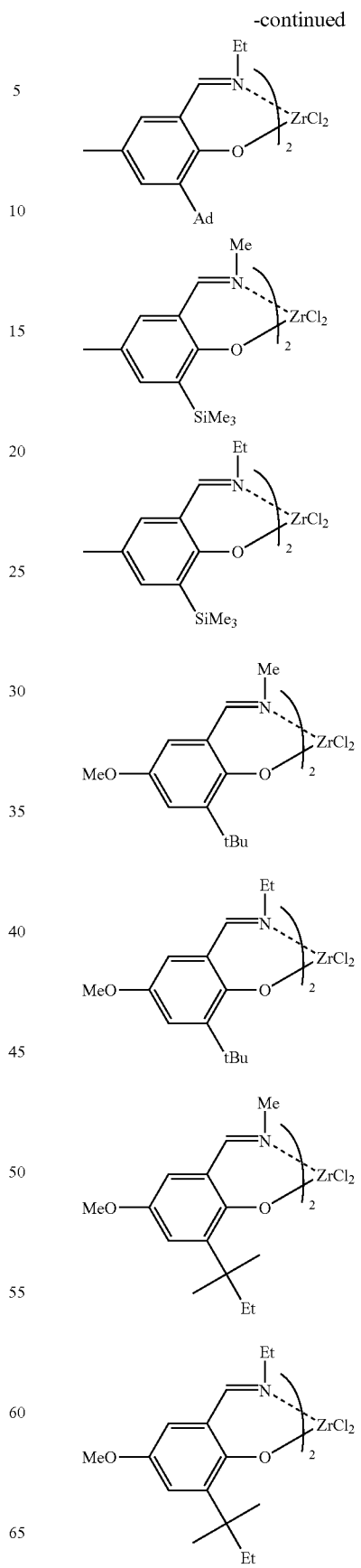

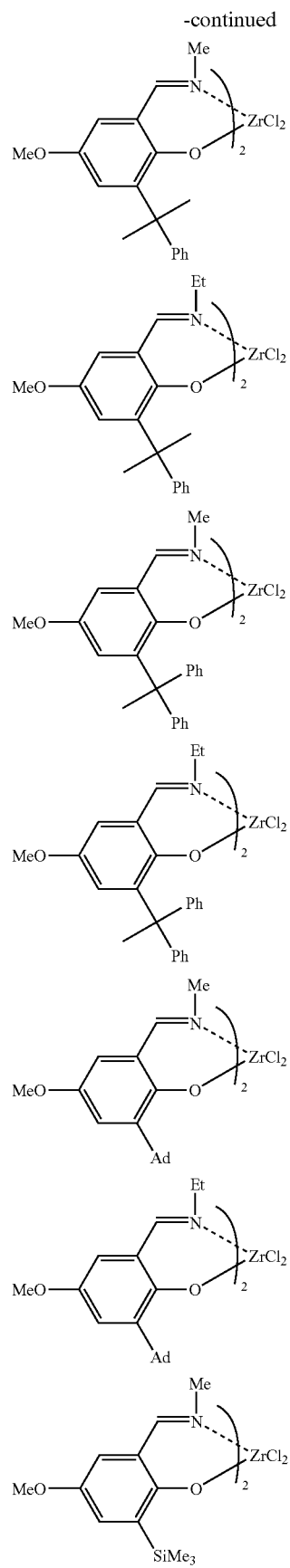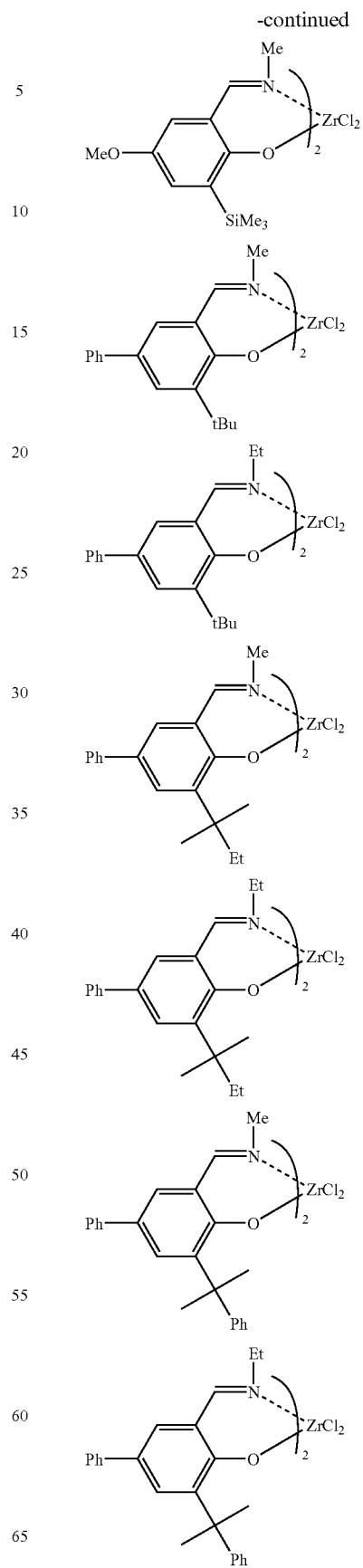

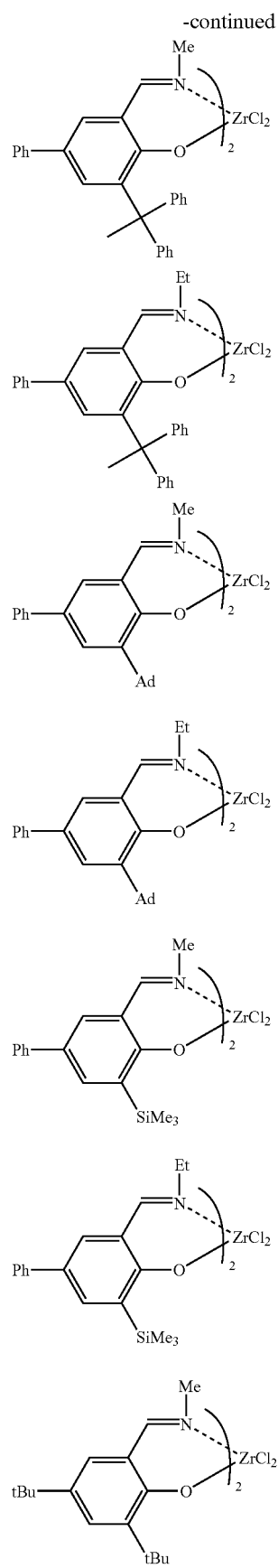

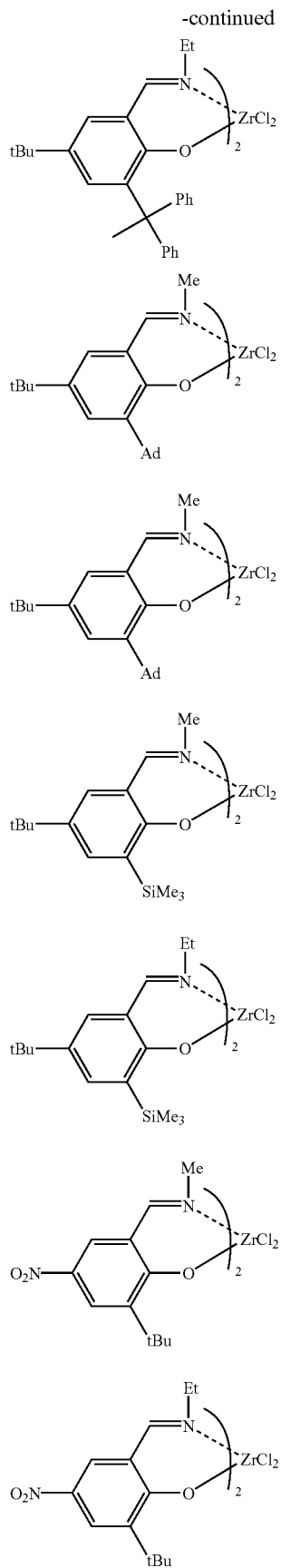

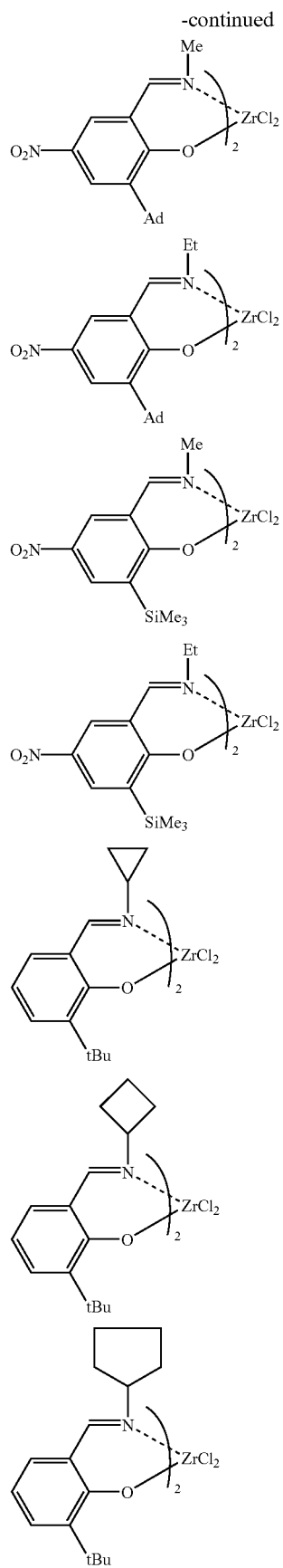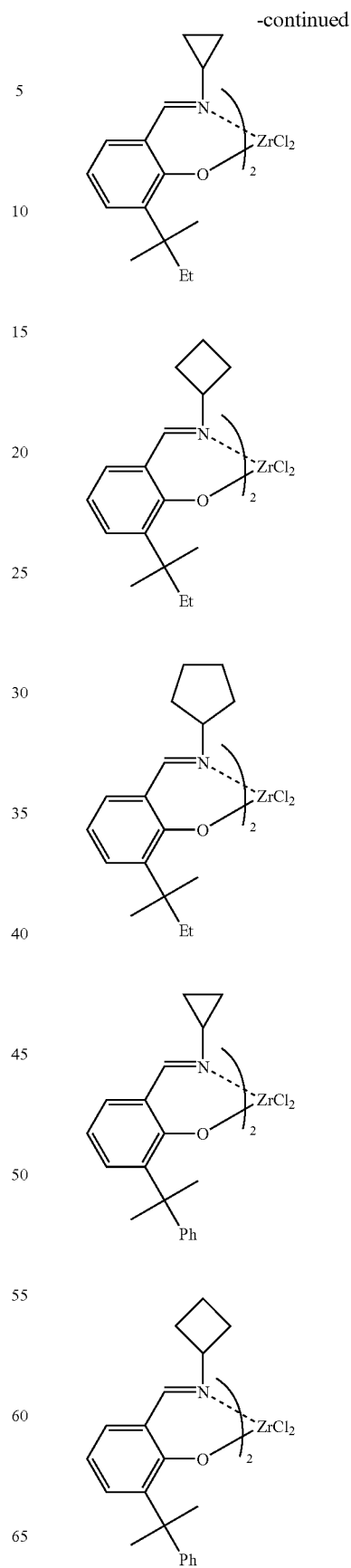

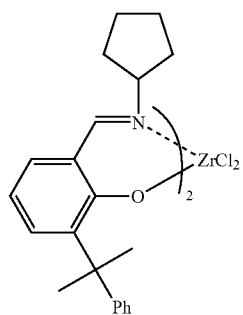
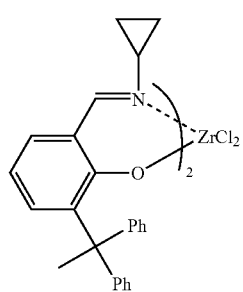
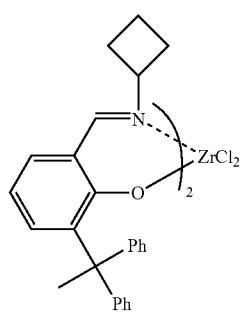
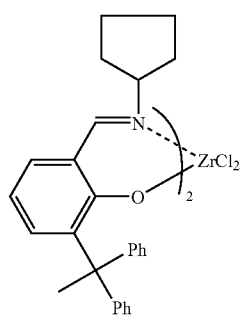
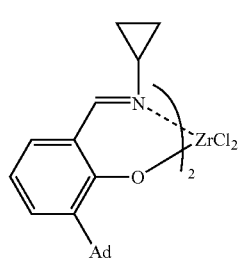
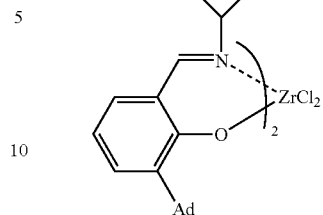
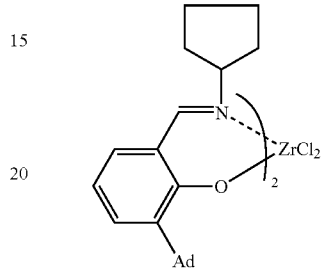
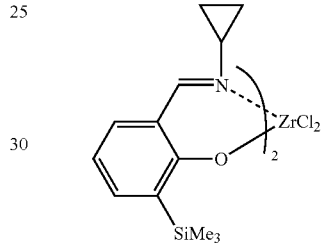
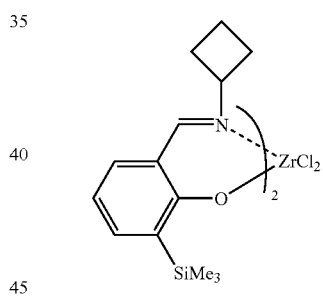
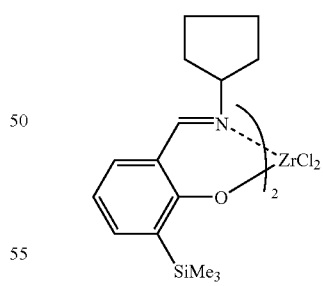
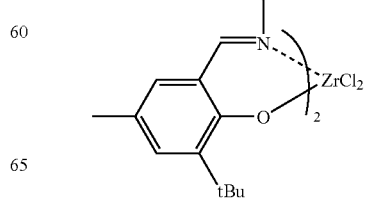

-continued
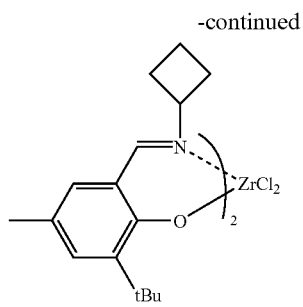
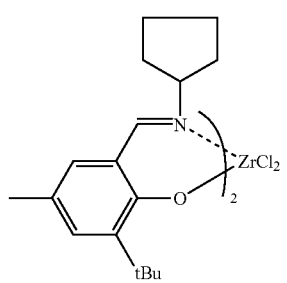
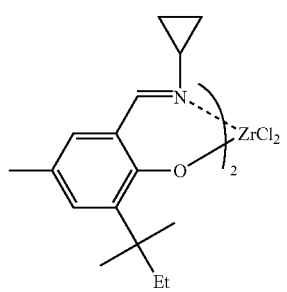
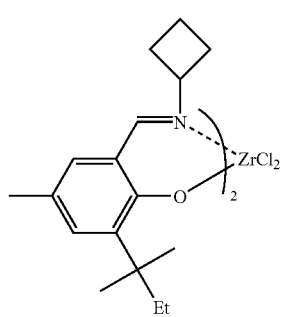
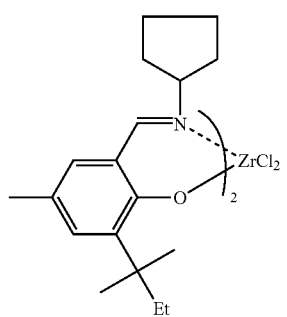
-continued
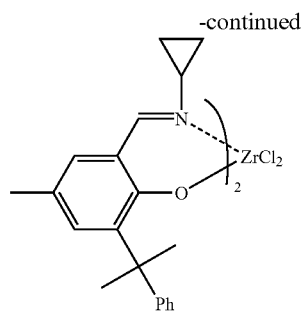
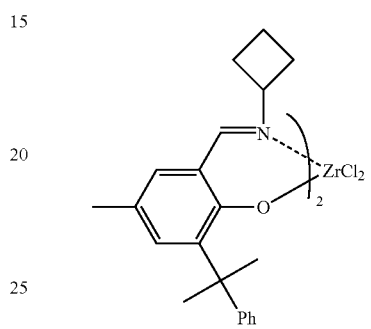
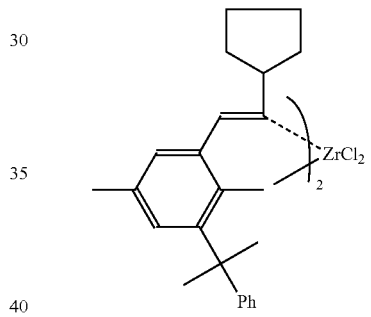
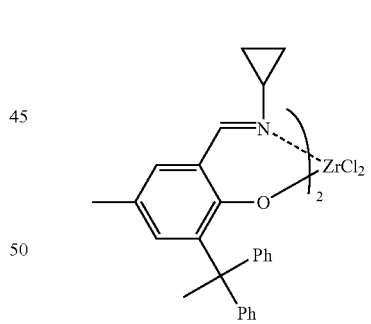
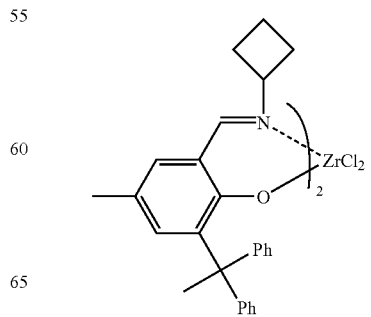

-continued
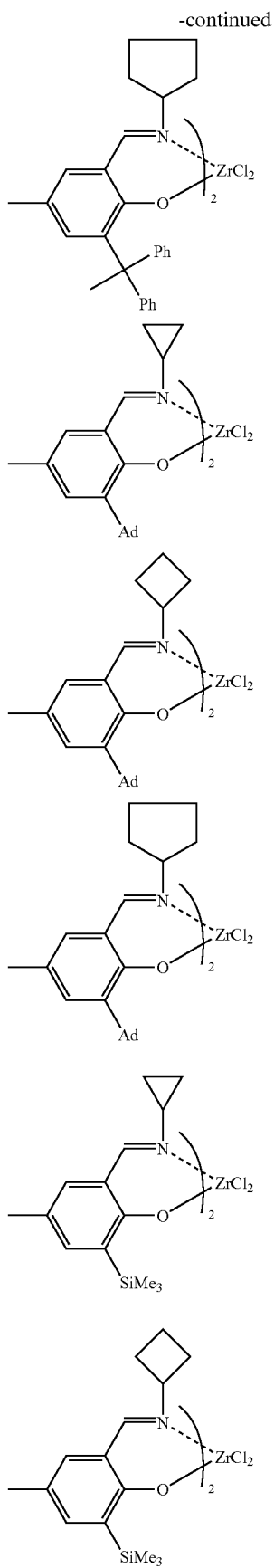
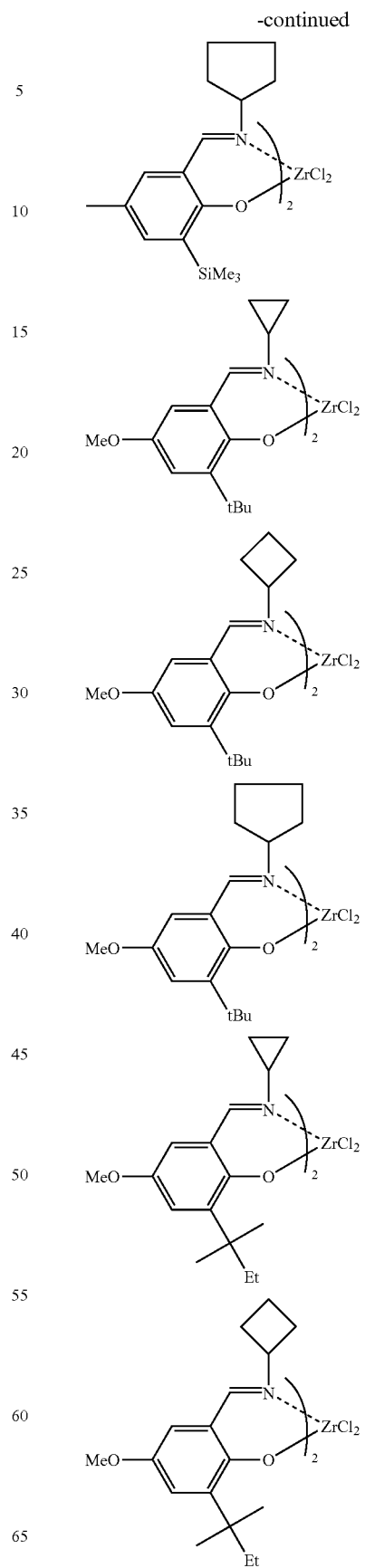

-continued
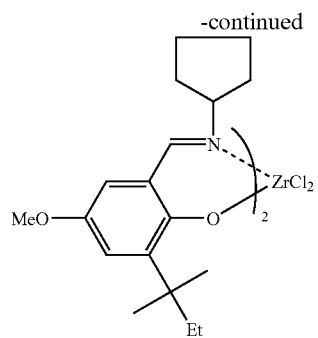
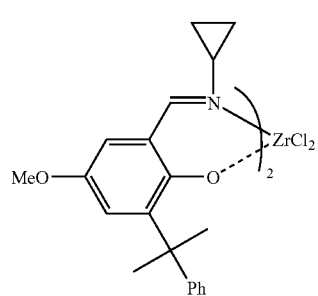
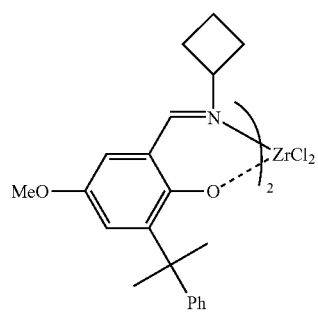
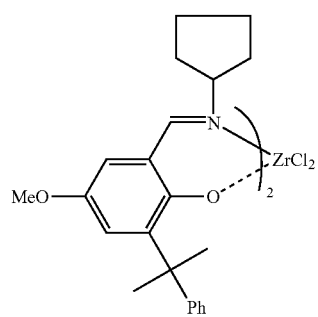
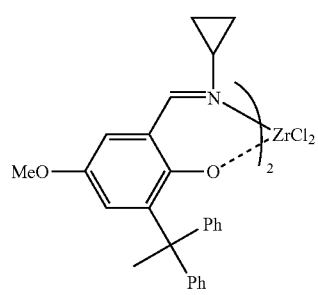
-continued
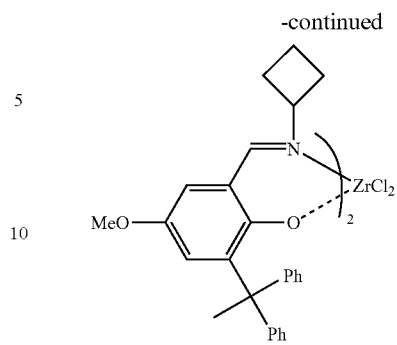
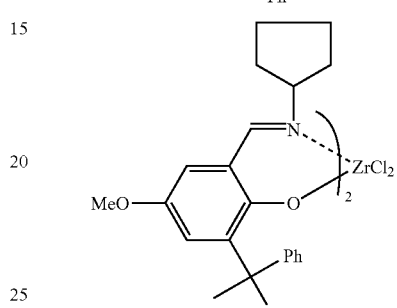
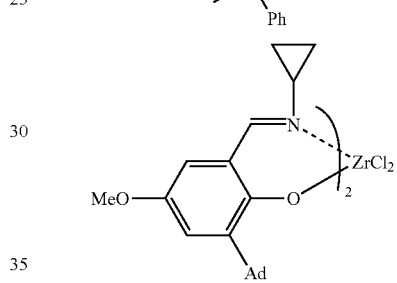
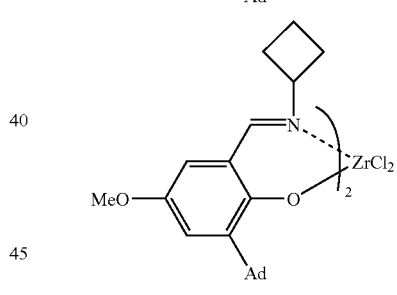
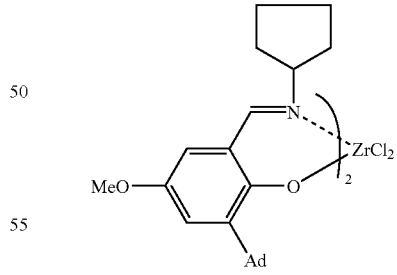
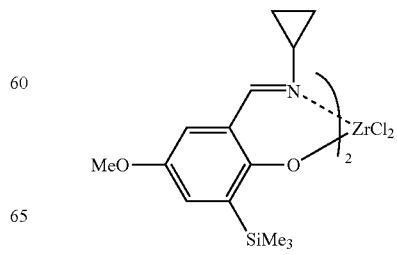

-continued
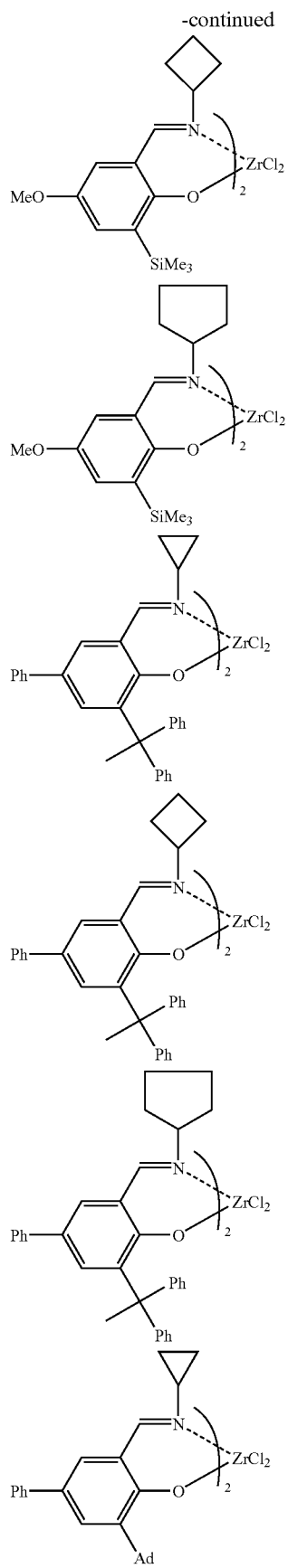
-continued
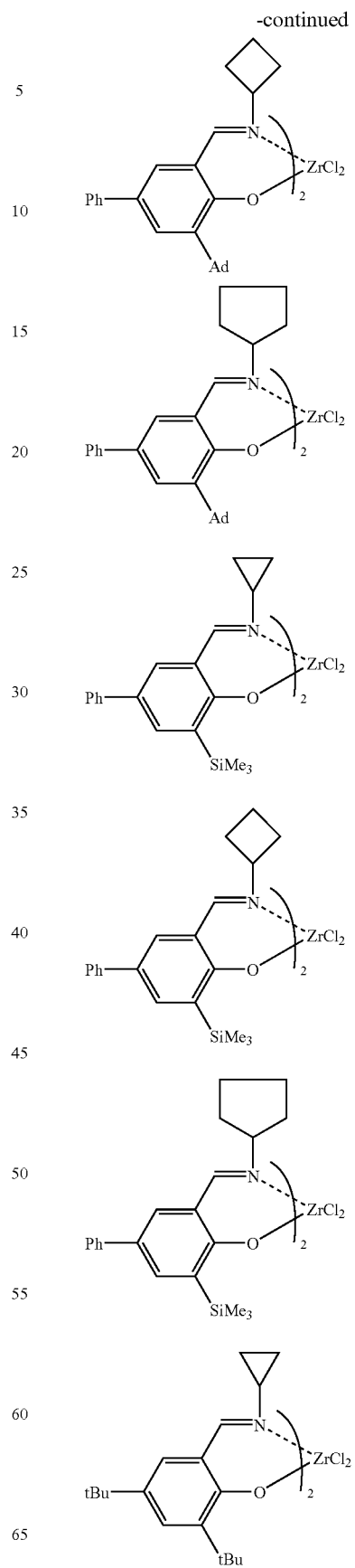

-continued
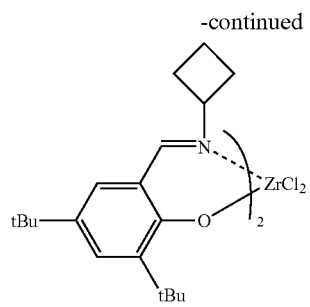
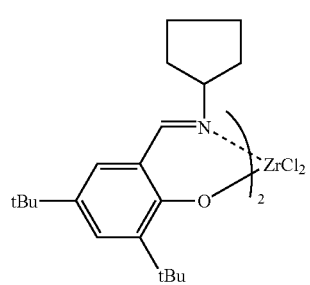
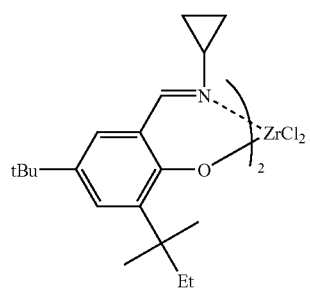
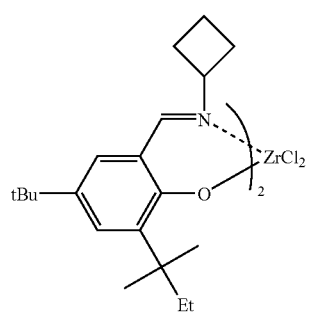
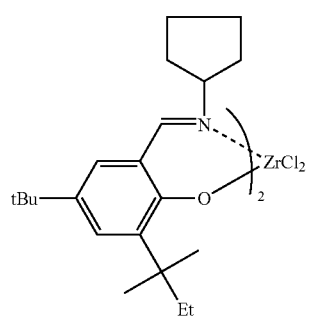
-continued
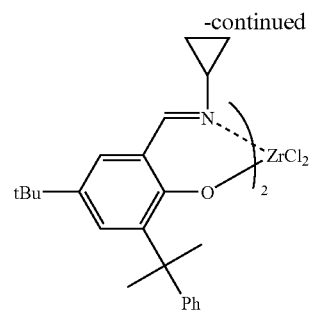
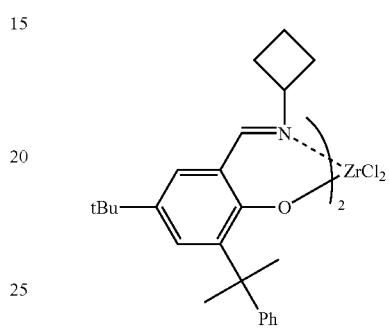
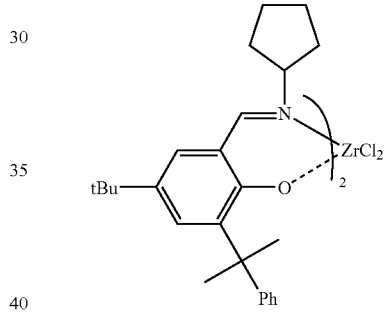
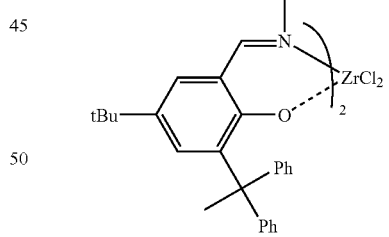
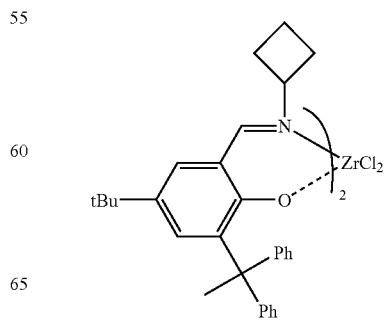

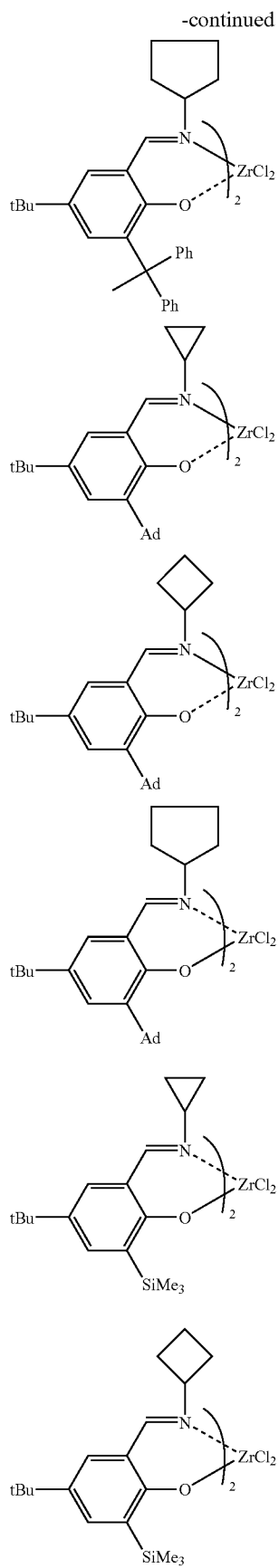
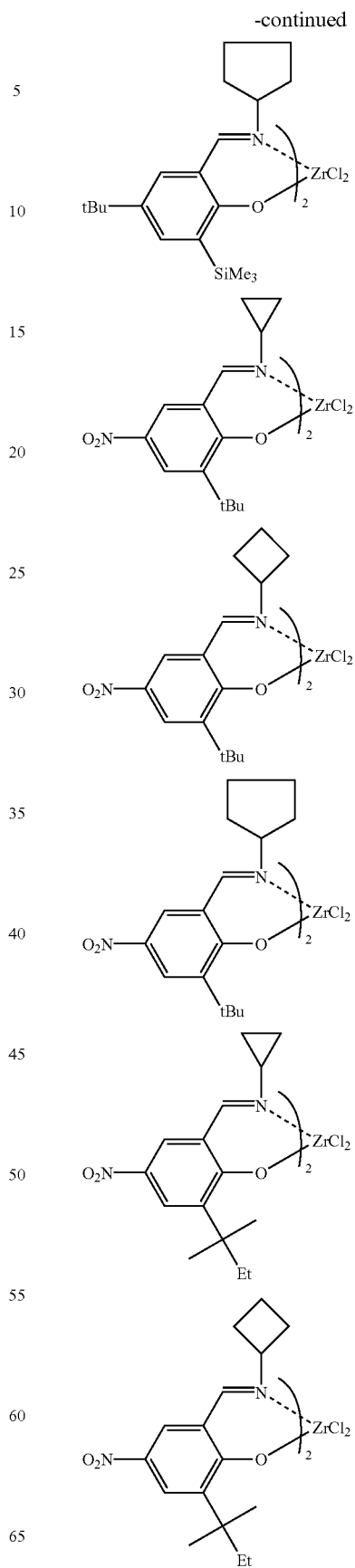

-continued
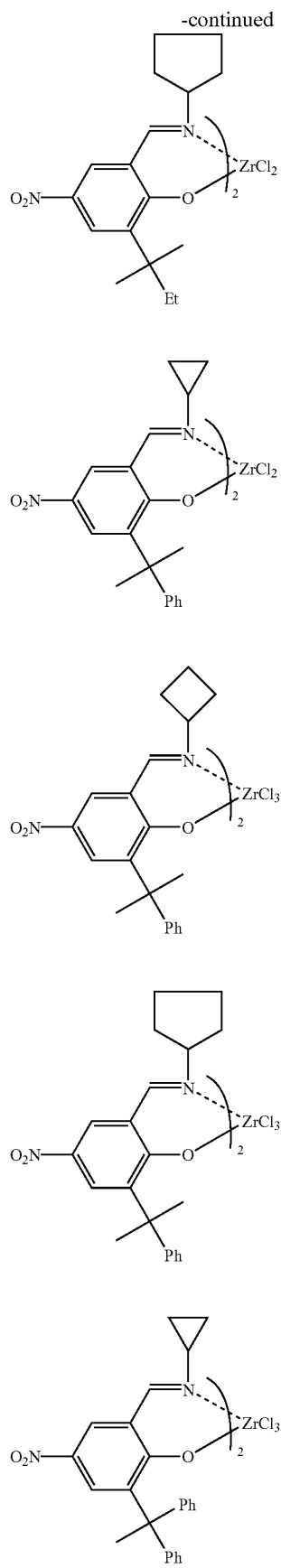
-continued
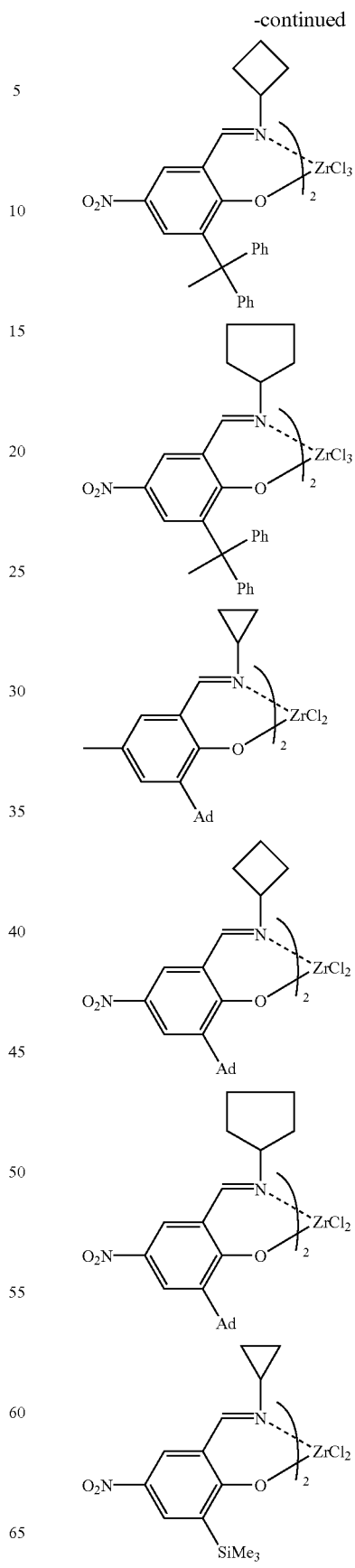

-continued
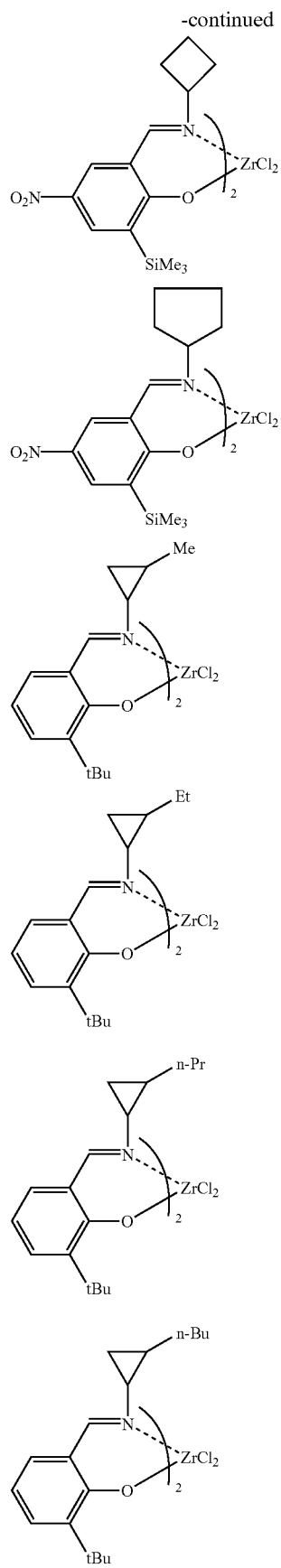
-continued
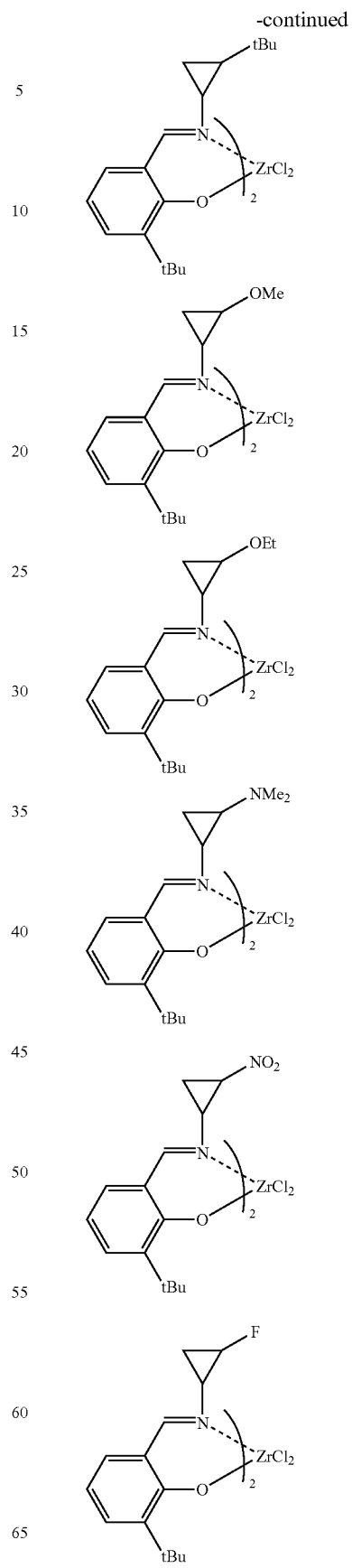

-continued
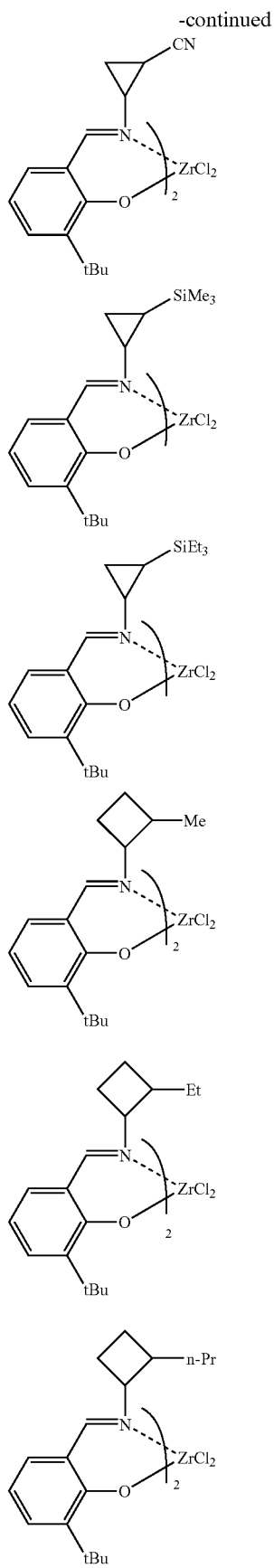
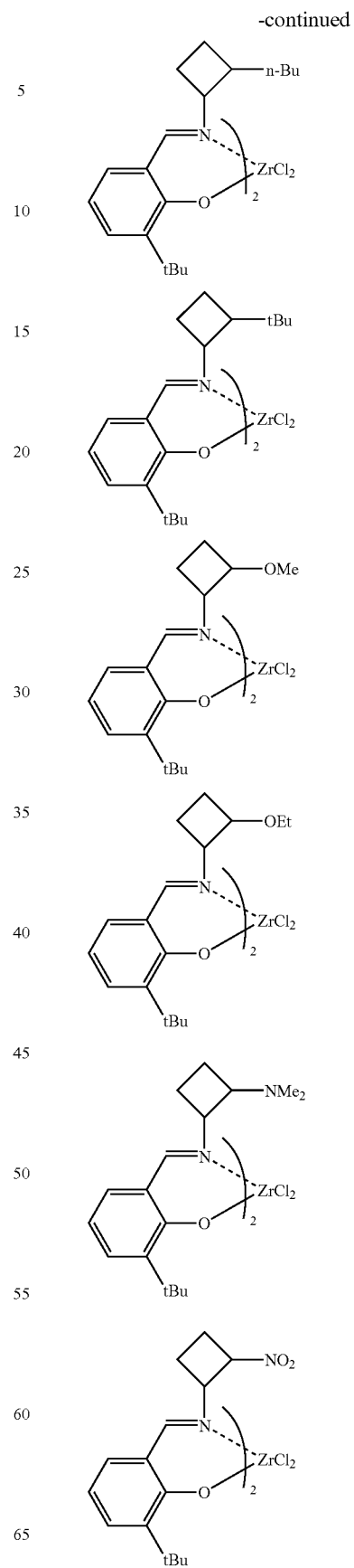

-continued
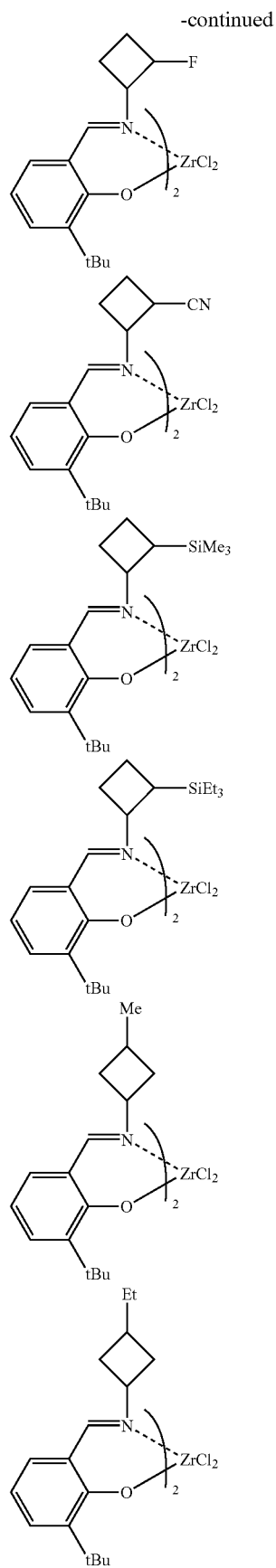
-continued
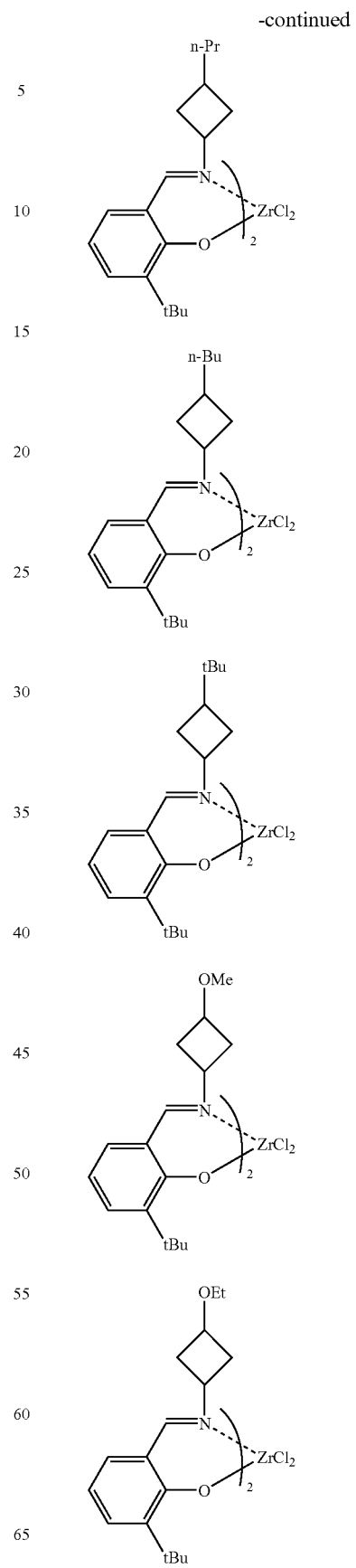

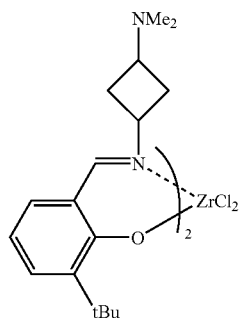
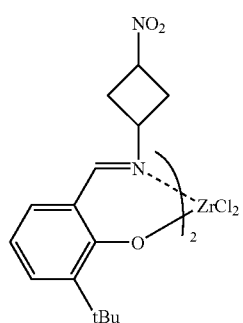
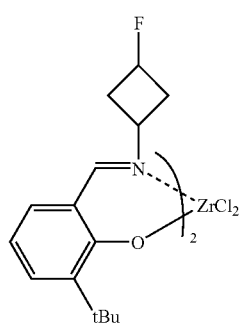
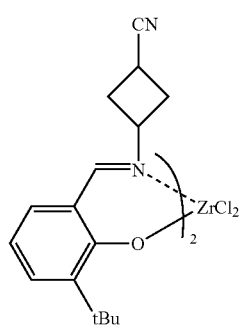
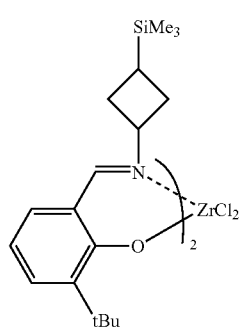
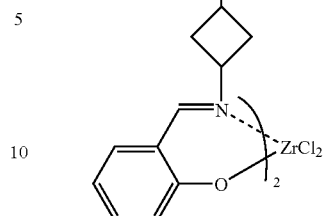
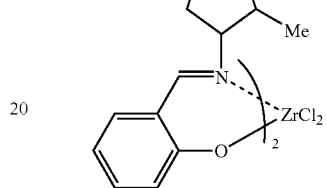
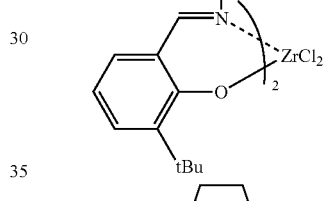
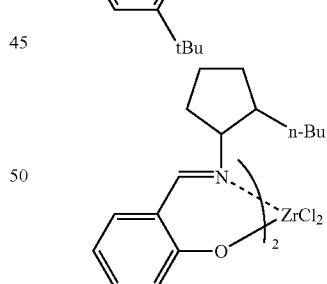
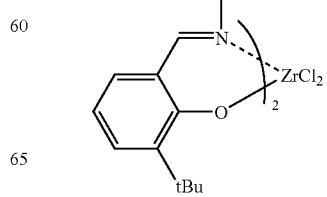

-continued
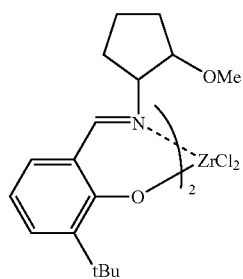
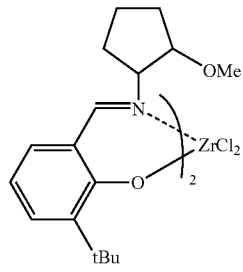
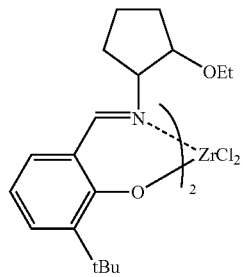
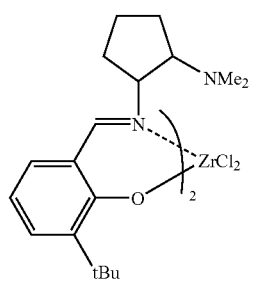
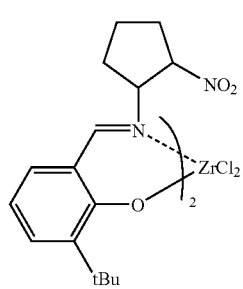
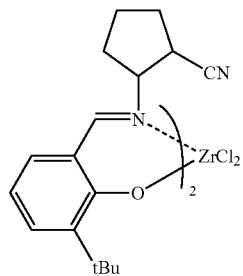
-continued
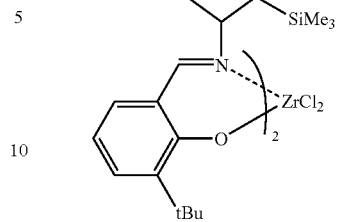
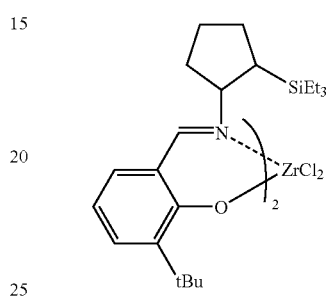
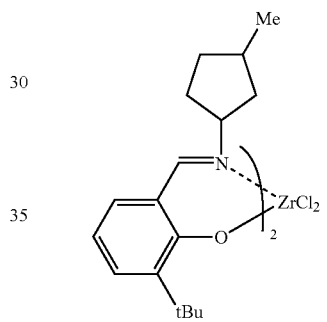
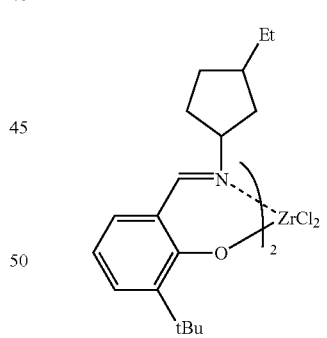
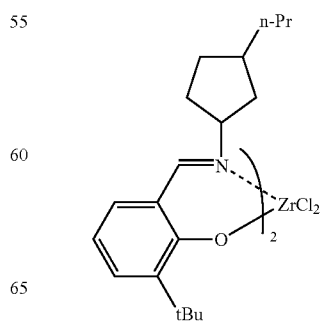

-continued
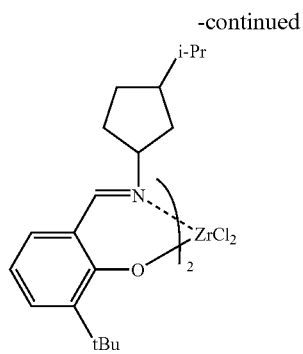
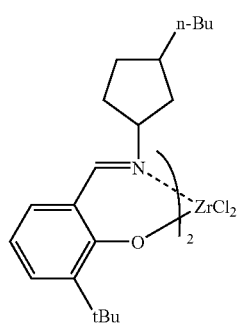
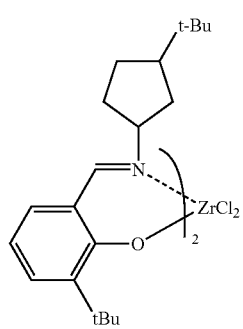
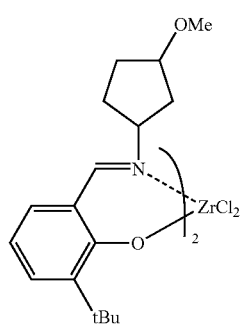
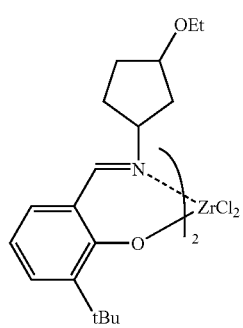
-continued
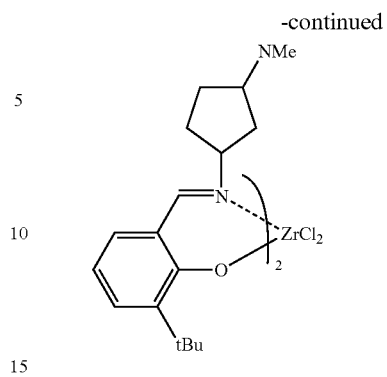
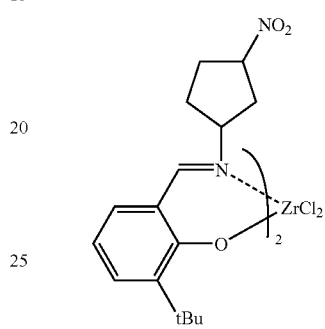
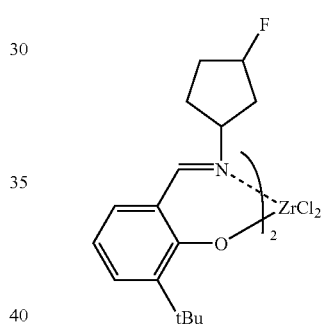
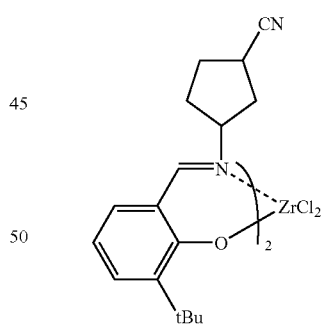
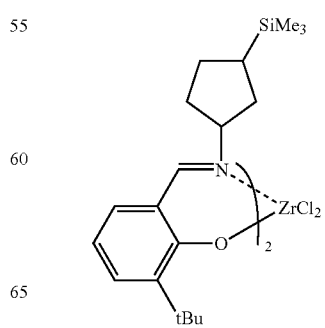

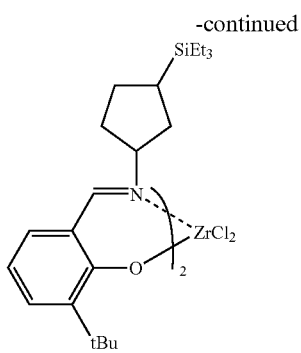
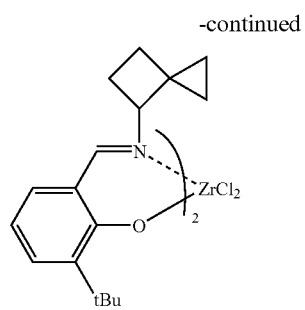
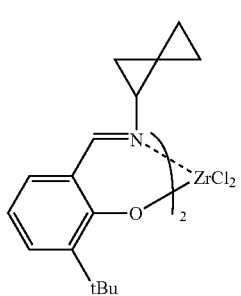
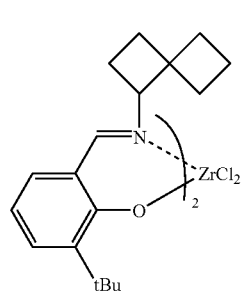
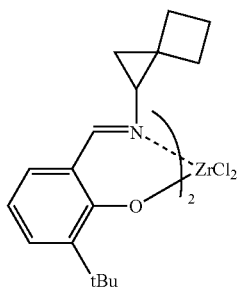
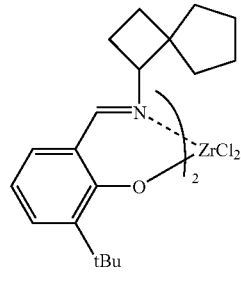
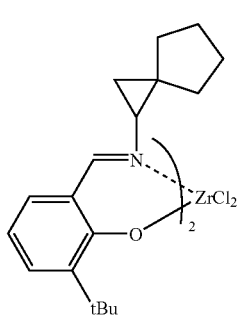
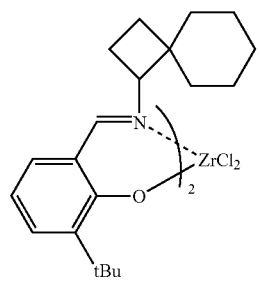
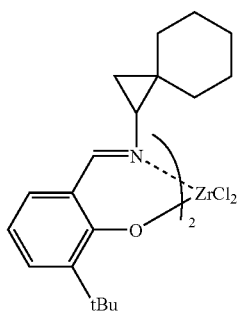
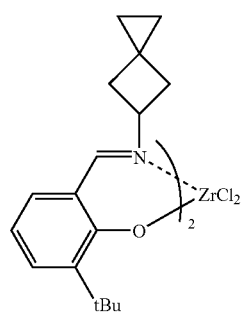

-continued
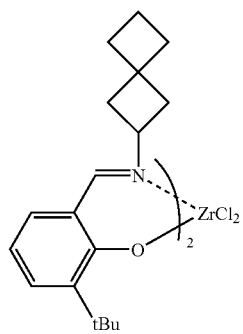
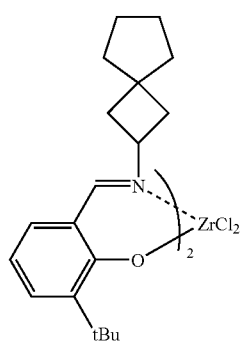
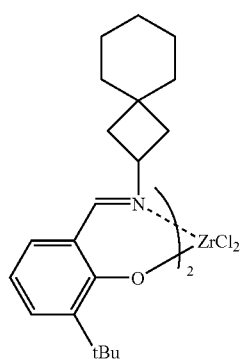
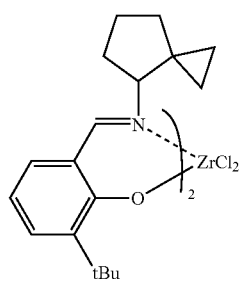
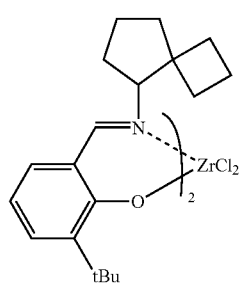
-continued
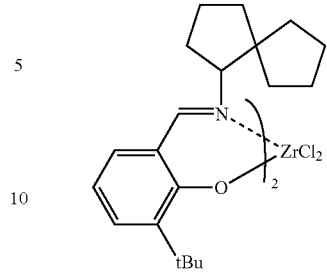
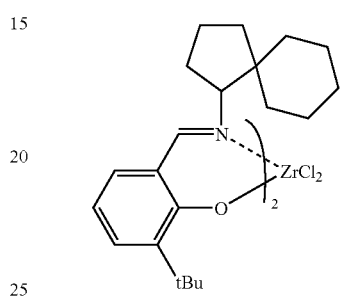
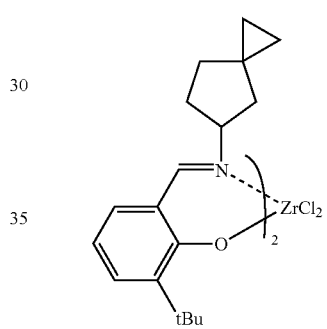
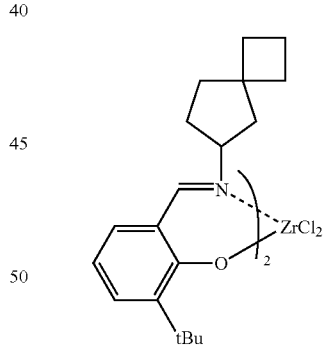
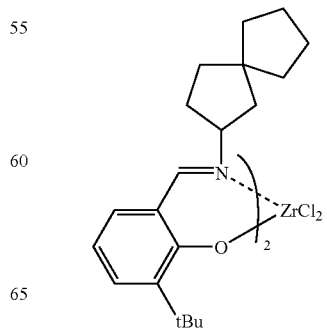

-continued
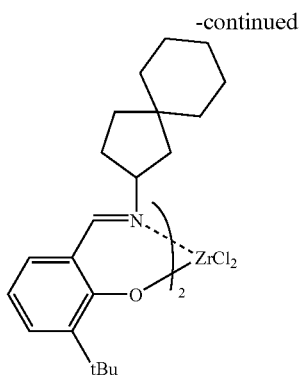
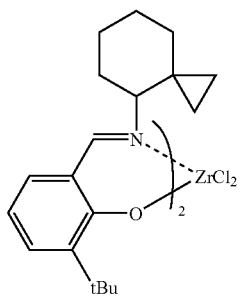
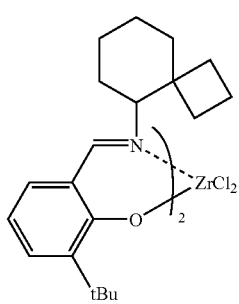
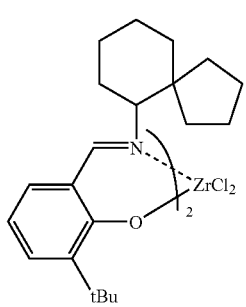
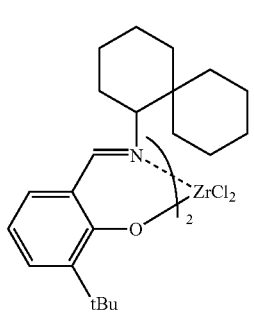

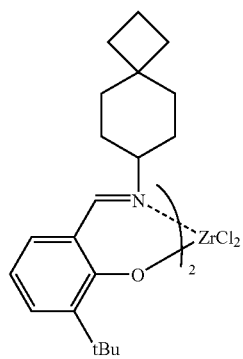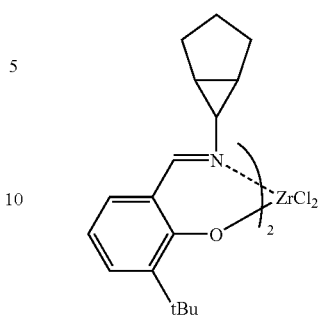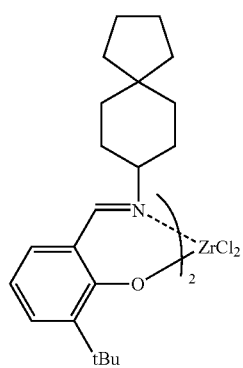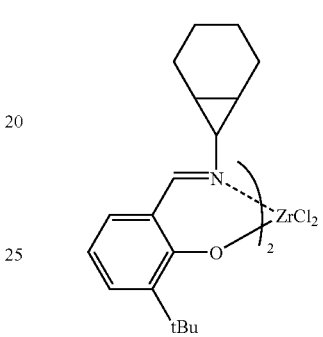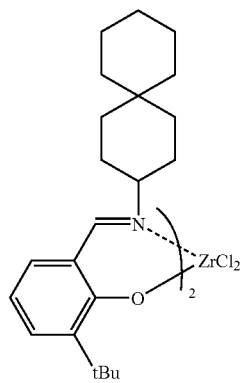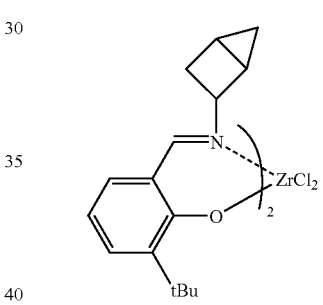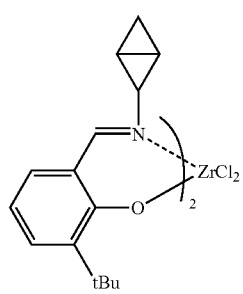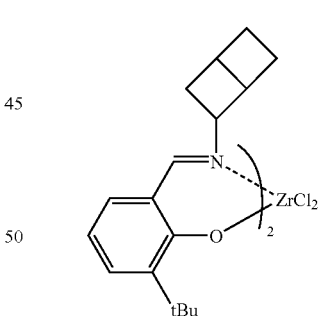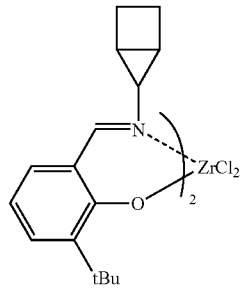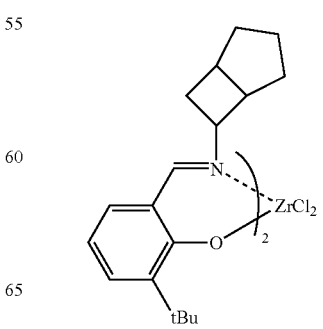

-continued
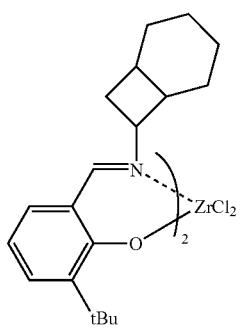
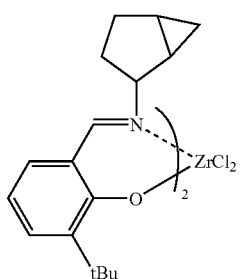
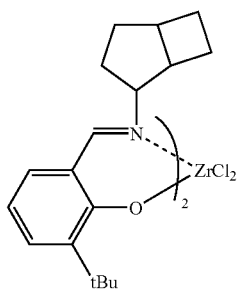
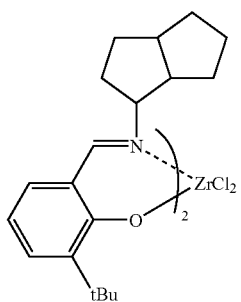
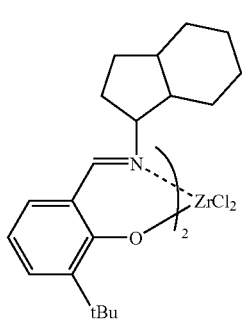
-continued
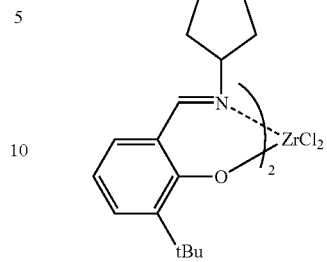
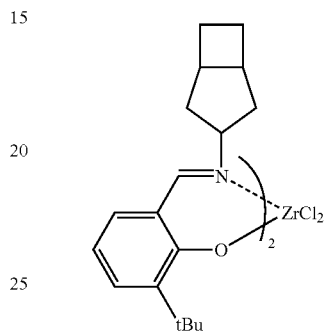
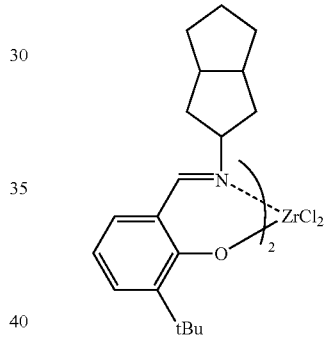
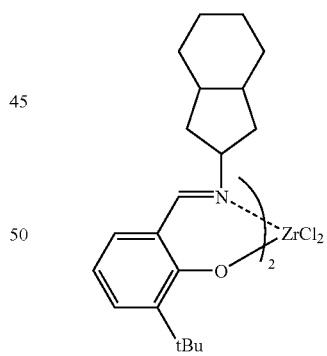
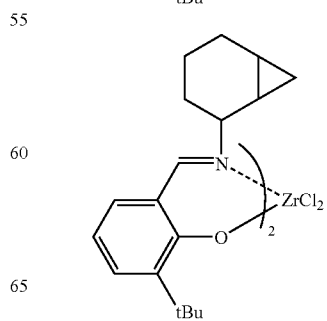

-continued
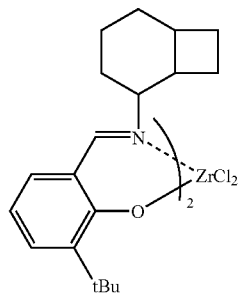
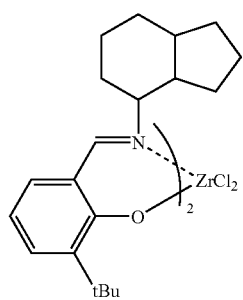
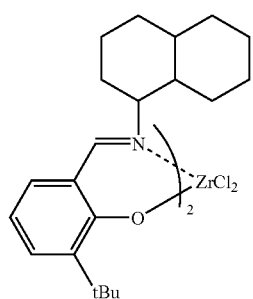
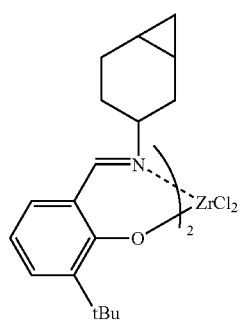
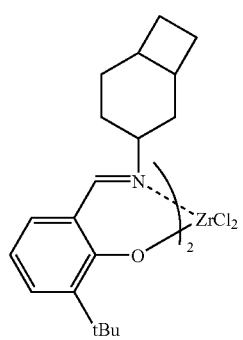
-continued
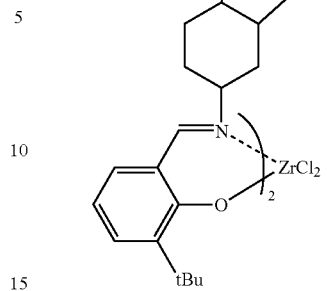
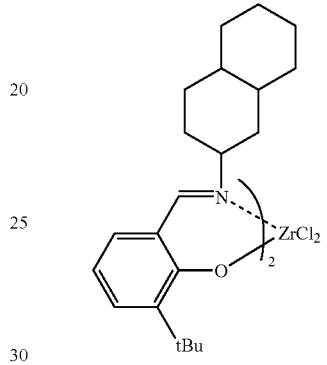
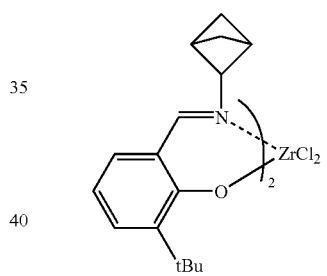
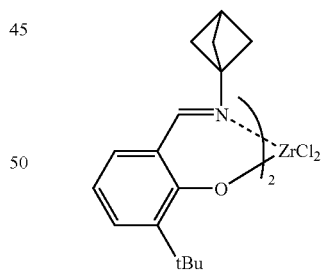
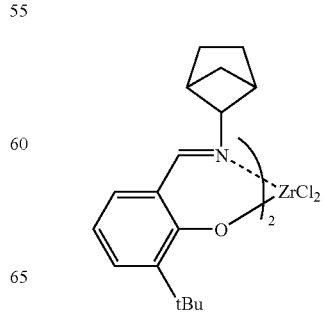

-continued
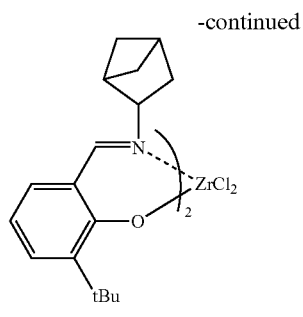
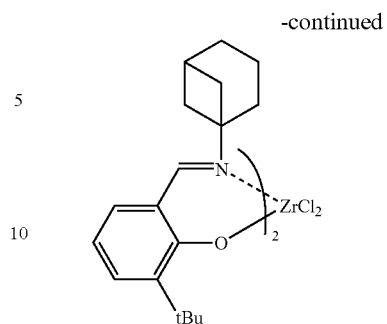
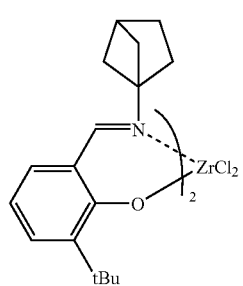
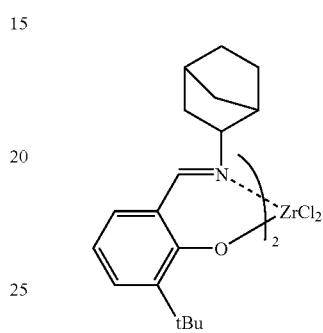
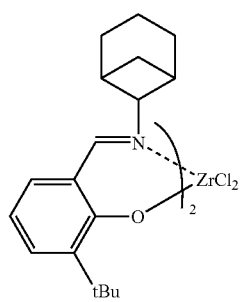
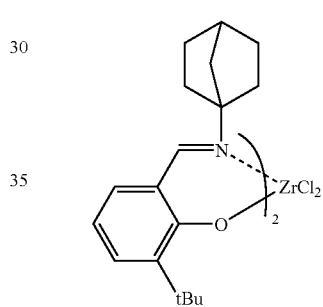
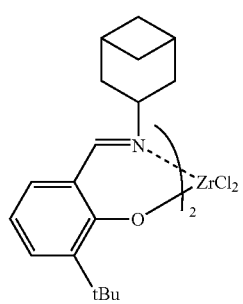
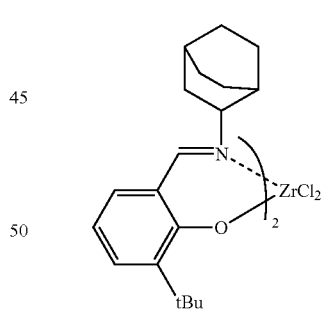
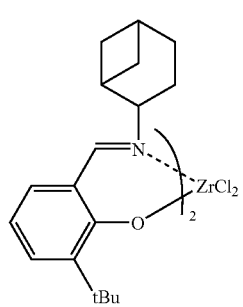
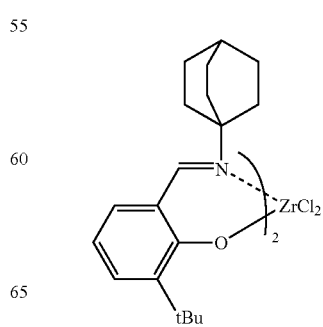

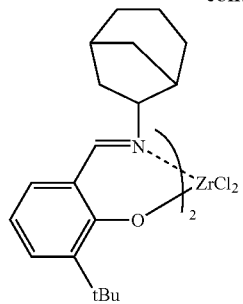
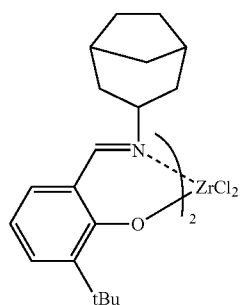
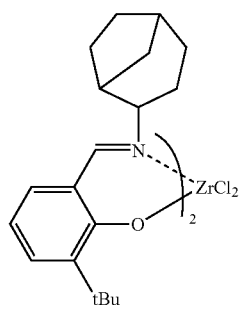
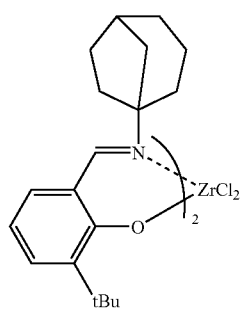
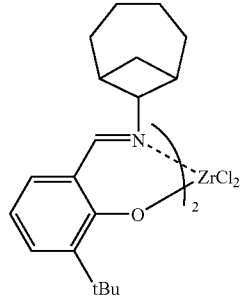
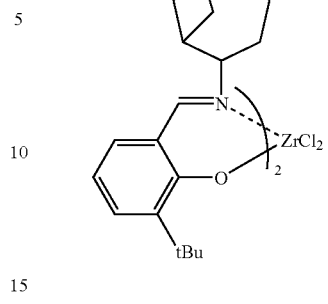
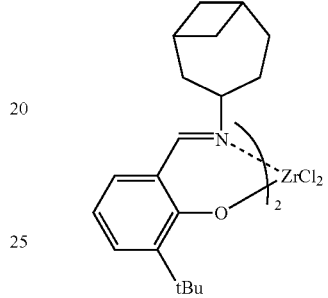
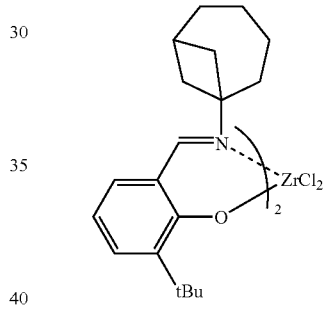
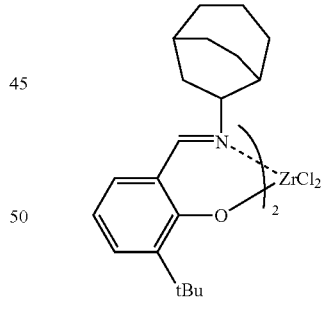
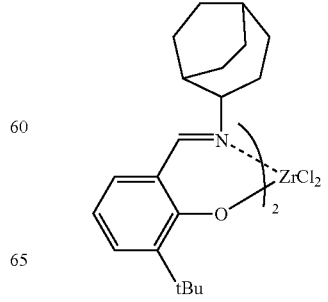

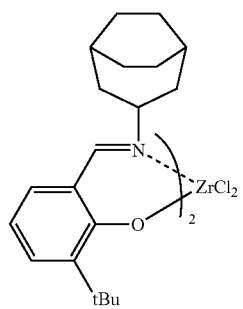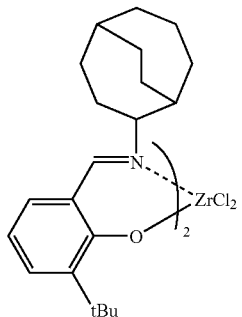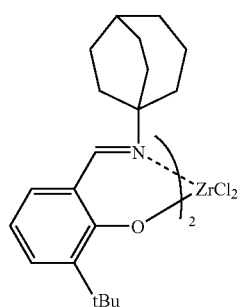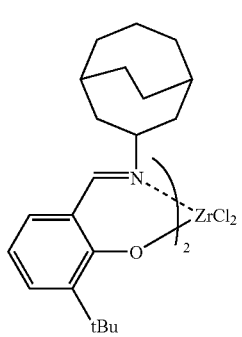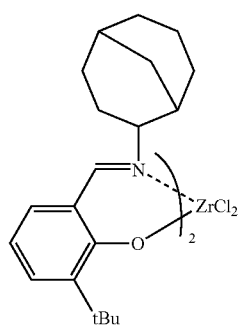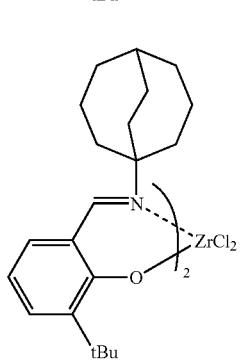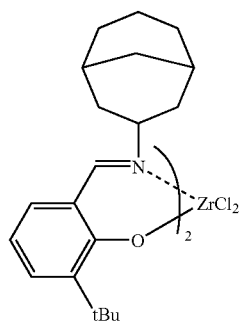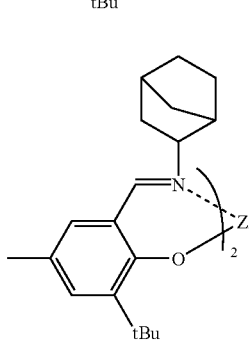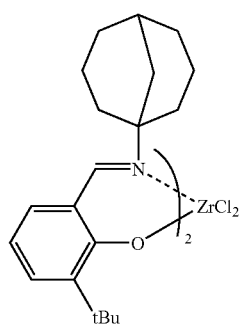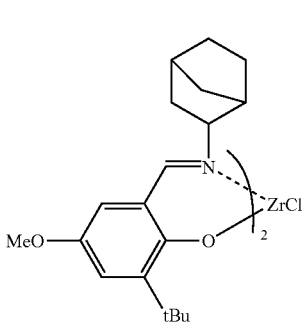

-continued
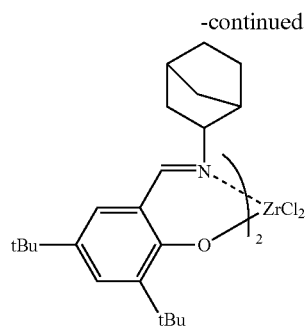
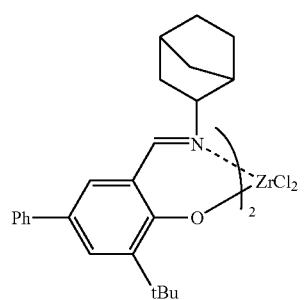
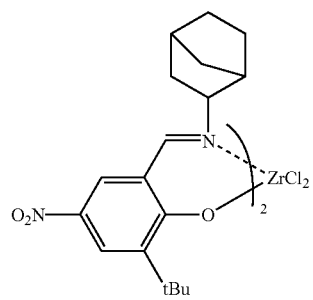
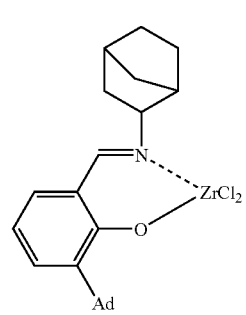
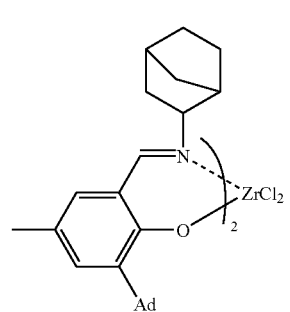
-continued
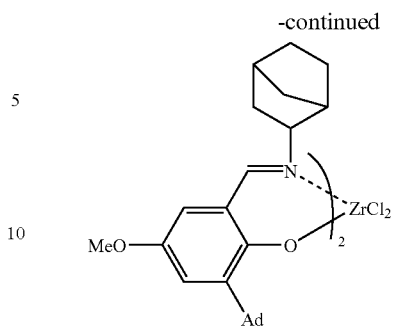
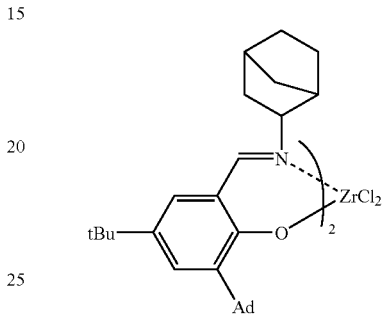
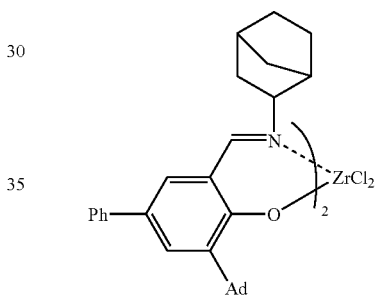
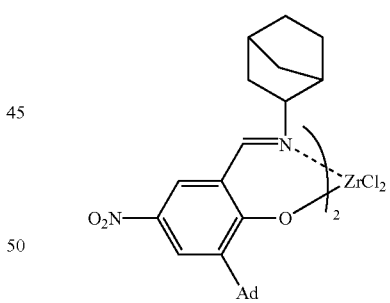
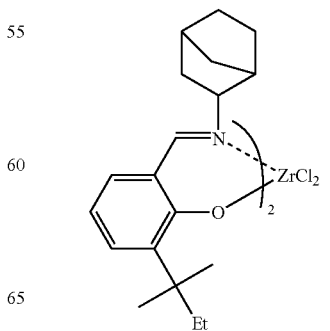

-continued
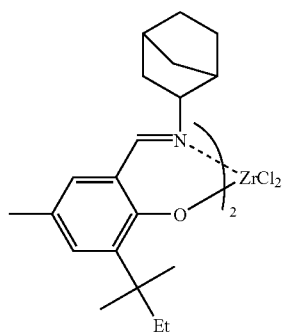
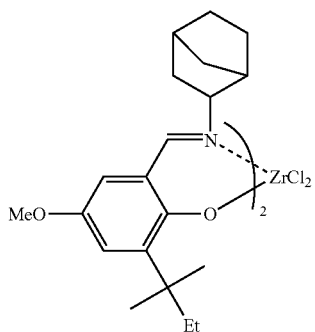
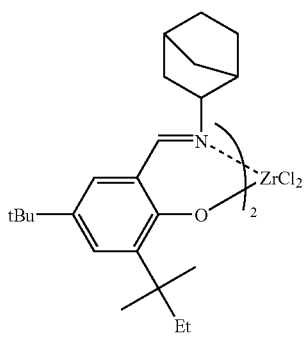
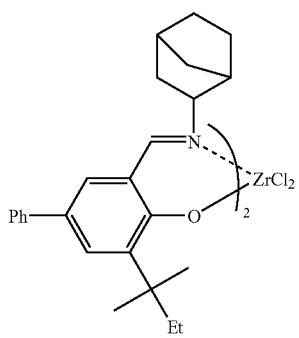
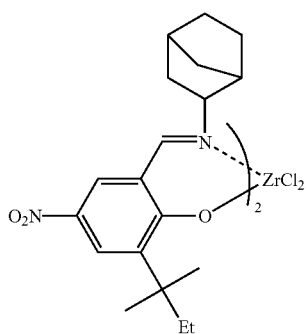
-continued
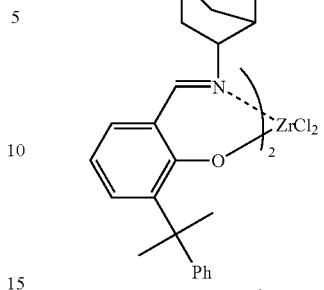
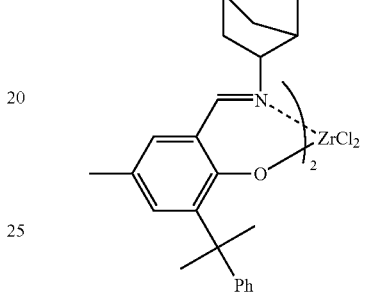
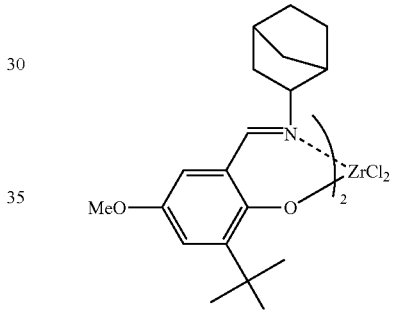
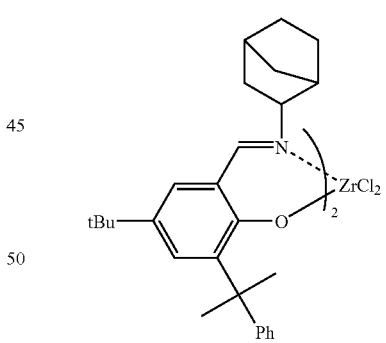
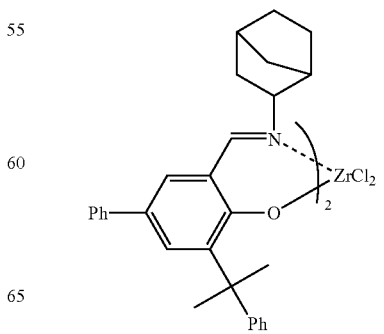

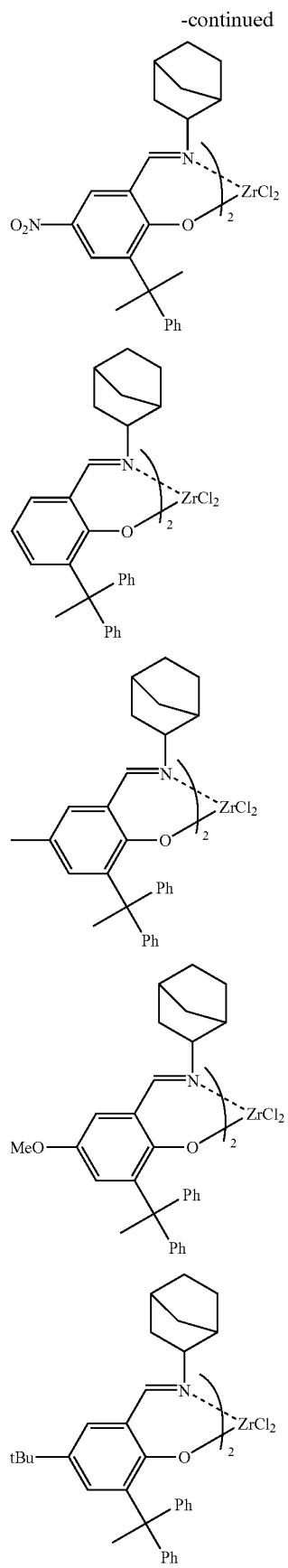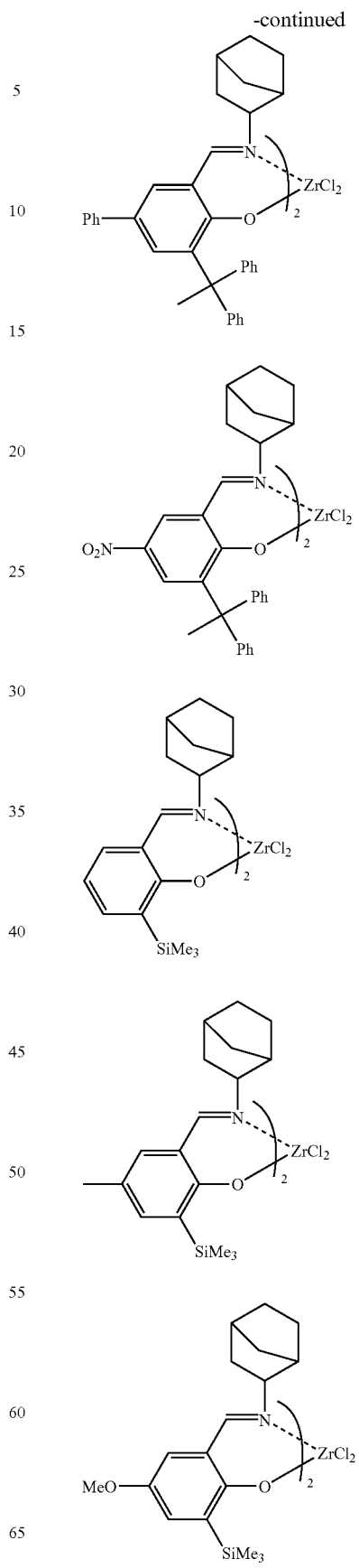

-continued
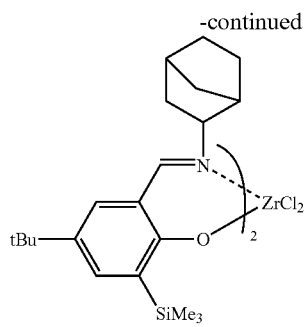
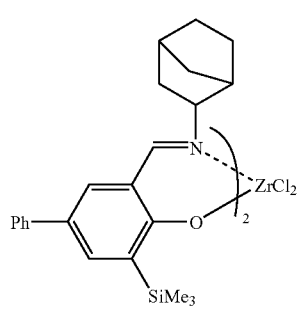
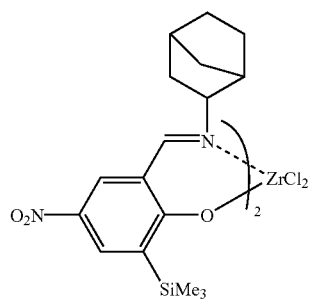
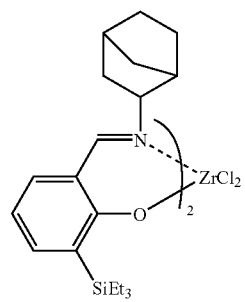
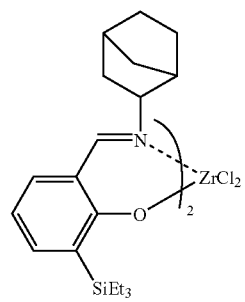
-continued
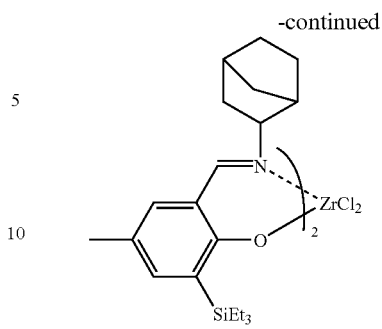
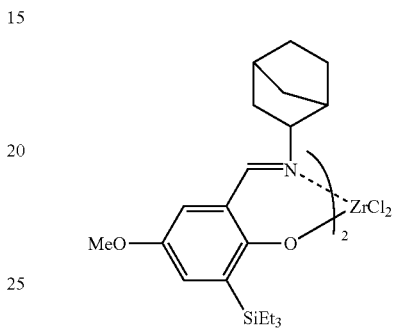
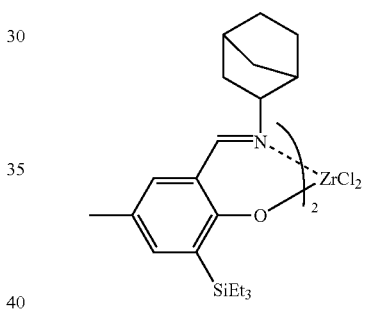
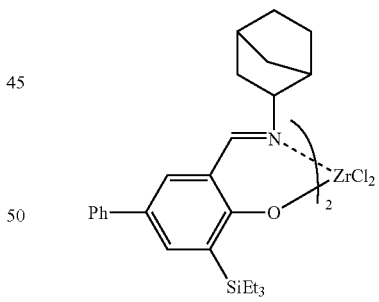
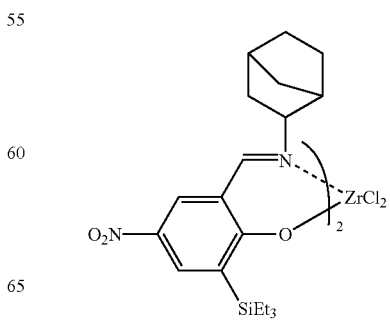

-continued
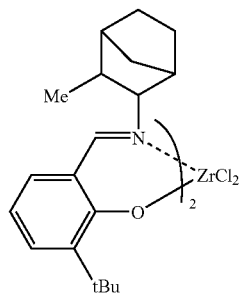
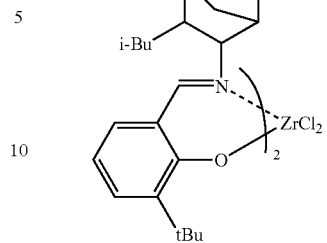
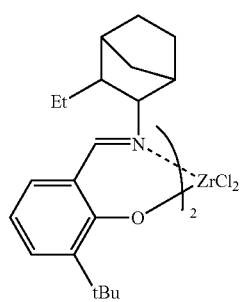
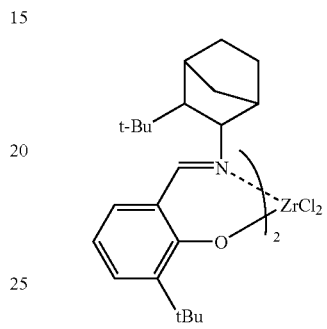
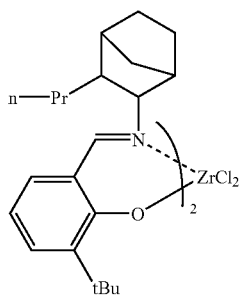
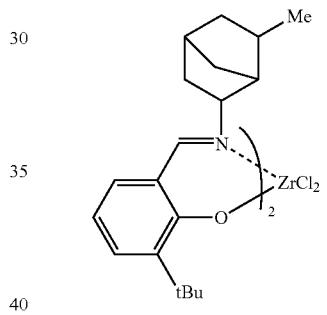
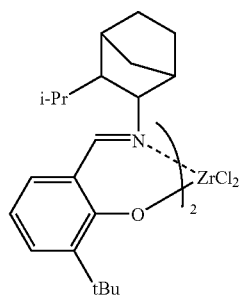
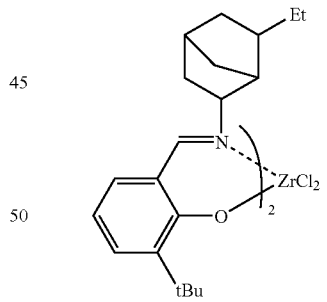
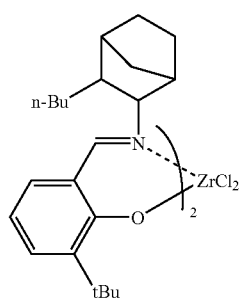
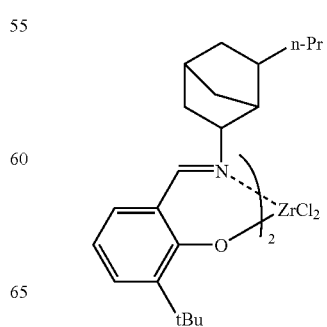

-continued
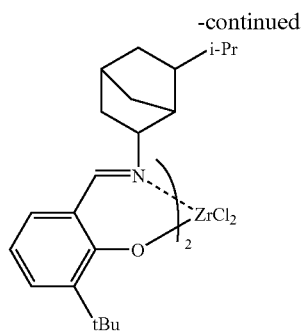
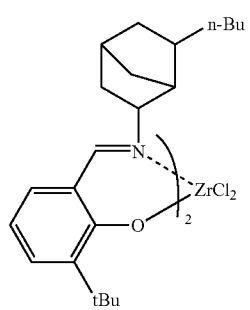
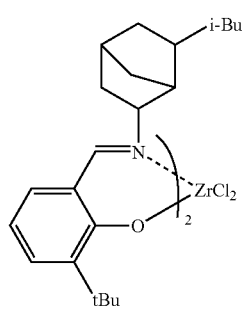
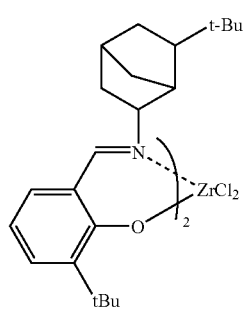
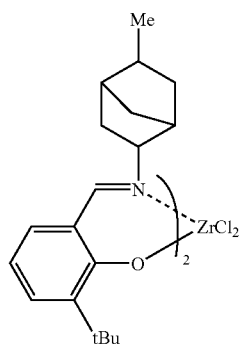
-continued
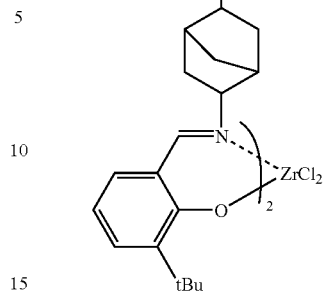
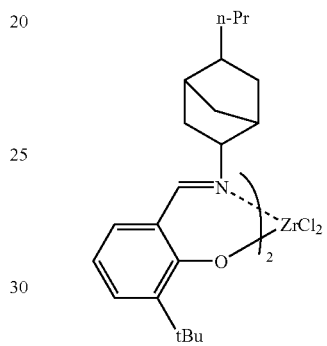
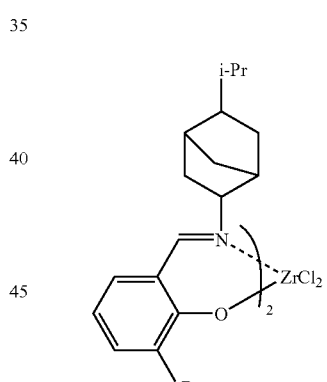
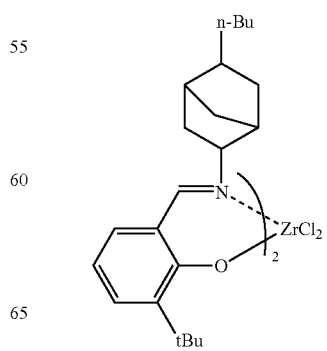

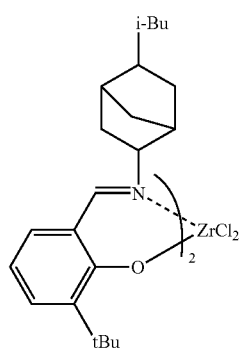
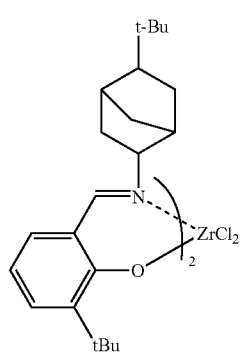
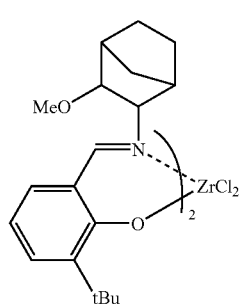
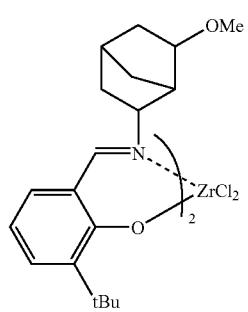
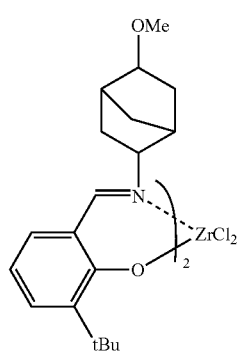
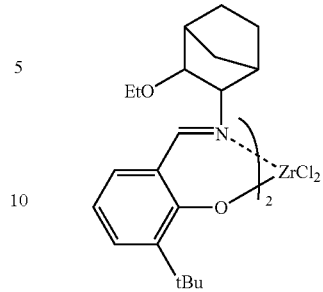
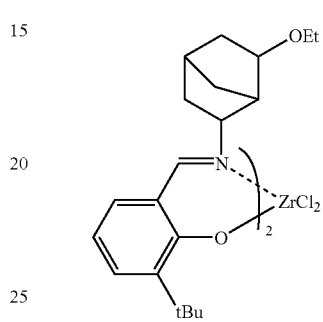
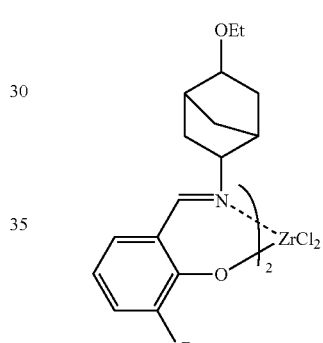
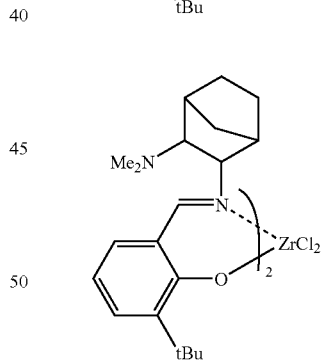
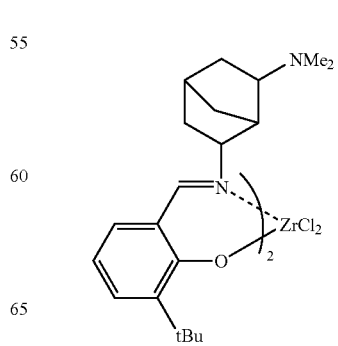

-continued
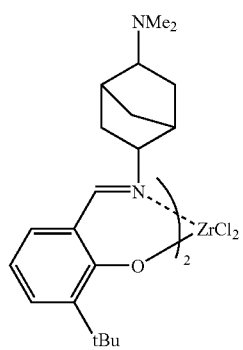
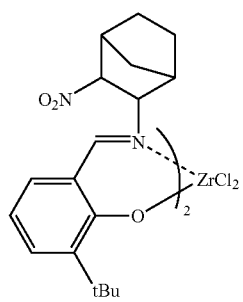
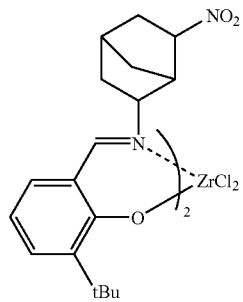
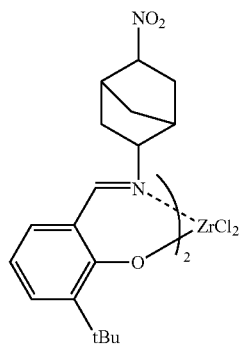
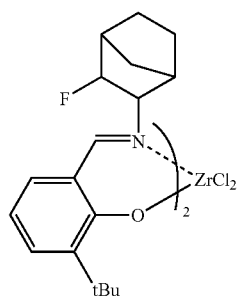
-continued
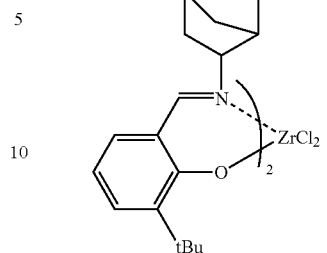
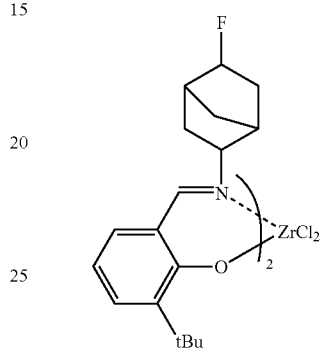
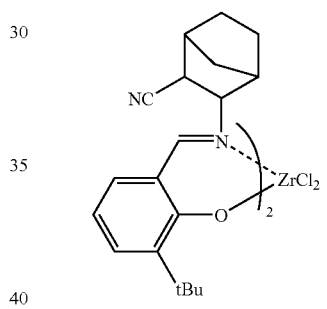
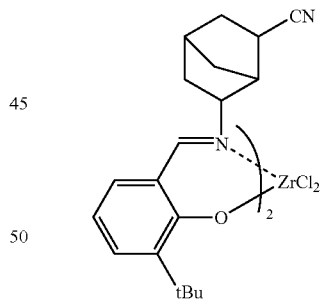
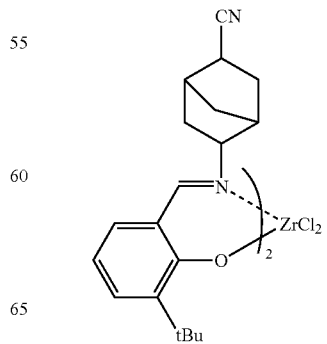

-continued

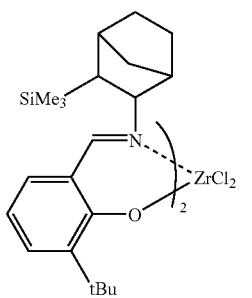

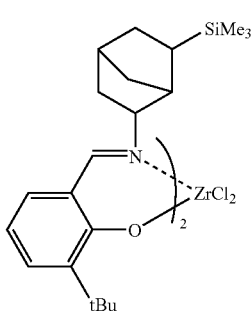

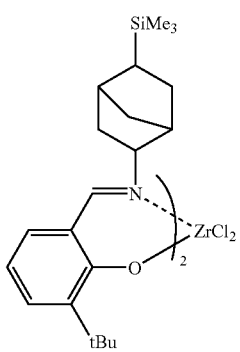

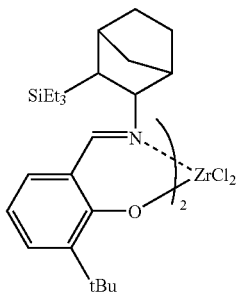

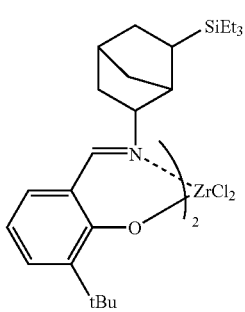

-continued

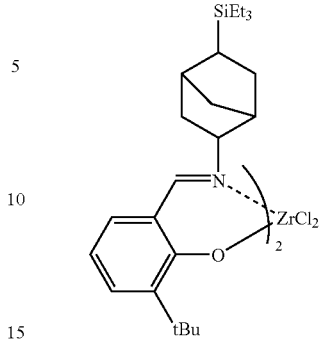

In the above formulae, denoted are a methyl group by Me, an ethyl group by Et, a normal propyl group by n-Pr, an isopropyl group by i-Pr, a normal butyl group by n-Bu, an isobutyl group by i-Bu, a tertiary butyl group by t-Bu, an adamantyl group by Ad and a phenyl group by Ph.

Also usable in the invention are corresponding transition metal compounds to the above compounds in which the zirconium is replaced by titanium or hafnium.

The transition metal compounds (A) can be prepared by any process without specific limitation. For example, they can be prepared in the following manner.

First, the ligand composing the transition metal compound (A) can be obtained by reacting a salicylaldehyde compound with a primary amine compound ($R^1$—$NH_2$, wherein $R^1$ is as defined above), such as an alkylamine compound. Specifically, both starting compounds are dissolved in a solvent. The solvent used herein can be one commonly used in such reactions, and preferably is an alcohol solvent, such as methanol and ethanol, or a hydrocarbon solvent, such as toluene. The resulting solution is stirred for about 1 to 48 hours at room temperature to a reflux temperature to obtain a corresponding ligand in a good yield. In synthesis of the ligand, an acid catalyst, such as formic acid, acetic acid and paratoluenesulfonic acid, can be used. The reaction can effectively proceed when a dehydrating agent, such as molecular sieves, anhydrous magnesium sulfate or anhydrous sodium sulfate, is used or when conducted simultaneously with dehydration by a Dean-Stark apparatus.

The ligand thus obtained is then reacted with a transition metal M-containing compound, to synthesize a corresponding transition metal compound. Specifically, the ligand is dissolved in a solvent, and if necessary, contacted with a base to prepare a phenoxide salt, then mixed with a metal compound such as a metallic halide or a metallic alkylate at a low temperature and stirred for about 1 to 48 hours at −78° C. to room temperature or under reflux. The solvent used herein can be one commonly used in such reactions, and preferably is a polar solvent, such as ethers and tetrahydrofuran (THF), or a hydrocarbon solvent, such as toluene. Examples of the base used in preparing the phenoxide salt include, but not limited to, metallic salts, such as lithium salts, e.g., n-butyllithium, and sodium salts, e.g., sodium hydride, and triethylamine and pyridine.

Depending on the properties of the compound, the ligand can be directly reacted with the metal compound to synthesize a corresponding transition metal compound with preparation of the phenoxide salt omitted. Further, the transition metal M in the synthesized transition metal compound can be replaced by another transition metal by a conventional method. Also, hydrogen represented by at least one of $R^1$ to $R^6$ can be substituted with a substituent group other than hydrogen at an arbitrary stage in synthesis.

A reaction solution of the ligand and the metal compound can be used directly in the polymerization without isolating the transition metal compound therefrom.

(B-1) Organometallic Compound

As the organometallic compound (B-1), the below-described organometallic compounds of metals of Group 1, Group 2, Group 12 and Group 13 of the Periodic Table are employed in the invention.

(B-1a) Organoaluminum compounds represented by the formula:

$$R^a{}_m Al(OR^b)_n H_p X_q$$

wherein $R^a$ and $R^b$, which may be the same or different, are each a hydrocarbon group of 1 to 15, preferably 1 to 4 carbon atoms; X is a halogen atom; and m, n, p and q are numbers satisfying the conditions of $0<m\leq3$, $0\leq n<3$, $0\leq p<3$, $0\leq q<3$ and $m+n+p+q=3$.

(B-1b) Alkyl complex compounds of a Group 1 metal of the periodic Table and aluminum, represented by the formula:

$$M^2 Al R^a{}_4$$

wherein $M^2$ is Li, Na or K; and $R^a$ is a hydrocarbon group of 1 to 15, preferably 1 to 4 carbon atoms.

(B-1c) Dialkyl compounds of a Group 2 metal or a Group 12 metal of the Periodic Table, represented by the formula:

$$R^a R^b M^3$$

wherein $R^a$ and $R^b$, which may be the same or different, are each a hydrocarbon group of 1 to 15, preferably 1 to 4 carbon atoms; and $M^3$ is Mg, Zn or Cd.

Examples of the organoaluminum compounds (B-1a) include the following compounds.

Organoaluminum compounds represented by the formula:

$$R^a{}_m Al(OR^b)_{3-m}$$

wherein $R^a$ and $R^b$, which may be the same or different, are each a hydrocarbon group of 1 to 15, preferably 1 to 4 carbon atoms; and m is preferably a number satisfying the condition of $1.5\leq m\leq3$.

Organoaluminum compounds represented by the formula:

$$R^a{}_m Al X_{3-m}$$

wherein $R^a$ is a hydrocarbon group of 1 to 15, preferably 1 to 4 carbon atoms; X is a halogen atom; and m is preferably a number satisfying the condition of $0<m<3$.

Organoaluminum compounds represented by the formula:

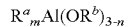
$$R^a{}_m Al H_{3-m}$$

wherein $R^a$ is a hydrocarbon group of 1 to 15, preferably 1 to 4 carbon atoms; and m is preferably a number satisfying the condition of $2\leq m<3$.

Organoaluminum compounds represented by the formula:

$$R^a{}_m Al(OR^b)_n X_q$$

wherein $R^a$ and $R^b$, which may be the same or different, are each a hydrocarbon group of 1 to 15, preferably 1 to 4 carbon atoms; X is a halogen atom; and m, n and q are numbers satisfying the conditions of $0<m\leq3$, $0\leq n<3$, $0\leq q<3$ and $m+n+q=3$.

Specific examples of the organoaluminum compounds (B-1a) include:

tri-n-alkylaluminums, such as trimethylaluminum, triethylaluminum, tri-n-butylaluminum, tripropylaluminum, tripentylaluminum, trihexylaluminum, trioctylaluminum and tridecylaluminum;

branched-chain trialkylaluminums, such as triisopropylaluminum, triisobutylaluminum, tri-sec-butylaluminum, tri-t-butylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum and tri-2-ethylhexylaluminum;

tricycloalkylaluminums, such as tricyclohexylaluminum and tricyclooctylaluminum;

triarylaluminums, such as triphenylaluminum and tritolylaluminum;

dialkylaluminum hydrides, such as diisobutylaluminum hydride;

trialkenylaluminums represented by the formula (i-$C_4H_9$)$_x$Al$_y$($C_5H_{10}$)$_z$ (wherein x, y and z are positive numbers, and $z\geq 2x$), such as triisoprenylaluminum;

alkylaluminum alkoxides, such as isobutylaluminum methoxide, isobutylaluminum ethoxide and isobutylaluminum isopropoxide;

dialkylaluminum alkoxides, such as dimethylaluminum methoxide, diethylaluminum ethoxide and dibutylaluminum butoxide;

alkylaluminum sesquialkoxides, such as ethylaluminum sesquiethoxide and butylaluminum sesquibutoxide;

partially alkoxylated alkylaluminums having an average composition, represented by $R^a{}_{2.5}Al(OR^b)_{0.5}$;

dialkylaluminum aryloxides, such as diethylaluminum phenoxide, diethylaluminum(2,6-di-t-butyl-4-methylphenoxide), ethylaluminum bis(2,6-di-t-butyl-4-methylphenoxide), diisobutylalumium(2,6-di-t-butyl-4-methylphenoxide) and isobutylaluminum bis(2,6-di-t-butyl-4-methylphenoxide);

dialkylaluminum halides, such as dimethylaluminum chloride, diethylaluminum chloride, dibutylaluminum chloride, diethylaluminum bromide and diisobutylaluminum chloride;

alkylaluminum sesquihalides, such as ethylaluminum sesquichloride, butylaluminum sesquichloride and ethylaluminum sesquibromide, partially halogenated alkylaluminums, such as alkylaluminum dihalides, e.g., ethylaluminum dichloride, propylaluminum dichloride and butylaluminum dibromide;

dialkylaluminum hydrides, such as diethylaluminum hydride and dibutylaluminum hydride;

partially hydrogenated alkylaluminums, such as alkylaluminum dihydrides, e.g., ethylaluminum dihydride and propylaluminum dihydride; and partially alkoxylated and halogenated alkylaluminums, such as ethylaluminum ethoxychloride, butylaluminum butoxychloride and ethylaluminum ethoxybromide.

Also employable are compounds analogous to the organoaluminum compounds (B-1a). For example, there can be mentioned organoaluminum compounds wherein two or more aluminum compounds are combined through a nitrogen atom, such as $(C_2H_5)_2AlN(C_2H_5)Al(C_2H_5)_2$.

Examples of the organoaluminum compounds (B-1b) include $LiAl(C_2H_5)_4$ and $LiAl(C_7H_{15})_4$.

Further, other compounds such as methyllithium, ethyllithium, propyllithium, butyllithium, methylmagnesium bromide, methylmagnesium chloride, ethylmagnesium bromide, ethylmagnesium chloride, propylmagnesium bromide, propylmagnesium chloride, butylmagnesium bromide, butylmagnesium chloride, dimethylmagnesium, diethylmagnesium, dibutylmagnesium and butylethylmagnesium are also employable as the organometallic compound (B-1).

Furthermore, combinations of compounds capable of forming the aforesaid organoaluminum compounds in the polymerization system, e.g., a combination of halogenated aluminum and alkyllithium and a combination of halogenated aluminum and alkylmagnesium, are also employable.

Of the organometallic compounds (B-1) mentioned above, the organoaluminum compounds are preferable.

The organometallic compounds (B-1) can be used singly or in combination.

(B-2) Organoaluminum Oxy-compound

The organoaluminum oxy-compound (B-2) for use in the invention may be conventional aluminoxane or a benzene-insoluble organoaluminum oxy-compound as exemplified in JP-A-2(1990)/78687.

The conventional aluminoxane can be prepared by, for example, the following processes, and is usually obtained as a hydrocarbon solvent solution.

(1) A process wherein such an organoaluminum compound as trialkylaluminum is added to a hydrocarbon medium suspension of a compound containing absorbed water or a salt containing water of crystallization, such as magnesium chloride hydrate, copper sulfate hydrate, aluminum sulfate hydrate, nickel sulfate hydrate or cerous chloride hydrate, to react the absorbed water or the water of crystallization with the organoaluminum compound.

(2) A process wherein water, ice or water vapor is allowed to act directly on such an organoaluminum compound as trialkylaluminum in a medium, such as benzene, toluene, ethyl ether or tetrahydrofuran.

(3) A process wherein an organotin oxide, such as dimethyltin-oxide or dibutyltin oxide, is allowed to react with such an organoaluminum compound as trialkylaluminum in a medium, such as decane, benzene or toluene.

The aluminoxane may contain a small amount of an organometallic component. The solvent or the unreacted organoaluminum compound is distilled off from the recovered solution of aluminoxane and the remainder may be redissolved in a solvent or suspended in a poor solvent of aluminoxane.

Examples of the organoaluminum compound used for preparing the aluminoxane include the same organoaluminum compounds as described for the organoaluminum compounds (B-1a).

Of these, preferable are trialkylaluminums and tricycloalkylaluminums. Particularly preferable is trimethylaluminum.

The organoaluminum compounds can be used singly or in combination.

Examples of the solvent used in preparing the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; and halides of these aromatic, aliphatic and alicyclic hydrocarbons, particularly chlorides and bromides thereof. Also employable are ethers such as ethyl ether and tetrahydrofuran. Of the solvents, particularly preferable are aromatic hydrocarbons and aliphatic hydrocarbons.

The benzene-insoluble organoaluminum oxy-compound used in the invention preferably has a content of Al component which is soluble in benzene at 60° C. of usually not more than 10%, preferably not more than 5%, particularly preferably not more than 2%, in terms of Al atom. That is, the benzene-insoluble organoaluminum oxy-compound is preferably insoluble or hardly soluble in benzene.

The organoaluminum oxy-compound employable in the invention is, for example, an organoaluminum oxy-compound containing boron, which is represented by the following formula (IV):

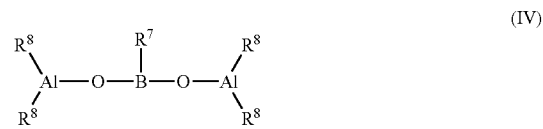

wherein $R^7$ is a hydrocarbon group of 1 to 10 carbon atoms; and the groups $R^8$, which may be the same or different, are each a hydrogen atom, a halogen atom or a hydrocarbon group of 1 to 10 carbon atoms.

The organoaluminum oxy-compound containing boron that is represented by the formula (IV) can be prepared by reacting an alkylboronic acid represented by the following formula (V) with an organoaluminum compound in an inert solvent under an inert gas atmosphere at a temperature of −80° C. to room temperature for 1 minute to 24 hours:

wherein $R^7$ is the same as mentioned above.

Examples of the alkylboronic acid represented by the formula (V) include methylboronic acid, ethylboronic acid, isopropylboronic acid, n-propylboronic acid, n-butylboronic acid, isobutylboronic acid, n-hexylboronic acid, cyclohexylboronic acid, phenylboronic acid, 3,5-difluoroboronic acid, pentafluorophenylboronic acid and 3,5-bis (trifluoromethyl) phenylboronic acid. Of these, preferable are methylboronic acid, n-butylboronic acid, isobutylboronic acid, 3,5-difluorophenylboronic acid and pentafluorophenylboronic acid. These alkylboronic acids are used singly or in combination.

Examples of the organoaluminum compound to be reacted with the alkylboronic acid include the same organoaluminum compounds as described for the organoaluminum compounds (B-1a).

Of these, preferable are trialkylaluminums and tricycloalkylaluminums. Particularly preferable are trimethylaluminum, triethylaluminum and triisobutylaluminum. These organoaluminum compounds can be used singly or in combination.

The organoaluminum oxy-compounds (B-2) mentioned above are used singly or in combination.

(B-3) Compound that Reacts with the Transition Metal Compound to Form an Ion Pair Examples of the compound (B-3) that reacts with the transition metal compound (A) to form an ion pair (referred to as "ionizing ionic compound" hereinafter) include Lewis acids, ionic compounds, borane compounds and carborane compounds as described in JP-A-1(1989)/501950, JP-A-1 (1989)/502036, JP-A-3(1991)/179005, JP-A-3(1991)/ 179006, JP-A-3(1991)/207703 and JP-A-3(1991)/207704, and U.S. Pat. No. 5,321,106. Examples further include heteropoly compounds and isopoly compounds.

Examples of the Lewis acids include compounds represented by $BR_3$ (wherein R is a phenyl group which may have a substituent group such as fluorine, methyl or trifluoromethyl, or a fluorine atom), such as trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron.

Examples of the ionic compounds include compounds represented by the following formula (VI).

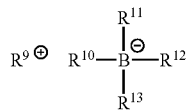
(VI)

In the above formula, $R^9$ is $H^+$, carbonium cation, oxonium cation, ammonium cation, phosphonium cation, cycloheptyltrienyl cation, ferrocenium cation having a transition metal, or the like.

$R^{10}$ to $R^{13}$, which may be the same or different, are each an organic group, preferably an aryl group or a substituted aryl group.

Examples of the carbonium cation include tri-substituted carbonium cations, such as triphenylcarbonium cation, tri(methylphenyl)carbonium cation and tri(dimethylphenyl)carbonium cation.

Examples of the ammonium cation include trialkylammonium cations, such as trimethylammonium cation, triethylammonium cation, tripropylammonium cation, tributylammonium cation and tri(n-butyl)ammonium cation; N,N-dialkylanilinium cations, such as N,N-dimethylanilinium cation, N,N-diethylanilinium cation and N,N-2,4,6-pentamethylanilinium cation; and dialkylammonium cations, such as di(isopropyl)ammonium cation and dicyclohexylammonium cation.

Examples of the phosphonium cation include triarylphosphonium cations, such as triphenylphosphonium cation, tri(methylphenyl)phosphonium cation and tri(dimethylphenyl)phosphonium cation.

$R^9$ is preferably carbonium cation or ammonium cation, particularly preferably triphenylcarbonium cation, N,N-dimethylanilinium cation or N,N-diethylanilinium cation.

Examples of the ionic compounds further include trialkyl-substituted ammonium salts, N,N-dialkylanilinium salts, dialkylammonium salts and triarylphosphonium salts.

Examples of the trialkyl-substituted ammonium salts include triethylammoniumtetra(phenyl)boron, tripropylammoniumtetra(phenyl)boron, tri(n-butyl)ammoniumtetra(phenyl)boron, trimethylammoniumtetra(p-tolyl)boron, trimethylammoniumtetra(o-tolyl)boron, tri(n-butyl)ammoniumtetra(pentafluorophenyl)boron, tripropylammoniumtetra(o,p-dimethylphenyl)boron, tri(n-butyl)ammoniumtetra(m,m-dimethylphenyl)boron, tri(n-butyl)ammoniumtetra(p-trifluoromethylphenyl)boron, tri(n-butyl)ammoniumtetra(3,5-ditrifluoromethylphenyl)boron and tri(n-butyl)ammoniumtetra(o-tolyl)boron.

Examples of the N,N-dialkylanilinium salts include N,N-dimethylaniliniumtetra(phenyl)boron, N,N-diethylaniliniumtetra(phenyl)boron and N,N-2,4,6-pentamethylaniliniumtetra(phenyl)boron.

Examples of the dialkylammonium salts include di(1-propyl)ammoniumtetra(pentafluorophenyl)boron and dicyclohexylammoniumtetra(phenyl)boron.

Examples of the ionic compounds further include triphenylcarbeniumtetrakis(pentafluorophenyl)borate, N,N-dimethylaniliniumtetrakis(pentafluorophenyl)borate, ferroceniumtetra(pentafluorophenyl)borate, triphenylcarbeniumpentaphenylcyclopentadienyl complex, N,N-diethylaniliniumpentaphenylcyclopentadienyl complex and boron compounds represented by the following formula (VII) or (VIII).

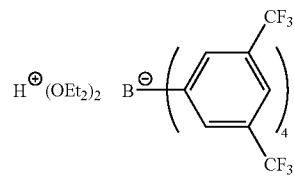
(VII)

wherein Et is an ethyl group.

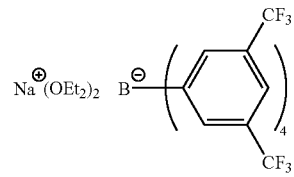
(VIII)

Examples of the borane compounds include:

decaborane;

salts of anions, such as bis[tri(n-butyl)ammonium]nonaborate, bis[tri(n-butyl)ammonium]decaborate, bis[tri(n-butyl)ammonium]undecaborate, bis[tri(n-butyl)ammonium]dodecaborate, bis[tri(n-butyl)ammonium]decachlorodecaborate and bis[tri(n-butyl)ammonium]dodecachlorododecaborate; and salts of metallic borane anions, such as tri(n-butyl)ammoniumbis(dodecahydridododecaborato)cobaltate(III) and bis[tri(n-butyl)ammonium]bis(dodecahydridododecaborato)nickelate(III).

Examples of the carborane compounds include:

salts of anions, such as 4-carbanonaborane, 1,3-dicarbanonaborane, 6,9-dicarbadecaborane, dodecahydrido-1-phenyl-1,3-dicarbanonaborane, dodecahydrido-1-methyl-1,3-dicarbanonaborane, undecahydrido-1,3-dimethyl-1,3-dicarbanonaborane, 7,8-dicarbaundecaborane, 2,7-dicarbaundecaborane, undecahydrido-7,8-dimethyl-7,8-dicarbaundecaborane, dodecahydrido-11-methyl-2,7-dicarbaundecaborane, tri(n-butyl)ammonium-1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate, tri(n-butyl)ammoniumbromo-1-carbadodecaborate, tri(n-butyl)ammonium-6-carbadecaborate, tri(n-butyl)ammonium-6-carbadecaborate, tri(n-butyl)ammonium-7-carbaundecaborate, tri(n-butyl)ammonium-7,8-dicarbaundecaborate, tri(n-butyl)ammonium-2,9-dicarbaundecaborate, tri(n-butyl)ammoniumdodecahydrido-8-methyl-7,9-dicarbaundecaborate, tri(n-butyl)ammoniumundecahydrido-8-ethyl-7,9-dicarbaundecaborate, tri(n-butyl)ammoniumundecahydrido-8-butyl-7,9-dicarbaundecaborate, tri(n-butyl)ammoniumundecahydrido-8-allyl-7,9-dicarbaundecaborate, tri(n-butyl)ammoniumundecahydrido-9-trimethylsilyl-7,8-dicarbaundecaborate and tri(n-butyl)ammoniumundecahydrido-4,6-dibromo-7-carbaundecaborate; and salts of metallic carborane anions, such as tri(n-butyl)ammoniumbis(nonahydrido-1,3-dicarbanonaborato)cobaltate(III), tri(n-butyl)ammoniumbis(undecahydrido-7,8-dicarbaundecaborato)ferrate(III), tri(n-butyl)ammoniumbis(undecahydrido-7,8-dicarbaundecaborato)cobaltate(III), tri(n-butyl)ammoniumbis(undecahydrido-7,8-dicarbaundecaborato)nickelate(III), tri(n-butyl)ammoniumbis(undecahydrido-7,8-dicarbaundecaborato)cuprate(III), tri(n-butyl)ammoniumbis(undecahydrido-7,8-dicarbaundecaborato)aurate(III), tri(n-butyl)ammoniumbis(nonahydrido-7,8-dimethyl-7,8-dicarbaundecaborato)ferrate(III), tri(n-butyl)ammoniumbis(nonahydrido-7,8-dimethyl-7,8-dicarbaundecaborato)chromate(III), tri(n-butyl)ammoniumbis(tribromooctahydrido-7,8-dicarbaundecaborato)cobaltate(III), tris[tri(n-butyl)ammonium]bis(undecahydrido-7-carbaundecaborato)chromate(III), bis[tri(n-butyl)ammonium]bis(undecahydrido-7-carbaundecaborato)manganate(IV), bis[tri(n-butyl)ammonium]bis(undecahydrido-7-carbaundecaborato)cobaltate(III) and bis[tri(n-butyl)ammonium]bis(undecahydrido-7-carbaundecaborato)nickelate(IV).

The heteropoly compounds comprise an atom selected from silicon, phosphorus, titanium, germanium, arsenic and tin, and at least one atom selected from vanadium, niobium, molybdenum and tungsten. Examples of the heteropoly compounds include without limiting thereto phosphovanadic acid, germanovanadic acid, arsenovanadic acid, phosphoniobic acid, germanoniobic acid, siliconomolybdic acid, phosphomolybdic acid, titanomolybdic acid, germanomolybdic acid, arsenomolybdic acid, stannnomolybdic acid, phosphotungstic acid, germanotungstic acid, stannotungstic acid, phosphomolybdovanadic acid, phosphotungstovanadic acid, germanotungstovanadic acid, phosphomolybdotungstovanadic acid, germanomolybdotungstovanadic acid, phosphomolybdotungstic acid and phosphomolybdoniobic acid, salts of these acids with a metal of Group 1 or Group 2 of the Periodic Table, such as lithium, sodium, potassium, rubidium, cesium, beryllium, magnesium, calcium, strontium or barium, and organic salts of these acids with a triphenylethyl salt.

The ionizing ionic compounds (B-3) mentioned above can be used singly or in combination.

When the transition metal compound of the invention is used as a catalyst in combination with the organoaluminum oxy-compound (B-2), such as methylaluminoxane, as a cocatalyst, olefin compounds can be polymerized with very high polymerization activity.

The olefin polymerization catalyst of the invention may comprise according to necessity the below-described carrier (C) in addition to the transition metal compound (A) and at least one compound (B) selected from the organometallic compound (B-1), the organoaluminum oxy-compound (B-2) and the ionizing ionic compound (B-3).

(C) Carrier

The carrier (C) used in the invention is an inorganic or organic compound in the form of granular or particulate solids.

Preferable as the inorganic compound are porous oxides, inorganic chlorides, clays, clay minerals and ion-exchange layered compounds.

Examples of the porous oxides include $SiO_2$, $Al_2O_3$, MgO, ZrO, $TiO_2$, $B_2O_3$, CaO, ZnO, BaO, $ThO_2$, complexes and mixtures containing them, such as natural or synthetic zeolites, $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Of these, $SiO_2$ and/or $Al_2O_3$ are preferable as a major component of the carrier.

The inorganic oxides may contain a small amount of carbonate, sulfate, nitrate or oxide component, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ or $Li_2O$.

Though the porous oxides differ in properties depending on its type and the preparation process thereof, the carrier preferably used in the invention has a particle diameter of 10 to 300 μm, preferably 20 to 200 μm, a specific surface area of 50 to 1,000 $m^2/g$, preferably 100 to 700 $m^2/g$, and a pore volume of 0.3 to 3.0 $cm^3/g$. The carrier can be according to necessity calcined at 100 to 1,000° C., preferably 150 to 700° C. before use.

Examples of the inorganic chlorides include $MgCl_2$, $MgBr_2$, $MnCl_2$ and $MnBr_2$. The inorganic chloride may be used as it is or after pulverized by a ball mill, a vibration mill or the like. Also, the inorganic chloride can be dissolved in such a solvent as an alcohol and then precipitated by a precipitating agent to be used as fine particles.

The clays usable in the invention are in general mainly comprised of a clay mineral. The ion-exchange layered compounds are compounds which have a crystal structure wherein planes formed by ionic bonding or the like pile in parallel on one another with a weak bond strength, and which contain exchangeable ions. Most clay minerals are ion-exchange layered compounds. The clays, the clay minerals and the ion-exchange layered compounds are not limited to natural ones and can be synthetic.

Examples of such clays, clay minerals and ion-exchange layered compounds include clays, clay minerals, and ion crystalline compounds having such a layered crystal structure as a hexagonal closest packing type, an antimony type, a $CdCl_2$ type or a $CdI_2$ type.

Specific examples of the clays and the clay minerals include kaolin, bentonite, kibushi clay, potter's clay, allophane, hisingerite, pyrophyllite, mica group, montmorillonite group, vermiculite, chlorite group, palygorskite, kaolinite, nacrite, dickite and halloysite. Specific examples of the ion-exchange layered compounds include crystalline acid salts of polyvalent metals, such as α-$Zr(HAsO_4)_2 \cdot H_2O$, α-$Zr(HPO_4)_2$, α-$Zr(KPO_4)_2 \cdot 3H_2O$, α-$Ti(HPO_4)_2$, α-$Ti(HAsO_4)_2 \cdot H_2O$, α-$Sn(HPO_4)_2 \cdot H_2O$, γ-$Zr(HPO_4)_2$, γ-$Ti(HPO_4)_2$ and γ-$Ti(NH_4PO_4)_2 \cdot H_2O$.

The clays, the clay minerals and the ion-exchange layered compounds preferably have a pore volume, as measured on pores having a radius of not less than 20 Å by a mercury penetration method, of not less than 0.1 cc/g, particularly from 0.3 to 5 cc/g. The pore volume is measured on the pores having a radius of 20 to 30,000 Å by a mercury penetration method using a mercury porosimeter.

When a compound having a pore volume, as measured on pores having a radius of not less than 20 Å, of less than 0.1 cc/g is used, high polymerization activity is apt to be hardly obtained.

It is preferable that the clays and the clay minerals are chemically treated. Examples of the chemical treatment include a surface treatment to remove impurities attached to the surface and a treatment to affect the crystal structure of the clay. Specific examples of such chemical treatments include acid treatment, alkali treatment, salt treatment and organic matter treatment. The acid treatment contributes to not only removing impurities from the surface but also eluting cations, such as Al, Fe and Mg, from the crystal structure to thereby increase the surface area. The alkali treatment destroys the crystal structure of the clay to bring about change in the structure of the clay. The salt treatment and the organic matter treatment can produce an ionic complex, a molecular complex or an organic derivative to change the surface area or the interlayer distance.

The ion-exchange layered compound can be enlarged in interlayer distance by changing the exchangeable ions between layers with other large and bulky ions taking advantage of ion exchange properties, whereby the compound becomes a layered compound having an enlarged interlayer distance. The bulky ions play a pillar-like roll to support the layer structure and are called "pillars". Introduction of other substances between layers of a layered compound is called "intercalation". Examples of the guest compounds to be intercalated include cationic inorganic compounds, such as $TiCl_4$ and $ZrCl_4$; metallic alkoxides, such as $Ti(OR)_4$, $Zr(OR)_4$, $PO(OR)_3$ and $B(OR)_3$ (wherein R is a hydrocarbon group or the like); and metallic hydroxide ions, such as $[Al_{13}O_4(OH)_{24}]^{7+}$, $[Zr_4(OH)_{14}]^{2+}$ and $[Fe_3O(OCOCH_3)_6]^+$. These compounds can be used singly or in combination. Intercalation of these compounds can be carried out in the presence of polymers obtained by hydrolysis of metallic alkoxides such as $Si(OR)_4$, $Al(OR)_3$ and $Ge(OR)_4$ (wherein R is a hydrocarbon group or the like) or in the presence of colloidal inorganic compounds such as $SiO_2$. Examples of the pillars include oxides produced by intercalation of the above-mentioned metallic hydroxide ions between layers and then dehydration under heating.

The clays, the clay minerals and the ion-exchange layered compounds mentioned above may be used as they are or after subjected to such a treatment as ball milling or sieving. Moreover, they may be used after subjected to water adsorption or dehydration under heating. The clays, the clay minerals and the ion-exchange layered compounds may be used singly or in combination.

Of the above-mentioned materials, preferable are clays and clay minerals, and particularly preferable are montmorillonite, vermiculite, pectolite, tenorite and synthetic mica.

The organic compound is, for example, a granular or particulate solid having a particle diameter of 10 to 300 µm. Examples of such a compound include (co)polymers produced from, as a main component, an α-olefin of 2 to 14 carbon atoms such as ethylene, propylene, 1-butene and 4-methyl-1-pentene, (co)polymers produced from, as a main component, vinylcyclohexane or styrene, and modified products thereof.

The olefin polymerization catalyst of the invention may comprise according to necessity the following specific organic compound component (D), in addition to the transition metal compound (A), at least one compound (B) selected from the organometallic compound (B-1), the organoaluminum oxy-compound (B-2) and the ionizing ionic compound (B-3), and the optional carrier (C).

(D) Organic Compound Component

The organic compound component (D) is used according to necessity to improve polymerizability and properties of the resulting polymers. Examples of the organic compound include without limiting thereto alcohols, phenolic compounds, carboxylic acids, phosphorus compounds and sulfonates.

The alcohols and the phenolic compounds used herein are represented by $R^{14}$—OH wherein $R^{14}$ is a hydrocarbon group of 1 to 50 carbon atoms or a halogenated hydrocarbon group of 1 to 50 carbon atoms.

It is preferable that the alcohols are represented by $R^{14}$—OH wherein $R^{14}$ is a halogenated hydrocarbon group. The phenolic compounds are preferably those wherein the α,α'-position of the hydroxyl group is substituted with a hydrocarbon group of 1 to 20 carbon atoms.

The carboxylic acids are generally represented by $R^{15}$—COOH wherein $R^{15}$ is a hydrocarbon group of 1 to 50 carbon atoms or a halogenated hydrocarbon group of 1 to 50 carbon atoms, preferably a halogenated hydrocarbon group of 1 to 50 carbon atoms.

Examples of the preferred phosphorus compounds include phosphoric acids having a P—O—H bond, phosphates having a P—OR bond or a P=O bond, and phosphine oxide compounds. The sulfonates are represented by the following formula (IX):

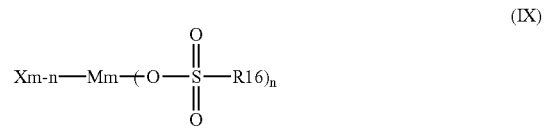

(IX)

wherein M is an element of Group 1 to Group 14 of the Periodic Table;

$R^{16}$ is a hydrogen atom, a hydrocarbon group of 1 to 20 carbon atoms or a halogenated hydrocarbon group of 1 to 20 carbon atoms;

X is a hydrogen atom, a halogen atom, a hydrocarbon group of 1 to 20 carbon atoms or a halogenated hydrocarbon group of 1 to 20 carbon atoms;

m is an integer of 1 to 7; and $1 \leq n \leq 7$.

Next, the process for preparing the olefin polymerization catalyst will be described.

To carry out the polymerization, the usage and the order of addition of the components can be selected arbitrarily. Some exemplary processes are given below.

(1) The component (A) alone is added to a polymerizer.

(2) The component (A) and the component (B) are added to a polymerizer in an arbitrary order.

(3) A catalyst component in which the component (A) is supported on the carrier (C), and the component (B) are added to a polymerizer in an arbitrary order.

(4) A catalyst component in which the component (B) is supported on the carrier (C), and the component (A) are added to a polymerizer in an arbitrary order.

(5) A catalyst component in which the components (A) and (B) are supported on the carrier (C) is added to a polymerizer.

In the processes (2) to (5), at least two of the catalyst components may have been contacted with each other.

In the processes (4) and (5) wherein the component (B) is supported on the carrier, other unsupported component (B) may be according to necessity added in an arbitrary order. In this case, these components (B) may be the same or different.

An olefin may be prepolymerized with the solid catalyst component wherein the component (A) alone or the components (A) and (B) are supported on the carrier (C). Other catalyst component may be supported on the pre-polymerized solid catalyst component.

In the olefin polymerization according to the invention, an olefin is polymerized or copolymerized in the presence of the above-described olefin polymerization catalyst to give an olefin polymer.

In the present invention, the polymerization can be carried out by any of liquid-phase polymerization processes, such as solution polymerization or suspension polymerization, and gas-phase polymerization processes.

Examples of the inert hydrocarbon media used in the liquid-phase polymerization include aliphatic hydrocarbons, such as propane, butane, pentane, hexane, heptane octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures of these hydrocarbons. The olefin itself can be used as the solvent.

To carry out the olefin polymerization in the presence of the olefin polymerization catalyst, the component (A) is used in an amount of usually $10^{-12}$ to $10^{-2}$ mol, preferably $10^{-10}$ to $10^{-3}$ mol based on 1 liter of the reaction volume.

The component (B-1) is used in such an amount that the molar ratio((B-1)/(M)) of the component (B-1) to the transition metal atom (M) in the component (A) becomes usually 0.01 to 100,000, preferably 0.05 to 50,000. The component (B-2) is used in such an amount that the molar ratio ((B-2)/(M)) of the aluminum atom in the component (B-2) to the transition metal atom (M) in the component (A) becomes usually 10 to 500,000, preferably 20 to 100,000. The component (B-3) is used in such an amount that the molar ratio ((B-3)/(M)) of the component (B-3) to the transition metal atom (M) in the component (A) becomes usually 1 to 10, preferably 1 to 5.

When the component (B) is the component (B-1), the component (D) is used in such an amount that the (D)/(B-1) molar ratio becomes usually 0.01 to 10, preferably 0.1 to 5. When the component (B) is the component (B-2), the component (D) is used in such an amount that the (D)/(B-2) molar ratio becomes usually 0.01 to 2, preferably 0.005 to 1. When the component (B) is the component (B-3), the component (D) is used in such an amount that the (D)/(B-3) molar ratio becomes usually 0.01 to 10, preferably 0.1 to 5.

The temperature in the olefin polymerization using the olefin polymerization catalyst is in the range of usually −50 to 200° C., preferably 0 to 170° C. The polymerization pressure is in the range of usually atmospheric pressure to 100 kg/cm², preferably atmospheric pressure to 50 kg/cm². The polymerization reaction can be carried out batchwise, semi-continuously or continuously. The polymerization can be conducted in two or more stages under different reaction conditions.

The low-molecular-weight ethylene copolymer mentioned previously is obtainable by the above process. The terminal double bond contained in this polymer may be modified as mentioned previously.

The toner release agent of the invention comprises the low-molecular-weight ethylene polymer which may have been modified at the terminal. This release agent is used as a toner component for toners of electrostatic charge development together with a bonding resin (a), a colorant (b), and optionally an antistatic agent. The toner release agent has a number-average molecular weight of 300 to 2000, preferably 400 to 1000.

The bonding resin (a) can be any thermoplastic resin commonly compounded in developers for electrostatic charge imaging, and is not particularly limited. Examples of the bonding resin (a) include styrene resins, styrene/acrylic ester copolymers, acrylic resins, styrene/butadiene resins, ketone resins, maleic resins, polyester resins, polyvinyl acetate resins, coumarone resins, phenol resins, silicone resins, polyurethanes, epoxy resins, terpene resins, polyvinyl butyral, polybutyl methacrylate, polyvinyl chloride, polyethylene, polypropylene, polybutadiene, ethylene/vinyl acetate copolymer and rosin resins. Of these, particularly preferred are styrene/acrylic ester copolymers, polyester aromatic resins and epoxy resins because of proper melting points (90 to 120° C.) and good bonding properties.

The colorant (b) is not particularly limited as long as it is commonly compounded in developers for electrostatic charge imaging. Examples of the colorant (b) include carbon black, phthalocyanine blue, aniline blue, arcooil blue, chrome yellow, ultramarine blue, quinoline yellow, lamp black, rose Bengal, diazo yellow, Rhodamine B Lake, Carmine 6B and quinacridone derivatives, which may be used singly or in combination.

The toner release agent is used in a weight ratio (bonding resin/colorant/antistatic agent/release agent) of 100/1–10/0–5/0.5–40(approx), preferably 100/1–6/0.5–2/10–20.

The pigment dispersant of the invention comprises the low-molecular-weight ethylene polymer which may have been modified at the terminal. This dispersant is mixed with a pigment and then with a resin to be colored, and thereafter kneaded and pelletized by an extruder to give a dry color, a colored compound or a masterbatch. The pigment dispersant is used in an amount of usually 25 to 200 parts by weight, preferably 50 to 150 parts by weight based on 100 parts by weight of the pigment. The pigment dispersant has a number-average molecular weight of 1000 to 5000, preferably 1500 to 3000. Examples of the resin to be colored employable in the invention include polyolefin resins, such as polyethylene, polypropylene, polybutene-1, poly-4-methyl-1-pentene, ethylene/propylene copolymer and ethylene/vinyl acetate copolymer; styrene resins, such as polystyrene and ABS; polycarbonate resins obtained from bisphenol-A and phosgene; polyester resins, such as polyethyleneterephthalate and polybutyleneterephthalate; thermoplastic resins, such as polyamide resins, polyphenyleneoxide resins and polyvinyl chloride; and thermosetting resins, such as phenol resins and epoxy resins.

Particularly, the pigment dispersant of the invention can be preferably used with thermoplastic resins.

The pigment may be any type as long as it is commonly known to color synthetic resins.

Examples of the pigment include inorganic pigments, such as metals, e.g., aluminum, silver and gold; carbonates, e.g., calcium carbonate and barium carbonate; oxides, e.g., ZnO and $TiO_2$; hydroxides, e.g., $Al_2O_3.nH_2O$ and $Fe_2O_3.nH_2O$; sulfates, e.g., $CaSO_4$ and $BaSO_4$; nitrates, e.g., $Bi(OH)_2NO_3$; chlorides, e.g., $PbCl_2$; chromates, e.g., $CaCrO_4$ and $BaCrO_4$; chromites, e.g., $CoCrO_4$; manganates and permanganates; borates, e.g., $Cu(BO)_2$; uranates, e.g., $Na_2U_2O_7.6H_2O$; nitrites, e.g., $K_3Co(NO_2)_6.3H_2O$; silicates, e.g., $SiO_2$; arsenates and arsenites, e.g., $CuAsO_3.Cu(OH)_2$; acetates, e.g., $Cu(C_2H_3O_2)_2.Cu(OH)_2$; phosphates, e.g., $(NH_4)_2MnO_2(P_2O_7)_2$; aluminates; molybdates; zincates; antimonates; tungstate selenides; titanates; ferrocyanates; phthalates; CaS; ZnS and CdS;

natural organic pigments, such as Cochineal Lake and Madder Lake; and organic pigments, such as nitroso pigments, e.g., Naphthol Green Y and Naphthol Green B; nitro pigments, e.g., Naphthol Yellow S and pigment chlorine 2G; azo pigments, e.g., Permanent Red 4R, Hansa Yellow, Brilliant Carmine 68 and Scarlet 2R; basic dye lakes, e.g., Malachite Green and Rhodamine B; acid dye lakes, e.g., Acid Green Lake and Eosine Lake; mordant dyes, e.g., alizarin lake and purpurin lake; vat dye pigments, e.g., Thioindigo Red B and Indanthrene Orange; and Phthalocyanine pigments, e.g., Phthalocyanine Blue and Phthalocyanine Green.

The pigment dispersant of the invention can be used for coloring conducted by any of dry coloring, compound coloring and masterbatch coloring. Particularly, it can be used for masterbatch coloring.

The slip agent for polyvinyl chloride resins of the invention comprises the low-molecular-weight ethylene polymer which may have been modified at the terminal. The slip agent is incorporated in a polyvinyl chloride composition in an amount of 0.05 to 5 parts by weight, preferably 0.1 to 3 parts by weight based on 100 parts by weight of the polyvinyl chloride. The polymer used as the slip agent has a number-average molecular weight of 400 to 4000, preferably 500 to 1000. The modified product of the polymer which has been modified at the terminal has an acid value of 2 to 70, preferably 10 to 50. The slip agent suffers deterioration in initial lubricity when the modified product of the polymer has an acid value exceeding 70, and in effects of adhesion prevention when the modified product has an acid value of less than 10. The slip agent suffers deterioration in effects of adhesion prevention to metals when the number-average molecular weight of the polymer is less than 400 and lowering in initial and terminal (meaning general) lubricity when the number-average molecular weight of the polymer exceeds 4000. The lubricating properties of the slip agent is insufficient when it is added in an amount of 0.05 part by weight or less and is excessive when it is added in an amount of 5 parts by weight or more, thereby making it difficult to plasticize compositions.

To use the modified product of the low-molecular-weight ethylene polymer as the slip agent, the oligomer in the polymer chain that contains a one-terminal vinyl or vinylidene group is modified by, for example, an unsaturated carboxylic acid or an anhydride thereof. Examples of the unsaturated carboxylic acid and the anhydride thereof include acrylic acid, methacrylic acid, maleic acid, maleic anhydride, citraconic acid, citraconic anhydride, fumaric acid, itaconic acid, itaconic anhydride, 3-cyclohexenecarboxylic acid, 4-cyclohexenecarboxylic acid and 5-norbornene-2,3-dicarboxylic acid.

The polyvinyl chloride resin to contain the polyvinyl chloride resin additive of the invention may be polyvinyl chloride or polyvinyl chloride mixed with polyethylene, polypropylene, ABS resin, MBS resin, ethylene/vinyl acetate copolymer or polymethyl methacrylate. This composition may further contain a heat stabilizer incorporated therein.

The heat stabilizer used herein may be any type attaining stabilizing effects to polyvinyl chloride resins, such as lead compounds, cadmium compounds, barium compounds, calcium compounds, zinc compounds, organotin compounds, epoxy compounds, chelate compounds and mixtures thereof.

The polyvinyl chloride composition containing the lubricant may further contain other lubricant, filler, pigment, dye, plasticizer, antistatic agent or weathering stabilizer.

The composition containing the lubricant of the invention, which can be stably molded, is excellent in initial lubricity and has reduced adhesion to metals to enable conducting operation continuously for a long period of time.

The low-molecular-weight ethylene polymer can be applied to a wide range of uses where conventional low-molecular-weight polyethylene, such as waxes, has been used. The low-molecular-weight ethylene polymer may be incorporated with various additives according to necessity for use.

The low-molecular-weight ethylene polymer, when used as the paint modifier, can modify coating surfaces. For example, such a modifier can exert excellent matte effects and improve abrasion resistance of coatings. Specifically, the paint modifier enables woodworking paints to have a luxurious appearance and have improved service durability.

The low-molecular-weight ethylene polymer, when used as the lustering agent, such as a car wax or a floor polish, can impart high gloss and improve coating properties.

The low-molecular-weight ethylene polymer is suitable as the release agent for molded article. This release agent imparts releasability to thermoplastic resins and thermosetting resins, and thereby enables improving the molding cycle.

The low-molecular-weight ethylene polymer is excellent in compatibility with rubbers, and is suitable as the rubber processing aid to impart releasability to rubbers and adjust the viscosity. Specifically, such a rubber processing aid improves dispersion of fillers and pigments, and imparts releasability and fluidity to rubbers to improve the molding cycle and extrusion properties of rubbers.

The low-molecular-weight ethylene polymer is suitable as the improver for paper quality to improve smoothness and surface quality of paper. Such an improver for paper quality can enhance moisture-barrier properties, gloss, surface hardness, anti-block properties and abrasion resistance. Specifically, the improver for paper quality can impart luxuriousness and improved service durability.

The low-molecular-weight ethylene polymer is suitable as the improver for abrasion resistance of printing inks. This improver for abrasion resistance imparts abrasion resistance and heat resistance to inked surfaces.

The low-molecular-weight ethylene polymer is suitable as the textile processing aid. This aid imparts flexibility and lubricity to fibers coated with resins containing the aid.

The low-molecular-weight ethylene polymer is suitable as the hot melt additive. This hot melt additive imparts heat resistance and fluidity to hot melt adhesives. Specifically, the additive can enhance performances of the hot melt adhesives in fields where the heat resistance is required, such as automobiles and building materials.

The low-molecular-weight ethylene polymer is suitable as the electric insulation agent. This electric insulation agent can improve electrical properties and heat resistance of film condensers.

The low-molecular-weight ethylene polymer is suitable as the compounding agent for natural waxes, such as crayons and candles. This compounding agent enhances surface hardness and raises a melting point of natural waxes.

According to the process for polymerizing olefins of the invention, polymers having a narrow molecular weight distribution can be obtained with good polymerization activity. Moreover, olefin copolymers having a narrow composition distribution can be obtained when two or more olefins are copolymerized by the process of the invention.

EXAMPLE

The present invention will be further described in more detail with reference to the following examples. The Examples should not be construed as limiting the scope of the invention.

The structure of the compounds prepared in Synthetic examples were determined with 270 MHz $^1$H NMR (GSH-270 manufactured by JEOL), and FD-Mass spectrometric analysis (SX-102A manufactured by JEOL).

In the examples, an intrinsic viscosity [η] was measured in decalin at 135° C.

(1) Synthesis of Ligand

[Synthesis of Ligand L-1]

SYNTHETIC EXAMPLE

To a 30 ml reactor thoroughly dried and purged with argon, 2.02 g (10.9 mmol) of 3-t-butylsalicylaldehyde, 10 ml of toluene and 0.86 g (40% aqueous solution, 11.1 mmol) of methylamine were charged and stirred at room temperature for 24 hr. The reaction solution was concentrated under reduced pressure to obtain 2.05 g of yellow oil represented by the following formula L-1 (yield 99%).

$^1$H NMR(CDCl$_3$): 1.43(s, 9H), 3.46(s, 3H), 6.79(t, 1H), 7.07–7.32(m, 2H), 8.32(s, 1H), 14.1(s, 1H)

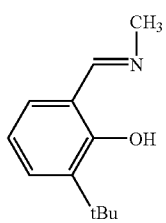

L-1

Using a phenol compound and an alkyl amine compound corresponding to the following syntheses, ligands L-2 to L-5 represented by the later-described chemical formulas were synthesized in the same manner as the above.

[Result of Synthesis of Ligand L-2]

$^1$H NMR(CDCl$_3$): 0.95(s, 2H), 0.97(s, 2H), 1.42(s, 9H), 2.93(m, 1H), 6.79(t, 1H), 7.05–7.29(m, 2H), 8.47(s, 1H), 13.3(s, 1H)

[Result of Synthesis of Ligand L-3]

$^1$H NMR(CDCl$_3$): 1.47(s, 9H), 1.77–1.94(m, 2H), 2.16–2.33(m, 2H), 2.35–2.41(m, 2H), 4.04–4.16(m, 1H), 6.79(t, 1H), 7.06–7.32(m, 2H), 8.23(s, 1H), 14.2(s, 1H)

[Result of Synthesis of Ligand L-4]

$^1$H NMR(CDCl$_3$): 1.44(s, 9H), 1.65–1.98(m, 8H), 3.73–3.78(m, 1H), 6.79(t, 1H), 7.06–7.31(m, 2H), 8.33(s, 1H), 14.1(s, 1H)

[Result of Synthesis of Ligand L-5]

$^1$H NMR(CDCl$_3$): 1.18–1.29(m, 3H), 1.48(s, 9H), 1.52–1.62(m, 2H), 1.69–1.79(m, 1H), 1.82–1.89(m, 1H), 2.22–2.39(m, 2H), 3.29–3.32(m, 1H), 6.79(t, 1H), 7.08–7.32(m, 2H), 8.29(s, 1H), 14.1(s, 1H)

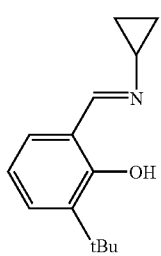

L-2

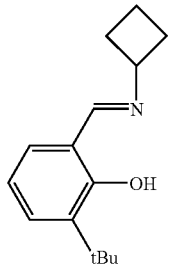

L-3

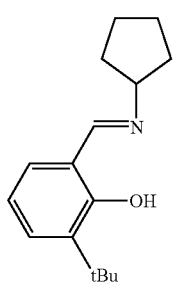

L-4

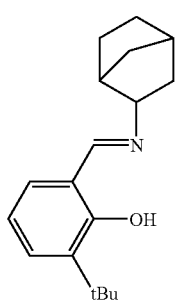

L-5

[Synthesis of Ligand L-6]

SYNTHETIC EXAMPLE

To a 100 ml reactor thoroughly dried and purged with nitrogen, 3.89 g (15.0 mmol) of 3-cumyl-5-methylsalicyl aldehyde, 30 ml of toluene and 1.75 g (40% aqueous solution, 22.5 mmol) of methylamine were charged and stirred at room temperature for 5 hr. The reaction solution was concentrated under reduced pressure and purified with silica gel column chromatography to obtain 3.87 g of yellow oil represented by the following formula L-6 (yield 97%).

$^1$H NMR(CDCl$_3$): 1.69(s, 6H), 2.34(s, 3H), 3.33(s, 3H), 6.93–7.29(m, 7H), 8.21(s, 1H), 13.5(s, 1H)

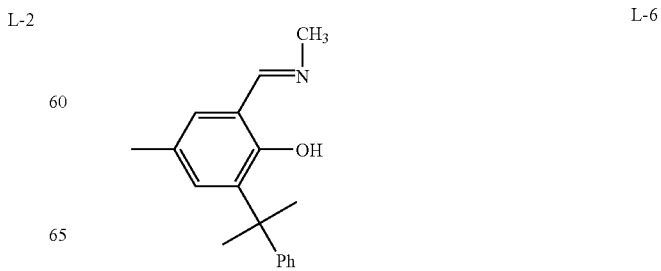

L-6

Using a phenol compound and an alkyl amine compound corresponding to the following syntheses, ligands L-7 to L-10 were synthesized in the same method as the above.

[Result of Synthesis of Ligand L-7]
$^1$H NMR(CDCl$_3$): 1.79(s, 6H), 3.38(s, 3H), 7.15(t, 1H), 7.20–7.40(m, 4H), 7.43(t, 2H), 7.61(d, 2H), 7.76(d, 1H), 8.37(s, 1H), 13.9(s, 1H)

[Result of Synthesis of Ligand L-8]
$^1$H NMR(CDCl$_3$): 1.59–2.35(m, 8H), 1.73(s, 6H), 2.35(s, 3H), 3.62–3.67(m, 1H), 6.92–7.27(m, 7H), 8.23(s, 1H), 13.3(s, 1H)

[Result of Synthesis of Ligand L-9]
$^1$H NMR(CDCl$_3$): 1.12–2.26(m, 17H), 2.32(s, 3H), 3.19–3.23(m, 1H), 6.91–7.25(m, 7H), 8.18(s, 1H), 13.1(s, 1H)

[Result of Synthesis of Ligand L-10]
$^1$H NMR(CDCl$_3$): 1.66(s, 6H), 1.70(s, 6H), 3.31(s, 3H), 6.98–7.34(m, 12H), 8.21(s, 1H), 13.6(s, 1H)

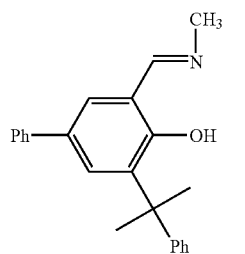

L-7

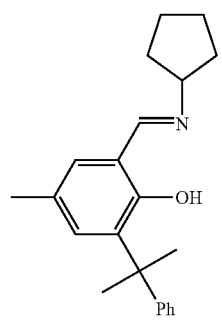

L-8

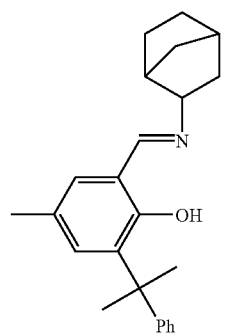

L-9

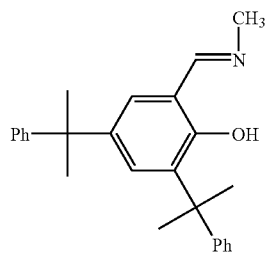

L-10

(2) Synthesis of Transition Metal Compound

Synthesis Example 1

To a 100 ml reactor thoroughly dried and purged with argon, 1.52 g (7.79 mmol) of Compound L-1 and 30 ml of diethyl ether were charged, and cooled to −78° C. and stirred. To the mixture, 5.0 ml of n-butyllithium (n-hexane solution, 1.56 M, 7.80 mmol) was added dropwise over 5 min and stirred at the same temperature for 3 hr. Thereafter, the temperature of the mixture was slowly elevated to room temperature and the mixture was stirred for 2 hr at room temperature to prepare a lithium salt. The lithium salt solution was added dropwise to 30 ml of a tetrahydrofuran solution containing 1.48 g (3.92 mmol) of a ZrCl$_4$(THF)$_2$ complex cooled at −78° C. After completion of the dropwise addition, the stirring was continued while the temperature was slowly elevated to room temperature. Further, the mixture was stirred additionally for 12 hr at room temperature and then from the reaction mixture, the solvent was distilled off. The resultant solid was dissolved in 30 ml of methylene chloride and insoluble matters were removed with a glass filter. The filtrate was concentrated under reduced pressure and then the precipitated solid was re-precipitated with diethyl ether and dried under reduced pressure to obtain 1.54 g of a yellow powdery compound represented by the formula (1) (yield 72%).

$^1$H NMR(CDCl$_3$): 1.54(s, 18H), 3.37(s, 6H), 6.92(t, 2H), 7.18–7.58(m, 4H), 8.15(s, 2H)

FD-Mass spectrometric analysis: 542

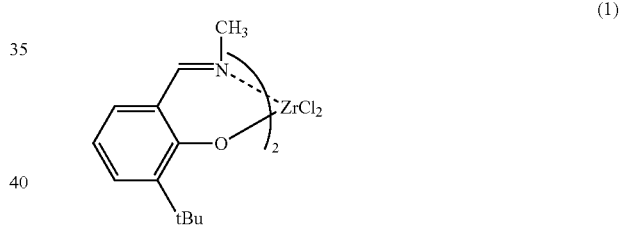

(1)

Synthesis Example 2

To a 100 ml reactor thoroughly dried and purged with argon, 1.25 g (4.00 mmol) of Compound L-2 and 20 ml of diethyl ether were charged, and cooled to −78° C. and stirred. To the mixture, 2.50 ml of n-butyl lithium (n-hexane solution, 1.6 M, 4.00 mmol) was added dropwise over 5 min and stirred at the same temperature for 2 hr. Thereafter, the temperature of the mixture was slowly elevated to room temperature and the mixture was stirred for 3 hr at room temperature to prepare a lithium salt. The lithium salt solution was added dropwise to 20 ml of a tetrahydrofuran solution containing 0.76 g (2.00 mmol) of a ZrCl$_4$(THF)$_2$ complex cooled at −78° C. After completion of the dropwise addition, the stirring was construed while the temperature was slowly elevated to room temperature. Further, the mixture was stirred additionally for 12 hr at room temperature and then from the reaction mixture, the solvent was distilled off. The resultant solid was dissolved in 10 ml of methylene chloride and insoluble matters were removed with a glass filter. The filtrate was concentrated under reduced pressure and then the precipitated solid was re-precipitated with diethyl ether and hexane, and dried under reduced pressure to obtain 0.88 g of a yellow powdery compound represented by the formula (2) (yield 56%).

$^1$H NMR(CDCl$_3$): 0.48–0.98(m, 8H), 1.41(s, 18H), 3.25 (m, 2H), 6.90(t, 2H), 7.19–7.55(m, 4H), 8.49(s, 2H)

FD-Mass spectrometric analysis: 594

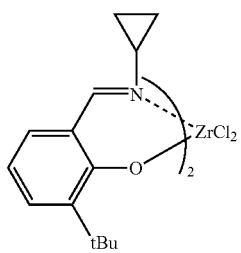

(2)

Synthesis Example 3

To a 100 ml reactor thoroughly dried and purged with argon, 1.26 g (5.34 mmol) of Compound L-3 and 25 ml of diethyl ether were charged, and cooled to –78° C. and stirred. To the mixture, 3.5 ml of n-butyl lithium (n-hexane solution, 1.56 M, 5.46 mmol) was added dropwise over 5 min and stirred at the same temperature for 3 hr. Thereafter, the temperature of the mixture was slowly elevated to room temperature and the mixture was stirred for 2 hr at room temperature to prepare a lithium salt. The lithium salt solution was added dropwise to 25 ml of a tetrahydrofuran solution containing 1.00 g (2.66 mmol) of a ZrCl$_4$(THF)$_2$ complex cooled at –78° C. After completion of the dropwise addition, the stirring was continued while the temperature was slowly elevated to room temperature. Further, the mixture was stirred additionally for 12 hr at room temperature and then from the reaction mixture, the solvent was distilled off. The resultant solid was dissolved in 20 ml of methylene chloride and insoluble matters were removed with a glass filter. The filtrate was concentrated under reduced pressure and then the precipitated solid was re-precipitated with methylene chloride and hexane, and dried under reduced pressure to obtain 0.18 g of a yellow powdery compound represented by the formula (3) (yield 11%).

$^1$H NMR(CDCl$_3$): 1.43–2.22(m, 30H), 4.52(bs, 2H), 6.93 (t, 2H), 7.25–7.64 (m, 4H), 8.27(s, 2H)

FD-Mass spectrometric analysis: 622

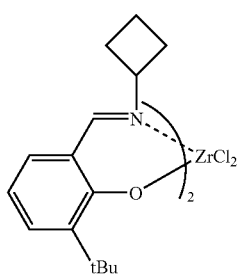

(3)

Synthesis Example 4

To a 50 ml reactor thoroughly dried and purged with argon, 0.99 g (4.00 mmol) of Compound L-4 and 20 ml of diethyl ether were charged, and cooled to –78° C. and stirred. To the mixture, 2.63 ml of n-butyl lithium (n-hexane solution, 1.52 M, 4.00 mmol) was added dropwise over 5 min and stirred at the same temperature for 2 hr. Thereafter, the temperature of the mixture was slowly elevated to room temperature and the mixture was stirred for 3 hr at room temperature to prepare a lithium salt. The lithium salt solution was added dropwise to 20 ml of a tetrahydrofuran solution containing 0.76 g (2.00 mmol) of a ZrCl$_4$(THF)$_2$ complex cooled at –78° C. After completion of the dropwise addition, the stirring was continued while the temperature was slowly elevated to room temperature. Further, the mixture was stirred additionally for 12 hr at room temperature and then from the reaction mixture, the solvent was distilled off. The resultant solid was dissolved in 40 ml of methylene chloride and insoluble matters were removed with a glass filter. The filtrate was concentrated under reduced pressure and then the precipitated solid was re-precipitated with methylene chloride and hexane, and dried under reduced pressure to obtain 0.97 g of a yellow powdery compound represented by the formula (4) (yield 75%).

$^1$H NMR(CDCl$_3$): 1.18–1.65(m, 34H), 2.16(bs, 2H), 6.91 (t, 2H), 7.18–7.57(m, 4H), 8.28(s, 2H)

FD-Mass spectrometric analysis: 650

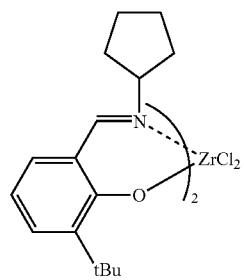

(4)

Synthesis Example 5

To a 50 ml reactor thoroughly dried and purged with argon, 1.10 g (4.00 mmol) of Compound L-5 and 20 ml of diethyl ether were charged, and cooled to –78° C. and stirred. To the mixture, 2.50 ml of n-butyl lithium (n-hexane solution, 1.6 M, 4.00 mmol) was added dropwise over 5 min and stirred at the same temperature for 2 hr. Thereafter, the temperature of the mixture was slowly elevated to room temperature and the mixture was stirred for 3 hr at room temperature to prepare a lithium salt. The lithium salt solution was added dropwise to 20 ml of a tetrahydrofurane solution containing 0.76 g (2.00 mmol) of a ZrCl$_4$(THF)$_2$ complex cooled at –78° C. After completion of the dropwise addition, the stirring was continued while the temperature was slowly elevated to room temperature. Further, the mixture was stirred additionally for 12 hr at room temperature and then from the reaction mixture, the solvent was distilled off. The resultant solid was dissolved in 20 ml of methylene chloride and insoluble matters were removed with a glass filter. The filtrate was concentrated under reduced pressure and then the precipitated solid was re-precipitated with diethyl ether and hexane, and dried under reduced pressure to obtain 1.13 g of a yellow powdery compound represented by the formula (5) (yield 81%).

¹H NMR(CDCl₃): 0.85–1.87(m, 34H), 2.16–2.28(m, 4H), 3.85–4.12(m, 2H), 6.92(t, 2H), 7.19–7.59(m, 4H), 8.32–8.41 (m, 2H)

FD-Mass spectrometric analysis: 702

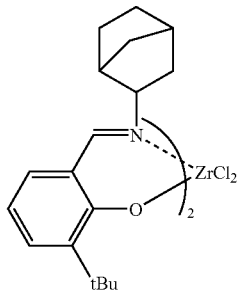

(5)

Synthesis Example 6

To a 100 ml reactor thoroughly dried and purged with argon, 1.12 g (4.00 mmol) of Compound L-6 and 25 ml of diethyl ether were charged, and cooled to −78° C. and stirred. To the mixture, 2.58 ml of n-butyl lithium (n-hexane solution, 1.55 M, 4.00 mmol) was added dropwise over 5 min and stirred at the same temperature for 2 hr. Thereafter, the temperature of the mixture was slowly elevated to room temperature and the mixture was stirred for 3 hr at room temperature to prepare a lithium salt. The lithium salt solution was added dropwise to 25 ml of a tetrahydrofurane solution containing 0.76 g (2.00 mmol) of a ZrCl₄(THF)₂ complex cooled at −78° C. After completion of the dropwise addition, the stirring was continued while the temperature was slowly elevated to room temperature. Further, the mixture was stirred additionally for 12 hr at room temperature and then from the reaction mixture, the solvent was distilled off. The resultant solid was dissolved in 50 ml of methylene chloride and insoluble matters were removed with a glass filter. The filtrate was concentrated under reduced pressure and then the precipitated solid was re-precipitated with n-hexane, and dried under reduced pressure to obtain 1.10 g of a yellow powdery compound represented by the formula (11) (yield 79%).

¹H NMR(CDCl₃): 0.86–1.91(m, 18H), 2.35(s, 6H), 6.92–7.52(m, 14H), 7.78(s, 2H)

FD-Mass spectrometric analysis: 694

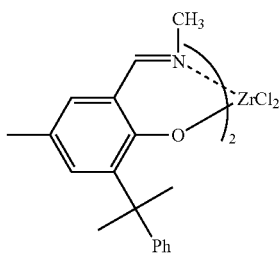

(11)

Synthesis Example 7

To a 50 ml reactor thoroughly dried and purged with argon, 1.38 g (4.19 mmol) of Compound L-7 and 20 ml of diethyl ether were charged, and cooled to −78° C. and stirred. To the mixture, 2.64 ml of n-butyl lithium (n-hexane solution, 1.59 M, 4.19 mmol) was added dropwise over 5 min and stirred at the same temperature for 2 hr. Thereafter, the temperature of the mixture was slowly elevated to room temperature and the mixture was stirred for 3 hr at room temperature to prepare a lithium salt. The lithium salt solution was added dropwise to 20 ml of tetrahydrofurane solution containing 0.79 g (2.09 mmol) of a ZrCl₄(THF)₂ complex cooled at −78° C. After completion of the dropwise addition, the stirring was continued while the temperature was slowly elevated to room temperature. Further, the mixture was stirred additionally for 12 hr at room temperature and then from the reaction mixture, the solvent was distilled off. The resultant solid was dissolved in 60 ml of methylene chloride and insoluble matters were removed with a glass filter. The filtrate was concentrated under reduced pressure and then the precipitated solid was re-precipitated with diethyl ether, and dried under reduced pressure to obtain 1.12 g of a yellow powdery compound represented by the formula (12) (yield 65%).

¹H NMR(CDCl₃): 1.79(s, 12H), 2.40(s, 6H), 6.90–7.80 (m, 24H), 7.98(s, 2H)

FD-Mass spectrometric analysis: 818

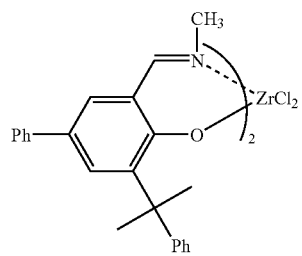

(12)

Synthesis Example 8

To a 50 ml reactor thoroughly dried and purged with argon, 1.35 g (4.00 mmol) of Compound L-8 and 20 ml of diethyl ether were charged, and cooled to −78° C. and stirred. To the mixture, 2.56 ml of n-butyl lithium (n-hexane solution, 1.56 M, 5.46 mmol) was added dropwise over 5 min and stirred at the same temperature for 2 hr. Thereafter, the temperature of the mixture was slowly elevated to room temperature and the mixture was stirred for 3 hr at room temperature to prepare a lithium salt. The lithium salt solution was added dropwise to 20 ml of tetrahydrofurane solution containing 0.76 g (2.00 mmol) of a ZrCl₄(THF)₂ complex cooled at −78° C. After completion of the dropwise addition, the stirring was continued while the temperature was slowly elevated to room temperature. Further, the mixture was stirred additionally for 12 hr at room temperature and then from the reaction mixture, the solvent was distilled off. The resultant solid was dissolved in 40 ml of methylene chloride and insoluble matters were removed with a glass filter. The filtrate was concentrated under reduced pressure and then the precipitated solid was re-precipitated with diethylether chloride and n-hexane, and dried under reduced pressure to obtain 1.14 g of a yellow powdery compound represented by the formula (13) (yield 71%).

$^1$H NMR(CDCl$_3$): 0.95–1.81(m, 16H), 1.69(s, 6H), 1.90 (s, 6H), 2.36(s, 6H), 3.54–3.62(m, 2H), 6.95–7.46(m, 14H), 8.02(s, 2H)

FD-Mass spectrometric analysis: 802

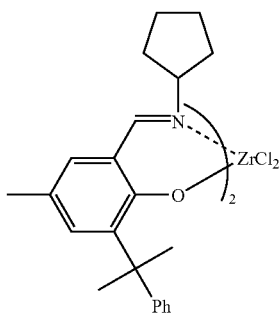

(13)

Synthesis Example 9

To a 50 ml reactor thoroughly dried and purged with argon, 1.39 g (4.00 mmol) of Compound L-9 and 20 ml of diethyl ether were charged, and cooled to −78° C. and stirred. To the mixture, 2.56 ml of n-butyl lithium (n-hexane solution, 1.56 M, 4.00 mmol) was added dropwise over 5 min and stirred at the same temperature for 2 hr. Thereafter, the temperature of the mixture was slowly elevated to room temperature and the mixture was stirred for 3 hr at room temperature to prepare a lithium salt. The lithium salt solution was added dropwise to 20 ml of a tetrahydrofurane solution containing 0.76 g (2.00 mmol) of a ZrCl$_4$(THF)$_2$ complex cooled at −78° C. After completion of the dropwise addition, the stirring was continued while the temperature was slowly elevated to room temperature. Further, the mixture was stirred additionally for 12 hr at room temperature and then from the reaction mixture, the solvent was distilled off. The resultant solid was dissolved in 40 ml of methylene chloride and insoluble matters were removed with a glass filter. The filtrate was concentrated under reduced pressure and then the precipitated solid was re-precipitated with diethyl ether and n-hexane, and dried under reduced pressure to obtain 1.16 g of a yellow powdery compound represented by the formula (14) (yield 68%).

$^1$H NMR(CDCl$_3$): 0.80–2.41(m, 40H), 3.27–3.32(m, 2H), 6.96–7.45(m, 14H), 8.12(s, 2H)

FD-Mass spectrometric analysis: 854

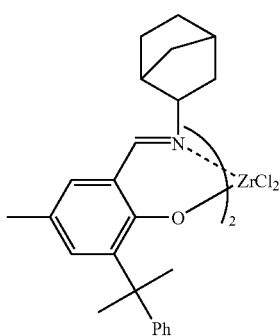

(14)

Synthesis Example 10

To a 100 ml reactor thoroughly dried and purged with argon, 1.31 g (3.50 mmol) of Compound L-10 and 20 ml of diethyl ether were charged, and cooled to −78° C. and stirred. To the mixture, 2.38 ml of n-butyl lithium (n-hexane solution, 1.59 M, 3.78 mmol) was added dropwise over 5 min and stirred at the same temperature for 2 hr. Thereafter, the temperature of the mixture was slowly elevated to room temperature and the mixture was stirred for 3 hr at room temperature to prepare a lithium salt. The lithium salt solution was added dropwise to 20 ml of a tetrahydrofurane solution containing 0.66 g (1.75 mmol) of a ZrCl$_4$(THF)$_2$ complex cooled at −78° C. After completion of the dropwise addition, the stirring was continued while the temperature was slowly elevated to room temperature. Further, the mixture was stirred additionally for 12 hr at room temperature and then from the reaction mixture, the solvent was distilled off. The resultant solid was dissolved in 20 ml of methylene chloride and insoluble matters were removed with a glass filter. The filtrate was concentrated under reduced pressure and then the precipitated solid was re-precipitated with diethylether and n-hexane, and dried under reduced pressure to obtain 0.22 g of a yellow powdery compound represented by the formula (15) (yield 14%).

$^1$H NMR(CDCl$_3$): 1.57–2.32(m, 30H), 6.94–7.57(m, 24H), 7.77(s, 2H)

FD-Mass spectrometric analysis: 902

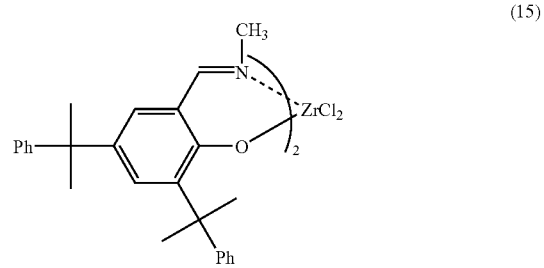

(15)

Example 1

To a 500 ml glass reactor thoroughly purged with nitrogen, 250 ml of toluene was charged and the liquid phase and the gas phase were saturated with 100 l/hr of ethylene. Thereafter, 1.25 mmol in terms of aluminum atom of methylaluminoxane and successively 0.00025 mmol of the following zirconium compound (1) were added and then polymerization was initiated. The polymerization was carried out at 25° C. at atmospheric pressure for 5 min with continuously feeding 100 l/hr of ethylene, and then the polymerization was stopped by adding a small amount of isobutanol. After completion of the polymerization, the reaction product was poured into 1 liter of methanol containing a small amount of hydrochloric acid to deposit a polymer. The polymer was washed with methanol and dried under reduced pressure at 80° C. for 10 hr. The polyethylene was obtained in an amount of 1.31 g with polymerization activity of 62.9 kg/mmol-Zr·hr and had Mw of 2750, Mw/Mn of 1.65, an intrinsic viscosity [η] of 0.12 dl/g and a degree of vinylation at one terminal of 90.5 mol %.

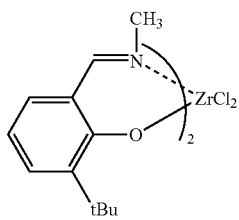

(1)

Example 2

5 To a 500 ml glass reactor thoroughly purged with nitrogen, 250 ml of toluene was charged and the liquid phase and the gas phase were saturated with 100 l/hr of ethylene. Thereafter, 1.25 mmol in terms of aluminum atom of methylaluminoxane and successively 0.0002 mmol of the following zirconium compound (2) were added and then polymerization was initiated. The polymerization was carried out at 25° C. at atmospheric pressure for 5 min with continuously feeding 100 l/hr of ethylene, and then the polymerization was stopped by adding a small amount of isobutanol. After completion of the polymerization, the reaction product was poured into 1 liter of methanol containing a small amount of hydrochloric acid to deposit a polymer. The polymer was washed with methanol and dried under reduced pressure at 80° C. for 10 hr. The polyethylene was obtained in an amount of 0.64 g and had an intrinsic viscosity [η] of 0.19 dl/g.

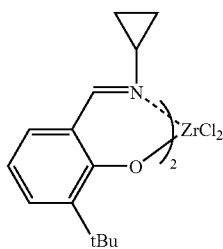

(2)

Example 3

To a 500 ml glass reactor thoroughly purged with nitrogen, 250 ml of toluene was charged and the liquid phase and the gas phase were saturated with 100 l/hr of ethylene. Thereafter, 1.25 mmol in terms of aluminum atom of methylaluminoxane and successively 0.0001 mmol of the following zirconium compound (3) were added and then polymerization was initiated. The polymerization was carried out at 25° C. at atmospheric pressure for 5 min with continuously feeding 100 l/hr of ethylene, and then the polymerization was stopped by adding a small amount of isobutanol. After completion of the polymerization, the reaction product was poured into 1 liter of methanol containing a small amount of hydrochloric acid to deposit a polymer. The polymer was washed with methanol and dried under reduced pressure at 80° C. for 10 hr. The polyethylene was obtained in an amount of 0.25 g and had an intrinsic viscosity [η] of 0.10 dl/g.

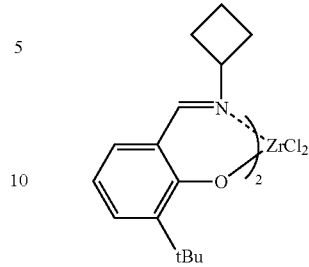

(3)

Example 4

To a 500 ml glass reactor thoroughly purged with nitrogen, 250 ml of toluene was charged and the liquid phase and the gas phase were saturated with 100 l/hr of ethylene. Thereafter, 1.25 mmol in terms of aluminum atom of methylaluminoxane and successively 0.0001 mmol of the following zirconium compound (4) were added and then polymerization was initiated. The polymerization was carried out at 25° C. at atmospheric pressure for 5 min with continuously feeding 100 l/hr of ethylene, and then the polymerization was stopped by adding a small amount of isobutanol. After completion of the polymerization, the reaction product was poured into 1 liter of methanol containing a small amount of hydrochloric acid to deposit a polymer. The polymer was washed with methanol and dried under reduced pressure at 80° C. for 10 hr. The polyethylene was obtained in an amount of 0.97 g with polymerization activity of 116.4 kg/mmol-Zr·hr and had Mw of 3800, Mw/Mn of 1.75, an intrinsic viscosity [η] of 0.15 dl/g and a degree of vinylation at one terminal of 92 mol %.

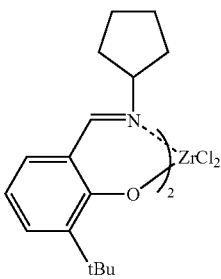

(4)

Example 5

To a 500 ml glass reactor thoroughly purged with nitrogen, 250 ml of toluene was charged and the liquid phase and the gas phase were saturated with 100 l/hr of ethylene. Thereafter, 1.25 mmol in terms of aluminum atom of methylaluminoxane and successively 0.0002 mmol of the following zirconium compound (5) were added and then polymerization was initiated. The polymerization was carried out at 25° C. at atmospheric pressure for 5 min with continuously feeding 100 l/hr of ethylene, and then the polymerization was stopped by adding a small amount of isobutanol. After completion of the polymerization, the reaction product was poured into 1 liter of methanol containing a small amount of hydrochloric acid to deposit a polymer. The polymer was washed with methanol and dried under reduced pressure at 80° C. for 10 hr. The polyethylene was obtained in an amount of 1.39 g and had an intrinsic viscosity [η] of 0.17 dl/g.

(5)

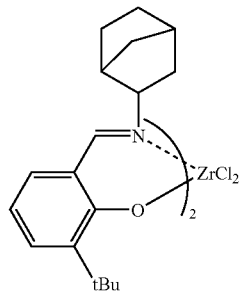

Comparative Example 1

To a 500 ml glass reactor thoroughly purged with nitrogen, 250 ml of toluene was charged and the liquid phase and the gas phase were saturated with 100 l/hr of ethylene. Thereafter, 1.25 mmol in terms of aluminum atom of methylaluminoxane and successively 0.0005 mmol of the following zirconium compound (6) were added and then polymerization was initiated. The polymerization was carried out at 25° C. at atmospheric pressure for 5 min with continuously feeding 100 l/hr of ethylene, and then the polymerization was stopped by adding a small amount of isobutanol. After completion of the polymerization, the reaction product was poured into 1 liter of methanol containing a small amount of hydrochloric acid to deposit a polymer. The polymer was washed with methanol and dried under reduced pressure at 80° C. for 10 hr. The polyethylene was obtained in an amount of 1.85 g with polymerization activity of 44.4 kg/mmol-Zr·hr and had Mw of 9500, Mw/Mn of 1.85, an intrinsic viscosity [η] of 0.41 dl/g and a degree of vinylation at one terminal of 88 mol %.

(6)

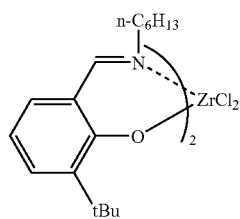

Comparative Example 2

To a 500 ml glass reactor thoroughly purged with nitrogen, 250 ml of toluene was charged and the liquid phase and the gas phase were saturated with 100 l/hr of ethylene. Thereafter, 1.25 mmol in terms of aluminum atom of methylaluminoxane and successively 0.005 mmol of the following zirconium compound (7) were added and then polymerization was initiated. The polymerization was carried out at 25° C. at atmospheric pressure for 30 min with continuously feeding 100 l/hr of ethylene, and then the polymerization was stopped by adding a small amount of isobutanol. After completion of the polymerization, the reaction product was poured into 1 liter of methanol containing a small amount of hydrochloric acid to deposit a polymer. The polymer was washed with methanol and dried under reduced pressure at 80° C. for 10 hr. The polyethylene was obtained in an amount of 2.15 g and had an intrinsic viscosity [η] of 0.40 dl/g.

(7)

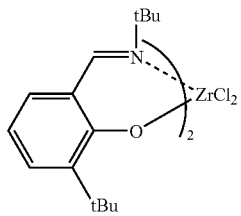

Comparative Example 3

To a 500 ml glass reactor thoroughly purged with nitrogen, 250 ml of toluene was charged and the liquid phase and the gas phase were saturated with 100 l/hr of ethylene. Thereafter, 1.25 mmol in terms of aluminum atom of methylaluminoxane and successively 0.0005 mmol of the following zirconium compound (8) were added and then polymerization was initiated. The polymerization was carried out at 25° C. at atmospheric pressure for 30 min with continuously feeding 100 l/hr of ethylene, and then the polymerization was stopped by adding a small amount of isobutanol. After completion of the polymerization, the reaction product was poured into 1 liter of methanol containing a small amount of hydrochloric acid to deposit a polymer. The polymer was washed with methanol and dried under reduced pressure at 80° C. for 10 hr. The polyethylene was obtained in an amount of 2.07 g and had an intrinsic viscosity [η] of 0.48 dl/g.

(8)

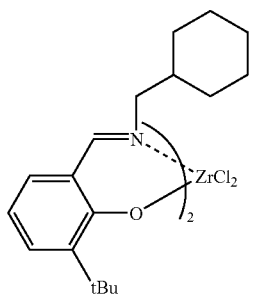

Comparative Example 4

To a 500 ml glass reactor thoroughly purged with nitrogen, 250 ml of toluene was charged and the liquid phase and the gas phase were saturated with 100 l/hr of ethylene. Thereafter, 1.25 mmol in terms of aluminum atom of methylaluminoxane and successively 0.0002 mmol of the following zirconium compound (9) were added and then polymerization was initiated. The polymerization was carried out at 25° C. at atmospheric pressure for 30 min with continuously feeding 100 l/hr of ethylene, and then the polymerization was stopped by adding a small amount of isobutanol. After completion of the polymerization, the reaction product was poured into 1 liter of methanol containing a small amount of hydrochloric acid to deposit a polymer. The polymer was washed with methanol and dried under reduced pressure at 80° C. for 10 hr. The polyethylene was obtained in an amount of 1.09 g with polymerization activity of 65.4 kg/mmol-Zr·hr and had Mw of 13800, Mw/Mn of 1.87, an intrinsic viscosity [η] of 0.44 dl/g and a degree of vinylation at one terminal of 84 mol %.

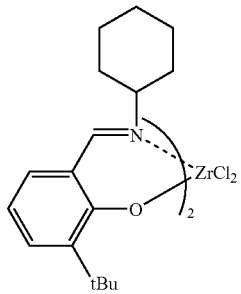

(9)

Comparative Example 5

To a 500 ml glass reactor thoroughly purged with nitrogen, 250 ml of toluene was charged and the liquid phase and the gas phase were saturated with 100 l/hr of ethylene. Thereafter, 1.25 mmol in terms of aluminum atom of methylaluminoxane and successively 0.005 mmol of the following zirconium compound (10) were added and then polymerization was initiated. The polymerization was carried out at 25° C. at atmospheric pressure for 15 min with continuously feeding 100 l/hr of ethylene, and then the polymerization was stopped by adding a small amount of isobutanol. After completion of the polymerization, the reaction product was poured into 1 liter of methanol containing a small amount of hydrochloric acid to deposit a polymer. The polymer was washed with methanol and dried under reduced pressure at 80° C. for 10 hr. The polyethylene was obtained in an amount of 2.47 g and had an intrinsic viscosity [η] of 0.61 dl/g.

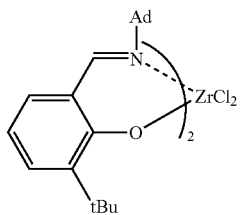

(10)

Example 6

To a 500 ml glass reactor thoroughly purged with nitrogen, 250 ml of toluene was charged and the liquid phase and the gas phase were saturated with 100 l/hr of ethylene. Thereafter, 1.25 mmol in terms of aluminum atom of methylaluminoxane and successively 0.000005 mmol of the following zirconium compound (11) were added and then polymerization was initiated. The polymerization was carried out at 25° C. at atmospheric pressure for 5 min with continuously feeding 100 l/hr of ethylene, and then the polymerization was stopped by adding a small amount of isobutanol. After completion of the polymerization, the reaction product was poured into 1 liter of methanol containing a small amount of hydrochloric acid to deposit a polymer. The polymer was washed with methanol and dried under reduced pressure at 80° C. for 10 hr. The polyethylene was obtained in an amount of 0.40 g with polymerization activity of 960 kg/mmol-Zr hr. The polyethylene had Mw of 2880, Mw/Mn of 1.65, an intrinsic viscosity [η] of 0.15 dl/g and a degree of vinylation at one terminal of 94.3 mol %.

Example 7

To a 1000 ml stainless autoclave thoroughly purged with nitrogen, 500 ml of heptane was charged and the liquid phase and the gas phase were saturated with 100 l/hr of ethylene at room temperature for 15 min. Successively, the temperature of the autoclave was elevated to 80° C., and then the inside pressure thereof was increased to 8 Kg/cm$^2$-G with feeding ethylene and the temperature was maintained. To the autoclave, 0.5 ml (0.5 mmol) of a hexane solution of MMAO (1.00 mmol/ml in terms of aluminum atom) (manufactured by TOSOH-FINECHEM) was fed with pressure and then 1 ml (0.00003 mmol) of a toluene solution of Compound (11) (0.00003 mmol/ml) was fed with pressure, and thereby polymerization was initiated. The polymerization was carried out at 80° C. for 15 min while the pressure was maintained with continuously feeding ethylene, and then the polymerization was stopped by feeding 5 ml of methanol. The resultant polymer solution was poured into 3 liters of methanol containing a small amount of hydrochloric acid to deposit a polymer. The polymer was washed with methanol and dried under reduced pressure at 80° C. for 10 hr. The ethylene polymer was obtained in an amount of 9.73 g with polymerization activity of 1297 kg/mmol-Zr·hr, and had Mw of 2720, Mw/Mn of 1.60, an intrinsic viscosity [η] of 0.14 dl/g and a degree of vinylation at one terminal of 94.0 mol %.

Example 8

To a 2000 ml stainless autoclave thoroughly purged with nitrogen, 1000 ml of heptane was charged at room temperature and the temperature of the autoclave was elevated to 150° C. Successively, the inside pressure thereof was increased to 30 Kg/cm$^2$-G with feeding ethylene and the temperature was maintained. To the autoclave, 0.5 ml (0.5 mmol) of a hexane solution of MMAO (1.00 mmol/ml in terms of aluminum atom) (manufactured by TOSOH-FINE CHEM) was fed with pressure and then and 0.5 ml (0.0001 mmol) of a toluene solution of Compound (11) (0.0002 mmol/ml) was fed with pressure, and then polymerization was initiated. The polymerization was carried out at 150° C. for 30 min in an atmosphere of an ethylene gas, and then the polymerization was stopped by feeding a small amount of methanol with pressure. The resultant polymer solution was poured into 3 liters of methanol containing a small amount of hydrochloric acid to deposit a polymer. The polymer was washed with methanol and dried under reduced pressure at 80° C. for 10 hr. The ethylene polymer was obtained in an amount of 18.8 g with polymerization activity of 376 kg/mmol-Zr·hr, and the ethylene polymer had Mw of 2230, Mw/Mn of 1.52, an intrinsic viscosity [η] of 0.12 dl/g and a degree of vinylation at one terminal of 94.2 mol %.

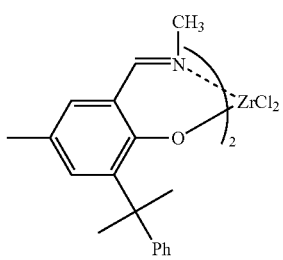

(11)

Example 9

The polymerization was carried out in the same manner as in Example 6 except that the following zirconium compound (12) was used in an amount of 0.00002 mmol. The polyethylene was obtained in an amount of 1.98 g with polymerization activity of 1185 kg/mmol-Zr·hr, and the ethylene polymer had Mw of 2430, Mw/Mn of 1.63, an intrinsic viscosity [η] of 0.11 dl/g and a degree of vinylation at one terminal of 94.1 mol %.

Example 10

The polymerization was carried out in the same manner as in Example 7 except that the following zirconium compound (12) was used in an amount of 0.000003 mmol. The polyethylene was obtained in an amount of 11.2 g with polymerization activity of 1490 kg/mmol-Zr·hr, and the ethylene polymer had Mw of 2350, Mw/Mn of 1.63, an intrinsic viscosity [η] of 0.12 dl/g and a degree of vinylation at one terminal of 96.0 mol %.

Example 11

The polymerization was carried out in the same manner as in Example 8 except that the following zirconium compound (12) was used in an amount of 0.0001 mmol. The polyethylene was obtained in an amount of 18.9 g with polymerization activity of 378 kg/mmol-Zr·hr, and had Mw of 2050, Mw/Mn of 1.52, an intrinsic viscosity [η] of 0.10 dl/g and a degree of vinylation at one terminal of 94.6 mol %.

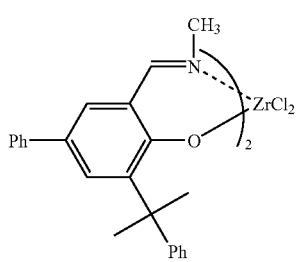

(12)

Example 12

The polymerization was carried out in the same manner as in Example 6 except that the following zirconium compound (13) was used in an amount of 0.000005 mmol. The polyethylene was obtained in an amount of 0.86 g with polymerization activity of 2069 kg/mmol-Zr·hr, and had Mw of 3120, Mw/Mn of 1.68, an intrinsic viscosity [η] of 0.19 dl/g and a degree of vinylation at one terminal of 94.0 mol %.

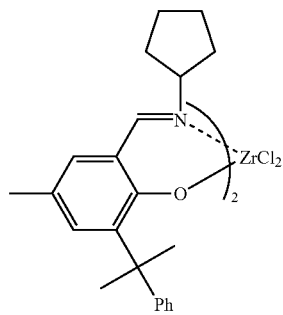

(13)

Example 13

The polymerization was carried out in the same manner as in Example 6 except that the following zirconium compound (14) was used in an amount of 0.00005 mmol. The polyethylene was obtained in an amount of 0.75 g with polymerization activity of 1793 kg/mmol-Zr·hr, and had Mw of 2850, Mw/Mn of 1.78, an intrinsic viscosity [η] of 0.15 dl/g and a degree of vinylation at one terminal of 94.5 mol %.

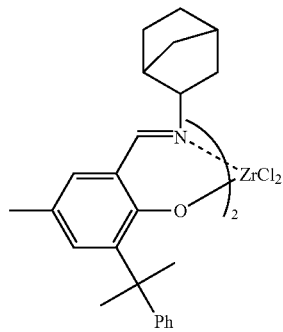

(14)

Example 14

The polymerization was carried out in the same manner as in Example 6 except that the following zirconium compound (15) was used in an amount of 0.0002 mmol. The polyethylene was obtained in an amount of 0.16 g with polymerization activity of 97 kg/mmol-Zr·hr, and had Mw of 2850, Mw/Mn of 1.78, an intrinsic viscosity [η] of 0.13 dl/g and a degree of vinylation at one terminal of 96.2 mol %.

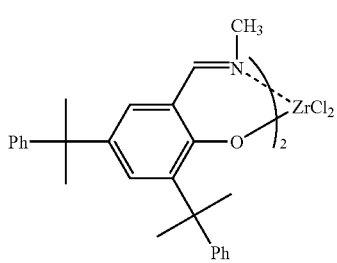

(15)

Comparative Example 6

To a 500 ml glass reactor thoroughly purged with nitrogen, 250 ml of toluene was charged and the liquid phase and the gas phase were saturated with 100 l/hr of ethylene. Thereafter, 1.25 mmol in terms of aluminum atom of methylaluminoxane and successively 0.00001 mmol of the following zirconium compound (16) were added and then polymerization was initiated. The polymerization was carried out at 25° C. at atmospheric pressure for 5 min with continuously feeding 100 l/hr of ethylene, and then the polymerization was stopped by adding a small amount of isobutanol. After completion of the polymerization, the reaction product was poured into 1 liter of methanol containing a small amount of hydrochloric acid to deposit a polymer. The polymer was washed with methanol and dried under reduced pressure at 80° C. for 10 hr. The polyethylene was obtained in an amount of 1.71 g with polymerization activity of 2057 kg/mmol-Zr·hr, and had Mw of 9600, Mw/Mn of 2.11, an intrinsic viscosity [η] of 0.48 dl/g and a degree of vinylation at one terminal of 86.2 mol %.

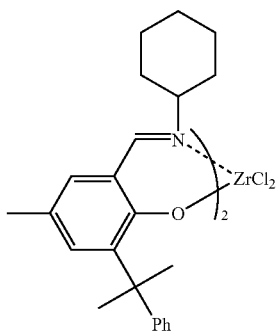

(16)

Example 15

To a 500 ml glass flask, 0.5 g of polyethylene obtained in Example 4, 90 ml of n-decane and 1.19 ml (1.09 mmol) of heptane solution of diisobutylaluminum hydride (1.0 mmol/l) were charged, and stirred at 100° C. for 7 hours. Subsequently, dry air was fed at feeding rate of 100 L/hr for 6 hours while keeping the temperature at 100° C. Reaction product was poured into mixed solution of methanol/acetone (1.5 L/1.5 L) containing a small amount of hydrochloric acid to deposit a product. The product was washed with methanol and dried under reduced pressure at 80° C. for 10 hr. As the result, terminally hydroxylated polyethylene was obtained.

Example 16

To a 300 ml glass flask, 5 g of polyethylene obtained in Example 7 and 100 ml of toluene were charged, and temperature was raised to 110° C. under nitrogen atmosphere. Subsequently, 0.34 g of m-chloro perbenzoic acid was added, and stirred for 3 hours. After the reaction, reaction mixture was poured into 800 ml of methanol to deposit a product. The product was washed with methanol and dried under reduced pressure at 80° C. for 10 hr. As the result, terminally hydroxylated polyethylene was obtained.

Example 17

To a 300 ml glass flask, 15 g of polyethylene obtained in Example 8 and 2.7 g of maleic anhydride were added, and reaction was conducted under nitrogen atmosphere at 200° C. for 6 hours. Excess of unreacted maleic anhydride was removed under reduced pressure (10 mmHg) over a period 1 hour. As the result, terminally maleic anhydridized polyethylene was obtained.

Example 18

To a 300 ml glass flask, 5 g of polyethylene obtained in Example 11, 100 ml of xylene, 1.47 g of sulfonic acid and 3.79 g of acetic anhydride were added, and reaction was conducted at 100° C. for 3 hours. After the reaction, reaction mixture was poured into 800 ml of methanol to deposit a product. The product was washed with methanol and dried under reduced pressure at 80° C. for 10 hr. As the result, terminally sulfonated polyethylene was obtained.

Example 19

To a 500 ml glass reactor thoroughly purged with nitrogen, 250 ml of mesitylene and 4.5 of polyethylene obtained in Example 12, and temperature was raised to 140° C. at ordinary pressure while feeding ethylene at feeding rate of 100 L/hr. Thereafter, 2.5 mmol in terms of aluminum atom of methylaluminoxane, 0.005 mmol of dimethylsilyl(1-(2-methyl-4,5-benzoindenyl)) (9-(2,7-di-tert-butylfluorenyl) zirconium dichloride were added and then polymerization was initiated. After 15 minutes, small amount of isobutanol was added to terminate the reaction. Subsequently, reaction mixture was poured into 2000 ml of methanol to deposit a product. The product was washed with methanol and dried under reduced pressure at 80° C. for 10 hr. As the result, 10.5 of polymer was obtained. The polymer had 1.10 of long chain branch per 1000 carbon atoms as determined by $^{13}$C-NMR analysis.

Comparative Example 7

Procedure of Example 19 was repeated except for not using 4.5 of polyethylene. As the result, 4.9 of polymer was obtained. The polymer had no long chain branch per 1000 carbon atoms as determined by $^{13}$C-NMR analysis.

EFFECT OF THE INVENTION

The ethylene polymers having a low molecular weight according to the present invention have a vinyl or vinylidene reactive unsaturated bond at one terminal of the polymer chain so that they can have any functional groups by various modification methods. Such low molecular weight ethylene polymers and modified polymers thereof have excellent high temperature releasability and can prepare a toner release agent having excellent low temperature fixing properties. Further, the low molecular weight ethylene polymers and modified polymers thereof are capable for providing a dispersant for pigments having excellent pigment-dispersing properties and a lubricant for polyvinyl chloride resins having excellent initial lubricating properties. Furthermore, they can provide many useful compositions such as paint modifiers, polishing agents etc.

What is claimed is:

1. A low-molecular-weight ethylene polymer obtained by homopolymerizing ethylene or copolymerizing ethylene and an α-olefin of 3 to 10 carbon atoms in the presence of an olefin polymerization catalyst, wherein the ethylene polymer has:
   (1) a structural unit derived from ethylene in an amount of 81 to 100% by mol, and a structural unit derived from α-olefin in an amount of 0 to 19% by mol,
   (2) a weight average molecular weight (Mw), as measured in GPC, of less than 7000,
   (3) a molecular weight distribution (Mw/Mn) satisfying $1.1 \leq Mw/Mn \leq 2.2$ and
   (4) a vinyl or vinylidene group at a terminal in the polymer main chain and a content of the groups, as determined by $^1$H-NMR, of 90% or more based on all of the terminal, said catalyst comprising a transition metal compound represented by the following formula (I)

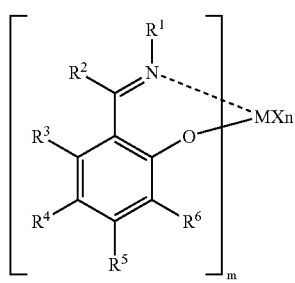

wherein M is a Group 4 or 5 transition metal atom in the Periodic Table, m is an integer of 1 to 4, $R^1$ is a linear hydrocarbon group having 1 to 5 carbon atoms defined by the formula $C_{n'}H_{2n'+1}$ where n'=1–5 or hydrogen, $R^2$ to $R^6$, which may be the same as or different from each other, each are hydrogen atom, a halogen atom, hydrocarbon group, heterocyclic compound residue, oxygen-containing group, nitrogen-containing group, boron-containing group, sulfur-containing group, phosphorus-containing group, silicon-containing group, germanium-containing group or tin-containing group, and two or more of them may be bonded to each other to form a ring, with the proviso that $R^4$ when halogen is chlorine, fluorine or iodine, and when m is 2 or more, two of groups $R^2$ to $R^6$ may be bonded to each other, n is a valence of M, X is hydrogen atom, a halogen atom, hydrocarbon group, oxygen-containing group, sulfur-containing group, nitrogen-containing group, boron-containing group, aluminum-containing group, phosphorus-containing group, halogen-containing group, hetero cyclic compound residue, silicon-containing group, germanium-containing group or tin-containing group, and when n is 2 or more, plural groups X may be the same as or different from each other and may be bonded to each other to form a ring.

2. A low-molecular-weight ethylene polymer obtained by treating a vinyl or vinylidene group of the low-molecular-weight ethylene polymer of claim 1 with at least one compound selected from an epoxidizing agent, sulfonating agent, maleic anhydride and its derivatives, hydro-boration agent, organoaluminum hydride, silylating agent or halogenation agent, which treated polymer comprises an oxygen-containing group, nitrogen-containing group, boron-containing group, sulfur-containing group, phosphrus-containing group, silicon-containing group, germanium-containing group, halogen-containing group or tin-containing group.

3. A paint modifier, lustering agent, release agent for molded articles, rubber processing aid, paper quality improver, improver for abrasion resistant of printing ink, textile processing aid, hot melt additive, electric insulation agent, compound agent for natural wax or anti-fogging agent for polyolefin film comprised of the low molecular weight ethylene polymer according to claim 1.

4. A toner release agent, pigment-dispersant or slip agent for vinyl chloride resins comprised of the low molecular weight ethylene polymer according to claim 1.

5. An olefin polymer obtained by homopolymerizing the low-molecular-weight ethylene polymer of claim 1 as macromonomer or copolymerizing said macromonomer with at least one olefin selected from ethylene and α-olefins of 3 to 10 carbon atoms.

6. A resin comprising the olefin polymer of claim 5.

* * * * *